US011054054B2

(12) United States Patent
Liu et al.

(10) Patent No.: US 11,054,054 B2
(45) Date of Patent: *Jul. 6, 2021

(54) HIGH PRESSURE VALVE WITH MULTI-PIECE STATOR ASSEMBLY

(71) Applicant: IDEX Health & Science LLC, Oak Harbor, WA (US)

(72) Inventors: Quan Liu, Petaluma, CA (US); Jeremy Hayes, Santa Rosa, CA (US)

(73) Assignee: IDEX HEALTH & SCIENCE LLC, Rohnert Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/962,748

(22) Filed: Apr. 25, 2018

(65) Prior Publication Data

US 2018/0252329 A1    Sep. 6, 2018

Related U.S. Application Data

(63) Continuation-in-part of application No. 15/373,584, filed on Dec. 9, 2016, now Pat. No. 10,384,151.

(51) Int. Cl.
*G01N 30/20* (2006.01)
*F16K 31/04* (2006.01)
(Continued)

(52) U.S. Cl.
CPC .............. *F16K 31/04* (2013.01); *B01D 15/22* (2013.01); *F16K 11/074* (2013.01);
(Continued)

(58) Field of Classification Search
USPC .................................................... 137/625.46
See application file for complete search history.

(56) References Cited

U.S. PATENT DOCUMENTS 3,494,175 A    2/1970  Cusick et al.
3,752,167 A    8/1973  Makabe
(Continued)

FOREIGN PATENT DOCUMENTS

DE    3502847    7/1986
EP    2708886    3/2014
(Continued)

OTHER PUBLICATIONS

ISR and Written Opinion, PCT/US2017/65293, dated Dec. 8, 2017.
(Continued)

*Primary Examiner* — Michael R Reid
(74) *Attorney, Agent, or Firm* — Kilpatrick Townsend & Stockton LLP

(57) ABSTRACT

A valve for use with liquid chromatography or other analytical systems may include a separate and removable stator plate. The stator plate may be a with a multi-piece stator plate with different layers. A mounting device mounting device may be adapted to engage the stator plate. The mounting plate may include a plurality of ports for fluidic connections in fluid communication with fluid passageways in the stator plate. Liquid chromatography elements, such as a packed chromatography column, a sample loop, or an electronic device may be formed on one or more layers of the stator plate. A first stator plate may be removed from a valve and replaced by a second stator having additional or different liquid chromatography elements than the first stator plate.

36 Claims, 31 Drawing Sheets

(51) Int. Cl.
  *F16K 25/00* (2006.01)
  *F16K 11/074* (2006.01)
  *B01D 15/22* (2006.01)

(52) U.S. Cl.
  CPC ........ *F16K 11/0743* (2013.01); *F16K 25/005* (2013.01); *G01N 30/20* (2013.01); *G01N 2030/202* (2013.01); *G01N 2030/207* (2013.01)

(56) References Cited

U.S. PATENT DOCUMENTS

| | | | |
|---|---|---|---|
| 3,868,970 A * | 3/1975 | Ayers | F16K 11/074 137/625.46 |
| 4,068,528 A | 1/1978 | Gundelfinger | |
| 4,242,909 A | 1/1981 | Gundelfinger | |
| 4,243,071 A | 1/1981 | Shackelford | |
| 4,444,066 A | 4/1984 | Ogle et al. | |
| 4,705,627 A | 11/1987 | Miaw et al. | |
| 4,722,830 A * | 2/1988 | Urie | G01N 35/08 422/503 |
| 5,193,581 A | 3/1993 | Shiroto et al. | |
| 5,194,226 A | 3/1993 | Tomoff et al. | |
| 5,419,419 A | 5/1995 | Macpherson | |
| 5,525,303 A | 6/1996 | Ford et al. | |
| 5,730,943 A | 3/1998 | Ford et al. | |
| 6,056,331 A | 5/2000 | Benett et al. | |
| 6,095,572 A | 8/2000 | Ford et al. | |
| 6,267,143 B1 | 7/2001 | Schick | |
| 6,910,503 B2 | 6/2005 | Schick et al. | |
| 7,308,908 B2 | 12/2007 | Keene et al. | |
| 7,311,502 B2 | 12/2007 | Gerhardt et al. | |
| 7,811,452 B2 | 10/2010 | Yin et al. | |
| 7,901,573 B2 | 3/2011 | Ishii et al. | |
| 8,071,052 B2 | 12/2011 | Baeuerle et al. | |
| 8,243,071 B2 | 8/2012 | Wang et al. | |
| 8,696,038 B2 | 4/2014 | Nienhuis | |
| 8,905,075 B2 | 12/2014 | Tower | |
| 9,063,114 B2 | 6/2015 | Wiechers et al. | |
| 9,169,934 B2 | 10/2015 | Bunner et al. | |
| 9,234,608 B2 | 1/2016 | Sterns et al. | |
| 9,285,043 B2 | 3/2016 | Tanaka | |
| 9,388,930 B2 | 7/2016 | Servin | |
| 10,384,151 B2 | 8/2019 | Liu et al. | |
| 10,466,211 B2 | 11/2019 | Cormier | |
| 10,520,477 B2 | 12/2019 | Liu et al. | |
| 2003/0196700 A1 | 10/2003 | Gilbert | |
| 2005/0127097 A1 | 6/2005 | Straka et al. | |
| 2005/0269264 A1 | 12/2005 | Fermier et al. | |
| 2007/0283746 A1 | 12/2007 | Gerhardt et al. | |
| 2009/0321356 A1 | 12/2009 | Gerhardt et al. | |
| 2010/0171055 A1 | 7/2010 | Dourdeville | |
| 2011/0233440 A1 | 9/2011 | Gamache et al. | |
| 2011/0303304 A1 | 12/2011 | Tower et al. | |
| 2012/0024411 A1 | 2/2012 | Hahn et al. | |
| 2012/0061955 A1 | 3/2012 | Hochgraeber et al. | |
| 2013/0043677 A1 | 2/2013 | Gibson | |
| 2013/0284959 A1 | 10/2013 | Hochgraeber et al. | |
| 2014/0042349 A1 | 2/2014 | Wiechers et al. | |
| 2016/0033049 A1 | 2/2016 | Nichols | |
| 2016/0082439 A1 | 3/2016 | Servin | |
| 2016/0116088 A1 | 4/2016 | Graham et al. | |
| 2016/0305586 A1 | 10/2016 | Graham et al. | |
| 2016/0377184 A1 | 12/2016 | Hara | |

FOREIGN PATENT DOCUMENTS

| | | |
|---|---|---|
| EP | 2564104 | 11/2016 |
| JP | 1028457 | 2/1998 |
| JP | 2007516070 | 6/2007 |
| JP | 2014038095 | 2/2014 |
| JP | 2014507646 | 3/2014 |
| WO | 2006021071 A1 | 3/2006 |
| WO | 2015094095 A1 | 6/2015 |
| WO | 2018107022 | 6/2018 |

OTHER PUBLICATIONS

Extended European Search Report; EP 18170667 dated Dec. 14, 2018.
U.S. Appl. No. 15/373,584, Advisory Action, dated Apr. 1, 2019, 3 pages.
U.S. Appl. No. 15/373,584, Final Office Action, dated Jan. 28, 2019, 12 pages.
U.S. Appl. No. 15/373,584, Non-Final Office Action, dated Jul. 9, 2018, 13 pages.
U.S. Appl. No. 15/373,584, Notice of Allowance, dated May 8, 2019, 8 pages.
U.S. Appl. No. 15/805,967, Non-Final Office Action, dated Jun. 24, 2019, 16 pages.
U.S. Appl. No. 15/805,967, Notice of Allowance, dated Oct. 11, 2019, 7 pages.
European Application No. EP17877523.5, Extended European Search Report, dated Jul. 9, 2020, 9 pages.
Japanese Application No. 2019-530438, Office Action dated Jan. 5, 2021, 7 pages (5 pages English Translation and 2 pages Original).

* cited by examiner

SECTION A-A OF STATOR PLATE 1401

DETAIL B OF STATOR PLATE 1401

SECTION C-C OF STATOR PLATE 1401

SECTION A-A OF MOUNTING DEVICE 1501

SECTION B-B OF MOUNTING DEVICE 1501

2700 — STATOR PLATE

2800 — MULTI-LAYER STATOR PLATE WITH SURFACE CHANNELS - LONGITUDINAL SECTIONAL VIEW

HIGH PRESSURE VALVE WITH MULTI-PIECE STATOR ASSEMBLY

CROSS REFERENCE TO RELATED APPLICATIONS

This application claims the benefit of priority from U.S. patent application Ser. No. 15/373,584, filed on Dec. 9, 2016, which is hereby incorporated herein by reference in its entirety.

FIELD OF THE DISCLOSURE

The present disclosure relates generally to valves such as those used in liquid chromatography systems and other analytical instrument systems.

BACKGROUND

Liquid chromatography (LC) is a well-known technique for separating the constituent elements in a given sample. In a conventional LC system, a liquid solvent (referred to as the "mobile phase") is introduced from a reservoir and is pumped through the LC system. The mobile phase exits the pump under pressure. The mobile phase then travels via tubing to a sample injection valve. As the name suggests, the sample injection valve allows an operator to inject a sample into the LC system, where the sample will be carried along with the mobile phase.

In a conventional LC system, the sample and mobile phase pass through one or more filters and often a guard column before coming to the column. A typical column usually consists of a piece of steel tubing which has been packed with a "packing" material. The "packing" consists of the particulate material "packed" inside the column. It usually consists of silica- or polymer-based particles, which are often chemically bonded with a chemical functionality. The packing material is also known as the stationary phase. One of the fundamental principles of separation is the mobile phase continuously passing through the stationary phase. When the sample is carried through the column (along with the mobile phase), the various components (solutes) in the sample migrate through the packing within the column at different rates (i.e., there is differential migration of the solutes). In other words, the various components in a sample will move through the column at different rates. Because of the different rates of movement, the components gradually separate as they move through the column. Differential migration is affected by factors such as the composition of the mobile phase, the composition of the stationary phase (i.e., the material with which the column is "packed"), and the temperature at which the separation takes place. Thus, such factors will influence the separation of the sample's various components.

Once the sample (with its components now separated) leaves the column, it flows with the mobile phase past a detector. The detector detects the presence of specific molecules or compounds. Two general types of detectors are used in LC applications. One type measures a change in some overall physical property of the mobile phase and the sample (such as their refractive index). The other type measures only some property of the sample (such as the absorption of ultraviolet radiation). In essence, a typical detector in a LC system can measure and provide an output in terms of mass per unit of volume (such as grams per milliliter) or mass per unit of time (such as grams per second) of the sample's components. From such an output signal, a "chromatogram" can be provided; the chromatogram can then be used by an operator to determine the chemical components present in the sample.

In addition to the above components, a LC system will often include filters, check valves, a guard column, or the like in order to prevent contamination of the sample or damage to the LC system. For example, an inlet solvent filter may be used to filter out particles from the solvent (or mobile phase) before it reaches the pump. A guard column is often placed before the analytical or preparative column; i.e., the primary column. The purpose of such a guard column is to "guard" the primary column by absorbing unwanted sample components that might otherwise bind irreversibly to the analytical or preparative column.

In practice, various components in an LC system may be connected by an operator to perform a given task. For example, an operator will select an appropriate mobile phase and column, then connect a supply of the selected mobile phase and a selected column to the LC system before operation. In order to be suitable for high performance liquid chromatography (HPLC) applications, each connection can desirably withstand the typical operating pressures of the HPLC system. If the connection is too weak, the connection may leak. A leakage will generally result in an unsuccessful or inaccurate analysis, such as inconsistent results or a total loss of the sample to be analyzed. Because the types of solvents that are sometimes used as the mobile phase are often toxic and because it is often expensive to obtain and/or prepare many samples for use, any such connection failure may be a serious concern.

An operator may disconnect a column (or other component) from a LC system and then connect a different column (or other component) in its place after one test has finished and before the next begins. Given the importance of leak-proof connections, especially in HPLC applications, the operator is responsible for ensuring that the connection is sufficiently sealed. Replacing a column (or other component) may occur several times in a day. Moreover, the time involved in disconnecting and then connecting a column (or other component) may be unproductive because the LC system is not in use and the operator may be engaged in plumbing the system, instead of preparing samples or other more productive activities. Hence, the replacement of a column in a conventional LC system may involve a great deal of wasted time and inefficiencies.

Given concerns about the desire for leak-free connections, conventional connections have been made with stainless steel tubing and stainless steel end fittings. More recently, however, it has been realized that the use of stainless steel components in a LC system have potential drawbacks in situations involving biological samples. For example, the components in a sample may attach themselves to the wall of stainless steel tubing. This presents problems because the detector's measurements (and thus the chromatogram) of a given sample may not accurately reflect the sample if some of the sample's components or ions remain in the tubing, and do not pass the detector. Perhaps of even greater concern, however, is the fact that ions from the stainless steel tubing may detach from the tubing and flow past the detector, thus leading to potentially erroneous results. Additionally, ions can easily bind to biological compounds of interest, resulting in changes to the molecules that affect their retention time in the column. Hence, "biocompatible" connections are desired through the use of a material that is chemically inert with respect to such "biological" samples, and are desired with the mobile phase used with "biological" samples so that ions will not be released by the tubing and thus contaminate the "biological" sample.

Multiport selector/injector valves are well known and have been used in a variety of industrial processes, such as liquid chromatography and mass spectrometry. For example, selection valves are commonly used in liquid chromatography and other analytical methods to direct fluid flow along alternate paths. Such valves are also used to terminate fluid withdrawal from one source and select another source of fluid, for example, such as when a variety of streams in an industrial process is selectively sampled for analysis.

Injector/selector valves are often used in high pressure liquid chromatography (HPLC) or gas chromatography (GC). U.S. Pat. No. 4,242,909 (Gundelfinger '909), which is hereby fully incorporated by reference, describes sample injection apparatus for withdrawing liquid samples from vials and injecting them into a chromatographic column or other analyzing device. The apparatus is described as intended to minimize wastage, cross contamination, and dilution of the samples, and to be capable of automation with a minimum of complexity. Injector/selector valves are particularly useful in chromatographic applications since a substantial amount of time and effort may be applied to set up a particular HPLC or GC system, which may often utilize multiple columns and/or multiple detection systems. Multiport selection valves may permit the operator of the chromatograph to redirect flows such that particular samples are selected for injection into a particular column, or alternatively, to direct the output from a particular column to one or more different detectors.

As mentioned above, multiport selection valves have been known for some time, including those which utilize a cylindrical rotor and stator combination. In some valves, the stator holds the fluid tubes in fixed relation to each other and presents the tube ends to a rotor face which may contain a grooved surface. By varying the angle of the rotor, the tubes are selectively brought into fluid communication. One type of injector/selector valve using a rotor/stator combination is the Type 50 rotary valve from Rheodyne, Incorporated. The Type 50 valves are said to operate by rotation of a flat rotor against a flat stator (see "Operating Instructions for Type 50 Teflon Rotary Valves," Rheodyne, Incorporated, printed in U.S.A. Apr. 1994). Another rotor/stator selector valve is shown in U.S. Pat. No. 5,193,581 (Shiroto, et al.), which is hereby fully incorporated by reference. The valve is described as intended to comprise, among other things, a stator plate having a plurality of outlet holes extending through the stator plate and arranged in a circle concentric with a valve casing, and a rotor having a U-shaped passage formed in the rotor. The rotor is to be rotated through a desired angle so that an inlet hole can be in fluid communication with selected ones of the outlet holes through the U-shaped passage of the rotor.

U.S. Pat. No. 5,419,419 (Macpherson) describes a rotary selector valve that is used in connection with an automatic transmission in an automobile. A motor is said to index a shear plate of the selector valve to predetermined positions for shifting the transmission. A series of working lines as shown in FIG. 6 are maintained in a closed spatial relationship with the casing.

U.S. Pat. No. 3,494,175 (Cusick, et al.) discloses a valve having a plurality of capillaries which are held in spaced relationship within a manifold plate member. U.S. Pat. No. 3,752,167 (Makabe) discloses a fluid switching device including a plurality of capillaries that are held within threaded holes by couplings. A rotary member allows fluid communication between the tubes. U.S. Pat. No. 3,868,970 (Ayers, et al.) discloses a multipositional selector valve said to be adapted with a means for attaching a plurality of chromatographic columns to the valve, such that the flow can be directed into any of the columns. U.S. Pat. No. 4,705,627 (Miwa, et al.) discloses a rotary valve said to consist of two stator discs and a rotor disposed between the two stator discs. Each time the rotor is turned intermittently it is said different passages are formed through which the fluid in the valve runs. U.S. Pat. No. 4,722,830 (Urie, et al.) discloses multiport valves. The multiport valves are said to be used in extracting fluid samples from sample loops connected with various process streams.

In many applications using selector/injector valves to direct fluid flows, and in particular in liquid and gas chromatography, the volume of fluids is small. This is particularly true when liquid or gas chromatography is being used as an analytical method as opposed to a preparative method. Such methods often use capillary columns and are generally referred to as capillary chromatography. In capillary chromatography, both gas phase and liquid phase, it is often desired to minimize the volume of the fluid flowpath (e.g., length and/or size of the fluid pathways) of the valve. One reason for this is that a valve having a larger volume for the fluid flowpath will contain a relatively larger volume of liquid, and when a sample is injected into the valve the sample will be diluted, decreasing the resolution and sensitivity of the analytical method, and may result in a dead volume being introduced into the fluid pathway.

Micro-fluidic analytical processes also involve small sample sizes. As used herein, sample volumes considered to involve micro-fluidic techniques can range from as low as volumes of only several picoliters or so, up to volumes of several milliliters or so, whereas more traditional LC techniques, for example, historically often involved samples of about one microliter to about 100 milliliters in volume. Thus, the micro-fluidic techniques described herein involve volumes one or more orders of magnitude smaller in size than traditional LC techniques. Micro-fluidic techniques can also be expressed as those involving fluid flow rates of about 0.5 ml/minute or smaller.

Most conventional HPLC systems include pumps which can generate relatively high pressures of up to around 5,000 psi to 9,000 psi or so. In many situations, an operator can obtain successful results by operating a LC system at "low" pressures of anywhere from just a few psi or so up to 1,000 psi or so. More often than not, however, an operator will find it desirable to operate a LC system at relatively "higher" pressures of over 1,000 psi.

Another, relatively newer liquid chromatography form is Ultra High Performance Liquid Chromatography (UHPLC) in which system pressure extends upward to about 1400 bar or 20,000 psi or so, or even more. In order to achieve greater chromatographic resolution and higher sample throughput, the particle size of the stationary phase has become extremely small. A stationary phase particle as small as 1 micron is common; the resulting high column packing density leads to substantially increased system pressure at the head of the column. Both HPLC and UHPLC are examples of analytical instrumentation that utilize fluid transfer at elevated pressures. For example, in U.S. Patent Publication No. 2007/0283746 A1, published on Dec. 13, 2007 and titled "Sample Injector System for Liquid Chromatography," an injection system is described for use with UHPLC applications, which are said to involve pressures in the range from 20,000 psi to 120,000 psi. In U.S. Pat. No. 7,311,502, issued on Dec. 25, 2007 to Gerhardt, et al., and titled "Method for Using a Hydraulic Amplifier Pump in Ultrahigh Pressure Liquid Chromatography," the use of a hydraulic amplifier is described for use in UHPLC systems involving pressures in excess of 25,000 psi. In U.S. Patent Publication No. 2005/0269264 A1, published on Dec. 8, 2005 and titled "Chromatography System with Gradient Storage and Method for Operating the Same," a system for performing UHPLC is disclosed, with UHPLC described as involving pressures above 5,000 psi (and up to 60,000 psi). Applicants hereby incorporate by reference as if fully set forth herein U.S. Pat. No. 7,311,502 and US Patent Publications Nos. 2007/0283746 A1 and 2005/0269264 A1.

As noted, liquid chromatography (as well as other analytical) systems, including HPLC or UHPLC systems, typically include several components. For example, such a system may include a pump; an injection valve or autosampler for injecting the analyte; a precolumn filter to remove particulate matter in the analyte solution that might clog the column; a packed bed to retain irreversibly adsorbed chemical material; the HPLC column itself; and a detector that analyzes the carrier fluid as it leaves the column. These various components may typically be connected by a miniature fluid conduit, or tubing, such as metallic or polymeric tubing, usually having an internal diameter of 0.001 to 0.040 inch.

The various components and lengths of tubing may typically be interconnected by threaded fittings. Fittings for connecting various LC system components and lengths of tubing are disclosed in prior patents, for example, U.S. Pat. Nos. 5,525,303; 5,730,943; and 6,095,572, the disclosures of which are herein incorporated by reference as if fully set forth herein. Often, a first internally threaded fitting seals to a first component with a ferrule or similar sealing device. The first fitting is threadedly connected through multiple turns by hand or by use of a wrench or wrenches to a second fitting having a corresponding external fitting, which is in turn sealed to a second component by a ferrule or other seal. Disconnecting the fittings for component replacement, maintenance, or reconfiguration often involves the use of a wrench or wrenches to unthread the fittings. Although a wrench or wrenches may be used, other tools such as pliers or other gripping and holding tools may be used.

It is noted that, as used herein, the term "LC system" is intended in an unrestricted sense to include any apparatus and components in a system used in connection with liquid chromatography, whether made of a few simple components or made of numerous, sophisticated components that are computer controlled or the like. It is noted that an LC system is one type of an analytical instrument (AI) system. For example, gas chromatography is similar in many respects to liquid chromatography, but may involve a volatile sample to be analyzed, and uses a gas as a mobile phase. Such analytical instrument systems include high performance or high pressure liquid chromatography systems, an ultra high performance or ultra high pressure liquid chromatography system, a mass spectrometry system, a microflow chromatography system, a nanoflow chromatography system, a nano-scale chromatography system, a capillary electrophoresis system, a reverse-phase gradient chromatography system, or any combination thereof. Although the present disclosure focuses on liquid chromatography, it is noted that the present disclosure may apply to other types of AI systems and methods.

Increasing pressures in liquid chromatography have resulted in the use of high pressure fluidic components. For many applications regular stainless steel tubing can be used to withstand the high pressure. However, for some types of analyses (e.g., biological testing and metal/ion analysis), stainless steel or other metals are not desired in the fluid path as the metal could interfere with the testing. Additionally, there are some applications (e.g., nano-scale or nano-volume analysis), that use very small inside diameters to accommodate the extremely low volumes involved with these applications. Such small inside diameters may typically not be available in stainless steel or other high pressure tubing.

In high-performance liquid chromatography (HPLC), ultra high-performance liquid chromatography (UHPLC), and other high-pressure analytic chemistry applications, various system components and associated fluidic connections can desirably withstand pressures of approximately 15,000 to 20,000 psi. The types of fluidic connection systems between the tubes that carry fluids and the ports that receive fluids in such high-pressure applications may be limited. Many fluidic connection systems rely on cone-shaped, threaded, or welded fittings to attach a tube to a receiving port. These types of connections sometimes may have drawbacks, however. For example, the size of cone-shaped fittings and threaded fittings are dependent on the type and size of any given port, which makes quickly interchanging a tube fitted with a particular cone or threaded fitting between various ports difficult. Other compression-based fittings have been employed to address this problem. Such fittings often employ a ferrule or a lock ring to help secure one end of a tube to a receiving port. However, ferrules and lock rings can become deformed after multiple uses (e.g., by connecting, disconnecting, and reconnecting to various ports). This is especially true in high-pressure applications, where a fluid-tight seal is essential, and where a ferrule or lock ring may be more likely to become deformed in creating such a seal.

For example, published U.S. Patent Application No. 2013/0043677, titled "Tube and Pipe End Cartridge Seal," published on Feb. 21, 2013, describes a tube and pipe end cartridge seal for use at high pressures, which relies on a fitting body (including ferrule fittings) to effectuate a seal with the axial end of a tube. Moreover, a dimple is forged on the annular end of the tube face to further effectuate the seal. Likewise, U.S. Pat. No. 6,056,331, titled "Zero Dead Volume Tube to Surface Seal," issued to Bennett et al. on May 2, 2000, describes an apparatus for connecting a tube to a surface using a body, a ferrule, and a threaded fitting. Although Bennett et al. discloses a type of tube face-sealing apparatus, the apparatus of Bennet et al. relies on a threaded fitting and a ferrule. Similarly, published U.S. Patent Application No. 2012/0061955, titled "Plug Unite and Connection System for Connecting Capillary Tubes, Especially for High-Performance Liquid Chromatography," published on Mar. 15, 2012, discloses a plug unit connection system for capillary tubes, wherein a seal is provided at the interface between a capillary tube and a bushing unit, instead of at the location of a ferrule or conical fitting. However, U.S. Patent Application No. 2012/0061955 relies on the use of a pressure piece similar to a ferrule to ensure that enough axial force can be generated to obtain a seal at the tube face.

Connection assemblies that seal in high-pressure applications may use a significant amount of applied torque to effectuate a fluid-tight seal, making the creation of such seals difficult without the use of additional tools and increasing the risk of damage to the fitting assembly or associated components due to overtightening. Moreover, experience suggests that many users do not like to use various tools to connect or disconnect tubing from components such as those in various AI systems. It is believed that users often apply different amounts of torque to connect or disconnect tubing and the components in such systems, thus resulting in potential problems caused by over-tightening or under-tightening (e.g., leakage or loss of sealing when the fluid is under pressure).

One example of a flat-bottomed or face-sealing connection assembly is provided by U.S. Pat. No. 8,696,038, titled "Flat Bottom Fitting Assembly" and issued on Apr. 15, 2014 to Nienhuis. Nienhuis teaches a type of flat bottom assembly that includes a flat-sided ferrule, and wherein the assembly including the ferrule and the tube can be pressed against a flat bottom port. Another example of a flat-bottomed or face-sealing connection assembly is provided by published U.S. Patent Application No. 2012/0024411, titled "Biocompatible Tubing for Liquid Chromatography Systems," which was published on Feb. 2, 2012 and was filed on behalf of Hahn et al. The Hahn et al. published patent application U.S. Patent Application No. 2012/0024411 describes tubing having an inner layer and an outer layer, and in which the inner layer can be biocompatible material such as polyetheretherketone (PEEK) and the outer layer may be a different material, and in which an end of the tubing may be flared or otherwise adapted to have a larger outer diameter than other portions of the tubing. For high pressure connections in both HPLC and UHPLC coned ports are typically utilized along with some form of ferrule and nut combination with tubing. The nut translates rotational torque into axial load that is translated to the ferrule. The load may cause the ferrule to deform and grip the tubing, creating a seal. The tube may be typically forced into the bottom of the coned port, but a gap or space may remain at the port bottom and may create an undesired volume in the chromatography fluid pathway.

The undesired volume at the bottom of the port may be a concern for those performing liquid chromatography analyses due to carry over and band broadening that may negatively influence the results. Carry over occurs when one analyte from one sample run is carried over to a next sample run. Carry over can result in unstable analyses that are undesirable. Band broadening occurs when analyte peaks become asymmetric and may make identification of the analyte more difficult when peaks of different molecules have similar retention times.

One issue with conventional ferrules used with coned ports is that the torque involved to deform/deflect is typically above finger tight levels in order to achieve UHPLC pressures (e.g., above 12,000 psi or so). It is desirable to remove tools from the lab by making them unnecessary for making and breaking fluidic connections and it is advantageous to have fittings that can be connected simply with the fingers rather than tools.

European Patent No. EP 2564104 describes a sealing system for use at high pressure. End-face seals minimize the sealing radius and therefore allow various fittings—including known ferrule fittings—to be used in high-pressure systems. End-face seals at such high pressure may involve smooth surfaces, however. In order to reduce cost, an end-face preparation tool may be used to forge a dimple into the end face to mechanically deform and smooth the surface.

U.S. Pat. No. 6,056,331 describes an apparatus that is composed of three components, a body, a ferrule, and a threaded fitting. The ferrule may be compressed onto a tube and a seal may be formed between the tube and a device retained in the body by threading the fitting into the body, which provides pressure that seals the face of the ferrule to a mating surface on the device. The seal may be used at elevated temperatures, depending on the materials used. This fitting was developed for use with micro-machined silicon wafers used in capillary gas chromatography.

In many conventional valves, such as rotary shear valves, a stator member at one end has two or more ports to receive tubing that can be removably attached to provide fluid connections to the valve. Such a conventional stator member may typically serve at least two functions: providing a planar stator face that mates with a rotor seal, and providing fluid channels or pathways between the ports and the stator face. In typical conventional valves, the stator member may be a single piece and is often designed so that the ports to receive the tubing are oriented at angles with respect to the longitudinal axis of the stator member or the valve. The approach with the single piece stator member may provide several ports on the end surface of the stator member, as well as several screws or nuts to secure the stator member to the valve body. The limited size of the stator member may result in a limited space available for the ports. Also, the single piece stator member may hardly allow enough space for an operator to connect and disconnect tubing from the ports of the stator member. An example of a valve with such a single-piece stator is described and shown in U.S. Pat. No. 8,905,075 B2, issued on Dec. 9, 2014, to Tower, and entitled "Rotary Shear Valve Assembly with Hard-on-Hard Seal Surfaces," which is hereby incorporated by reference as if fully set forth herein.

While the single piece stator member configuration has worked in the past, and still works for many applications, the single piece stator member configuration may also typically involve longer fluid passageways between the ends of the tubing and the stator face, which therefore have a greater volume than may be desired. It is noted that the volumes in valves used for analytical science applications generally are associated with very precise control over the volumes of the fluid passageways, and the use of smaller and smaller sample sizes means that precise control of the fluid passageway volumes can be important.

In addition, single piece stator members may often be made of metal, such as stainless steel; the manufacturing and machining of such stator members may be costly and time consuming. The use of angled ports may increase the size of the stator member, which also may increase the costs of angled port stator members. In addition, the alignment of the fluid passageways of the assembled components may be problematic with such conventional stator members. It will be appreciated that the tubing will have an inner diameter through which the fluid flows, and the ports of the stator member will likewise have openings at the bottom of the ports, with those openings providing fluid passageways. If the stator member surface has been lapped during manufacturing, then the openings of the ports may shift in shape, size or location, thereby causing potential difficulties in the alignment of the openings. The alignment of the openings is usually desired in order to prevent turbulent fluid flow.

U.S. Pat. Nos. 3,494,175, 3,752,167, 3,868,970, 4,242,909, 4,705,627, 4,722,830, 5,193,581, 5,419,419, 5,525,303, 5,730,943, 6,056,331, 6,095,572, 7,311,502, 7,811,452, 8,071,052, 8,696,038, European Patent No. EP2564104, and published U.S. Patent Application Nos. 2005/0269264, 2007/0283746, 2009/0321356, 2010/0171055, 2012/0024411, 2012/0061955, 2013/0043677, and 2016/0116088 are hereby incorporated by reference as if fully set forth herein.

SUMMARY

In one aspect, a valve is disclosed that may comprise a two-piece stator assembly useful for use with, among other applications, high pressure liquid chromatography or other analytical instrument systems. In the valve, a separate and removable stator plate may be provided and may be adapted to engage with a mounting device to provide a two-piece stator assembly for one end of a valve. In the valve, the mounting device may be adapted on one side to engage and contact one side of the stator plate, and on the other side may include a plurality of ports for receiving a plurality of fitting assemblies for fluidic connections via tubing. In the valve, the ports of the mounting device may be in fluid communication with one or more fluid pathways in the stator plate and/or one or more fluid pathways in a rotor seal located on the second side of the stator plate.

By making the stator plate a separate and replaceable component distinct from the mounting device, a number of advantages may be achieved, including providing greater flexibility for the use of the valve in various applications, reducing the overall costs of the valve, allowing the use of different materials for the mounting device and the stator plate, and others as described below. Although different configurations for the ports of the mounting device and for fitting assemblies used to removably secure tubing in the ports of the mounting device may be used, flat-bottomed ports adapted to removably hold face-sealing fitting assemblies may provide certain advantages, as described in further detail below.

In any of the disclosed embodiments, a high-pressure valve for liquid chromatography may comprise a mounting plate having a first side and a second side, and having a plurality of openings therethrough. In any of the disclosed embodiments of the high-pressure valve, each of the plurality of openings may be adapted to removably receive tubing in the first side of the mounting plate. In any of the disclosed embodiments of the high-pressure valve, a stator plate may have a first side and a second side, such that the first side of the stator plate is adapted to engage with the second side of the mounting plate. In any of the disclosed embodiments of the high-pressure valve, the stator plate may have a plurality of openings in the first side and second side of the stator plate, and at least a plurality of the openings in the second side of the mounting plate. In any of the disclosed embodiments of the high-pressure valve, the plurality of the openings in the second side of the mounting plate may be in fluid communication with corresponding openings in the first side of the stator plate. In any of the disclosed embodiments of the high-pressure valve, the stator plate and the mounting plate may be removably attached to one another. The high-pressure valve may also include a rotor seal adapted to engage with at least one of the first side and second side of the stator plate, a rotor shaft that is rotatable around a longitudinal axis, and a housing within which the rotor seal and at least a portion of the rotor shaft are located, such that the mounting plate and the stator plate are removably attached to the housing. The high-pressure valve may have a mounting plate that comprises a first material and a stator plate that comprises a second material. In the high-pressure valve, the stator plate may comprise a metal, a biocompatible material, and/or a ceramic material, or a combination thereof. In the high-pressure valve, the plurality of openings in the mounting plate may further comprise flat-bottomed ports for removably receiving tubing, and the first side of the stator plate can further comprise bosses aligned to extend partially into the bottom of the ports of the mounting plate. In the high-pressure valve, the stator plate may comprise a plurality of layers bonded together, such as by diffusion bonding. In the high-pressure valve, the mounting plate may comprise one or more of aluminum, copper, steel, stainless steel, titanium, polyetheretherketone (PEEK), polypropylene (PP), polysulfone (PSU), polyoxymethylene (POM, also referred to as Delrin® by DuPont™ Corp., USA), polyetherimide (PEI, also referred to as ULTEM® by Sabic Innovative Plastics IP B.V., The Netherlands), polyphenylene sulfide (PPS), polytetrafluoroethylene (PTFE), nylon, polyamides, including various combination thereof. In any of the disclosed embodiments of the high-pressure valve, the stator plate also may comprise a plurality of layers bonded together. In the high-pressure valve, when the stator plate includes layers comprised of metal, the metal layers may be diffusion bonded. In various implementations, at least one of the layers may comprise at least one of stainless steel, titanium, a nickel-cobalt alloy (e.g., MP35N™, SPS Technologies, Inc., USA), ceramics, glass, or various combinations thereof. In any of the disclosed embodiments of the high-pressure valve, the stator plate may further comprise a guide layer, wherein the guide layer comprises openings with a greater width than the openings of the layer below the guide layer and the guide layer is adapted to be adjacent to the second side of the mounting plate. In any of the disclosed embodiments of the high-pressure valve, the stator plate can be designed and adapted to be removable from the mounting device and the valve. In any of the disclosed embodiments of the high-pressure valve, the high-pressure valve may be adapted to operate with fluid pressures of a fluid flowing therethrough of at least 1,000 psi, 5,000 psi, 10,000 psi, 15,000 psi, 20,000 psi, and/or 25,000 psi.

In yet another aspect, a removable stator plate is disclosed for a high-pressure valve for an analytical instrument system. The removable stator plate may include a first side, a second side, and a plurality of passageways therethrough. In any of the disclosed embodiments of the removable stator plate, each of the first side and the second side may have a plurality of openings, while each of the passageways may enable fluid communication between at least one opening on the first side and at least one opening on the second side of the removable stator plate. In any of the disclosed embodiments of the removable stator plate, the removable stator plate may include a plurality of layers bonded together by diffusion bonding, whereby the first side of the removable stator plate may be enabled to sealingly engage with a first side of a mounting plate. In any of the disclosed embodiments of the removable stator plate, the first side of the mounting plate may be adapted to receive and sealingly hold a plurality of tubes, and the second side of the removable stator plate may be adapted to sealingly engage with one side of a rotor seal of a valve. In any of the disclosed embodiments of the removable stator plate, the stator plate and the mounting plate may be adapted to be removably attached to a body of a valve. In any of the disclosed embodiments of the removable stator plate, the removable stator plate may comprise one or more biocompatible materials. In any of the disclosed embodiments of the removable stator plate, the removable stator plate may comprise multiple layers, with at least two layers bonded together by diffusion bonding. In any of the disclosed embodiments of the removable stator plate, the first side of the removable stator plate may comprise at least four openings and at least two passageways therethrough. In any of the disclosed embodiments, the removable stator plate may comprise one or more of the following analytical instrument systems: a sample loop, a mixing element, a column, a filter, a heating element, a sensor, and a detector. In any of the disclosed embodiments of the removable stator plate, the removable stator plate may be adapted to be removed from a valve and replaced by a second stator plate. In any of the disclosed embodiments, the second stator plate may include a different material than the removable stator plate. In any of the disclosed embodiments, a first stator plate may be adapted to be removed from a valve and replaced by a second stator plate, while the second stator plate may include one or more different analytical instrument system elements than the first stator plate.

In another aspect, an analytical instrument (AI) system, such as a liquid chromatography system, that may comprise a valve is disclosed. In the AI system, the valve may further include a mounting plate having a first side and a second side, and having a plurality of openings therethrough. In any of the disclosed embodiments of the AI system, each of the plurality of openings may be adapted to removably receive tubing in the first side of the mounting plate. In the AI system, the valve may further include a stator plate having a first side and a second side, such that the first side of the stator plate is adapted to engage with the second side of the mounting plate. In any of the disclosed embodiments of the AI system, the stator plate may have a plurality of openings in the first side and second side of the stator plate. In any of the disclosed embodiments of the AI system, at least a plurality of the openings in the second side of the mounting plate may be in fluid communication with corresponding openings in the first side of the stator plate. In any of the disclosed embodiments of the AI system, the stator plate and the mounting plate may be removably attached to one another. The AI system may have a stator plate and a mounting plate that are adapted to be removably attached to one another, while the valve in the AI system may be adapted to operate with fluid pressures of at least 1,000 psi, 5,000 psi, 10,000 psi, 15,000 psi, 20,000 psi, or 25,000 psi.

In yet another aspect, a stator assembly is disclosed for a high-pressure valve that may include a mounting plate having a first side and a second side, and having a plurality of openings therethrough. In the stator assembly, the first side of each of the plurality of openings may be located in the first side of the mounting plate and may be adapted to removably receive tubing. The stator assembly may further include a stator plate having a first side and a second side, such that the first side of the stator plate and the second side of the mounting plate are adapted to sealingly engage with one another. In any of the disclosed embodiments of the stator assembly, the stator plate may have a plurality of openings in the first side and second side of the stator plate. In the stator assembly, at least a plurality of the openings in the second side of the mounting plate may be in fluid communication with corresponding openings in the first side of the stator plate. In any of the disclosed embodiments of the stator assembly, the mounting plate and the stator plate may be adapted to be removably attached to one another. In any of the disclosed embodiments, the stator assembly, the plurality of openings in the second side of the mounting plate and the corresponding openings in the first side of the stator plate may be aligned with one another.

In still another aspect, disclosed methods of use and operation of a valve with a removable and replaceable stator plate involve disassembly of a valve having a stator plate, removal of a first stator plate and replacing the first stator plate with a second stator plate, and then reassembling the valve by reattaching the second stator plate and the mounting device to the valve.

In yet a further aspect, a second valve for liquid chromatography is disclosed. The second valve may include a mounting plate having a first side and a second side and having a plurality of port openings penetrating the mounting plate from the first side to the second side. The second valve may further include a stator plate having a first side and a second side. In the second valve, the first side of the stator plate may be adapted to engage with the second side of the mounting plate. In the second valve, the stator plate may have a plurality of peripheral openings in the first side of the stator plate, including a first peripheral opening, and a plurality of central openings in the second side of the stator plate, including a first central opening. In the second valve, the peripheral openings of the stator plate may be in first fluid communication with the openings of the mounting plate. The second valve may further include a rotor seal adapted to engage with the second side of the stator plate. The second valve may further include a rotor shaft enabled to rotate around a longitudinal axis shared by the rotor shaft, the mounting plate, and the stator plate. In the second valve, the rotor shaft may be enabled to rotate about the longitudinal axis with respect to the mounting plate in order to form a second fluid communication between two of the central openings on the second side. The second valve may still further include a first fluid pathway formed within the stator plate in third fluid communication between the first peripheral opening and the first central opening. In the second valve, the first fluid pathway may further include a packed chromatography column.

In any of the disclosed implementations, the second valve may further include a second fluid pathway within the stator plate in fluid communication between a second peripheral opening included in the peripheral openings and a second central opening included in the central openings. In the second valve, the second fluid pathway may further include one or more of liquid chromatography elements selected from: a sample loop, a mixing element, a heating element, a sensor, a column, and a filter.

In any of the disclosed implementations of the second valve, the stator plate may be formed from a unitary workpiece having the first side and the second side. In the second valve, the first fluid pathway may have a larger cross-sectional area than a second fluid pathway formed in the stator plate. In the second valve, the first peripheral opening may have a larger cross-sectional area than a second peripheral opening included in the peripheral openings, while the first central opening may have a larger cross-sectional area than a second central opening included in the central openings.

In any of the disclosed implementations, the second valve may further include at least one mechanical fastener penetrating the mounting plate and the stator plate through holes in the mounting plate and the stator plate. In the second valve, the mechanical fastener may attach the mounting plate to the stator plate to seal the first fluid communication.

In any of the disclosed implementations of the second valve, the stator plate may further include a plurality of layers bonded together, including a top layer including the first side of the stator plate and a bottom layer including the second side of the stator plate.

In any of the disclosed implementations of the second valve, the packed chromatography column may be located on a first layer of the plurality of layers, while a liquid chromatography element may be located on a second layer of the plurality of layers, the second layer being different from the first layer.

In any of the disclosed implementations of the second valve, the packed chromatography column may be located on the same layer of the plurality of layers as a liquid chromatography element is located.

In any of the disclosed implementations of the second valve, a first layer of the plurality of layers may have a first liquid chromatography element, while a second layer of the plurality of layers may have a second liquid chromatography element.

In any of the disclosed implementations of the second valve, the first liquid chromatography element and the second liquid chromatography element may be the same liquid chromatography element having a different physical dimension.

In any of the disclosed implementations of the second valve, a first layer of the plurality of layers may have only a liquid chromatography element.

In any of the disclosed implementations of the second valve, the second fluid pathway may further include an electronic device selected from at least one of: a heating element and a sensor, while the stator plate may further include electronic connections for the electronic device, the electronic connections being externally accessible from the stator plate.

In any of the disclosed implementations of the second valve, the mounting plate may include a first material and the stator plate may include a second material that is different from the first material.

In any of the disclosed implementations of the second valve, the second material may be a biocompatible material.

In any of the disclosed implementations of the second valve, the plurality of layers may include metal and may be bonded together by diffusion bonding.

In any of the disclosed implementations of the second valve, the plurality of layers may be formed using at least one of: stainless steel, titanium, and a nickel-cobalt alloy.

In any of the disclosed implementations of the second valve, the plurality of layers may be attached together using the fasteners penetrating the holes.

In any of the disclosed implementations of the second valve, the plurality of layers may be bonded together using adhesive bonding with an adhesive.

In any of the disclosed implementations of the second valve, the plurality of layers may be bonded together using a combination of heat and pressure.

In any of the disclosed implementations of the second valve, the mounting plate may be formed using at least one of: aluminum, copper, steel, stainless steel, titanium, and a nickel-cobalt alloy.

In any of the disclosed implementations of the second valve, the mounting plate may be formed using at least one of: polyetheretherketone, polypropylene, polysulfone, polyoxymethylene, polyetherimide, polyphenylene sulfide, polytetrafluoroethylene, nylon, and polyamide.

In any of the disclosed implementations of the second valve, at least one of the layers may include at least one of a ceramic, a glass, and a composite material.

In any of the disclosed implementations of the second valve, the stator plate may be adapted to be removed from the valve.

In any of the disclosed implementations of the second valve, the valve may be adapted to operate with fluid pressures of a fluid flowing therethrough of up to 25,000 psi.

In still a further aspect, a second stator plate is disclosed for a high-pressure valve for an analytical instrument. The second stator plate may include a first side and a second side. In the second stator plate, the first side of the second stator plate may be adapted for fixed mounting to a mounting plate. In the second stator plate, the second stator plate may have a plurality of peripheral openings in the first side of the second stator plate, including a first peripheral opening, and a plurality of central openings in the second side of the second stator plate, including a first central opening. In the second stator plate, the peripheral openings of the second stator plate may be in first fluid communication with openings of the mounting plate. The second stator plate may further include a first fluid pathway formed within the second stator plate in third fluid communication between the first peripheral opening and the first central opening. In the second stator plate, the first fluid pathway may further include a packed chromatography column. In the second stator plate, the high-pressure valve may further include a rotor seal adapted to engage with the second side of the second stator plate, and a rotor shaft enabled to rotate around a longitudinal axis shared by the rotor shaft, the mounting plate, and the second stator plate. In the second stator plate, the rotor shaft may be enabled to rotate about the longitudinal axis with respect to the mounting plate in order to form a second fluid communication between two of the central openings on the second side.

In any of the disclosed implementations, the second stator plate may further include a second fluid pathway within the second stator plate in fluid communication between a second peripheral opening included in the peripheral openings and a second central opening included in the central openings. In the second stator plate, the second fluid pathway may further include one or more liquid chromatography elements selected from: a sample loop, a mixing element, a heating element, a sensor, a pump, a column, and a filter.

In any of the disclosed implementations, the second stator plate may be formed from a unitary workpiece having the first side and the second side. In the second stator plate, the first fluid pathway may have a larger cross-sectional area than a second fluid pathway formed in the second stator plate. In the second stator plate, the first peripheral opening may have a larger cross-sectional area than a second peripheral opening included in the peripheral openings, while the first central opening may have a larger cross-sectional area than a second central opening included in the central openings.

In any of the disclosed implementations of the second stator plate, the valve may further include at least one mechanical fastener penetrating the mounting plate and the second stator plate through holes in the mounting plate and the second stator plate. In the second stator plate, the mechanical fastener may attach the mounting plate to the second stator plate to seal the first fluid communication.

In any of the disclosed implementations, the second stator plate may further include a plurality of layers bonded together, including a top layer including the first side of the second stator plate and a bottom layer including the second side of the second stator plate.

In any of the disclosed implementations of the second stator plate, the packed chromatography column may be located on a first layer of the plurality of layers, while a liquid chromatography element may be located on a second layer of the plurality of layers, the second layer being different from the first layer.

In any of the disclosed implementations of the second stator plate, the packed chromatography column may be located on the same layer of the plurality of layers as a liquid chromatography element is located.

In any of the disclosed implementations of the second stator plate, a first layer of the plurality of layers may have a first liquid chromatography element, and a second layer of the plurality of layers may have a second liquid chromatography element.

In any of the disclosed implementations of the second stator plate, a first liquid chromatography element and a second liquid chromatography element may be the same liquid chromatography element having a different physical dimension.

In any of the disclosed implementations of the second stator plate, a first layer of the plurality of layers may have only a liquid chromatography element.

In any of the disclosed implementations of the second stator plate, the second fluid pathway may further include an electronic device selected from at least one of: a heating element, and a sensor, while the second stator plate may further include electronic connections for the electronic device, the electronic connections being externally accessible from the second stator plate.

In any of the disclosed implementations of the second stator plate, the mounting plate may include a first material while the second stator plate may include a second material that is different from the first material.

In any of the disclosed implementations of the second stator plate, the second material may be a biocompatible material.

BRIEF DESCRIPTION OF THE FIGURES

For a more complete understanding of the present disclosure and its features and advantages, reference is now made to the following description, taken in conjunction with the accompanying figures, in which like numbers are used to depict like elements. The figures accompanying the following description are generally schematic illustrations that may not be drawn to an accurate scale or perspective.

DETAILED DESCRIPTION

Figure 1:
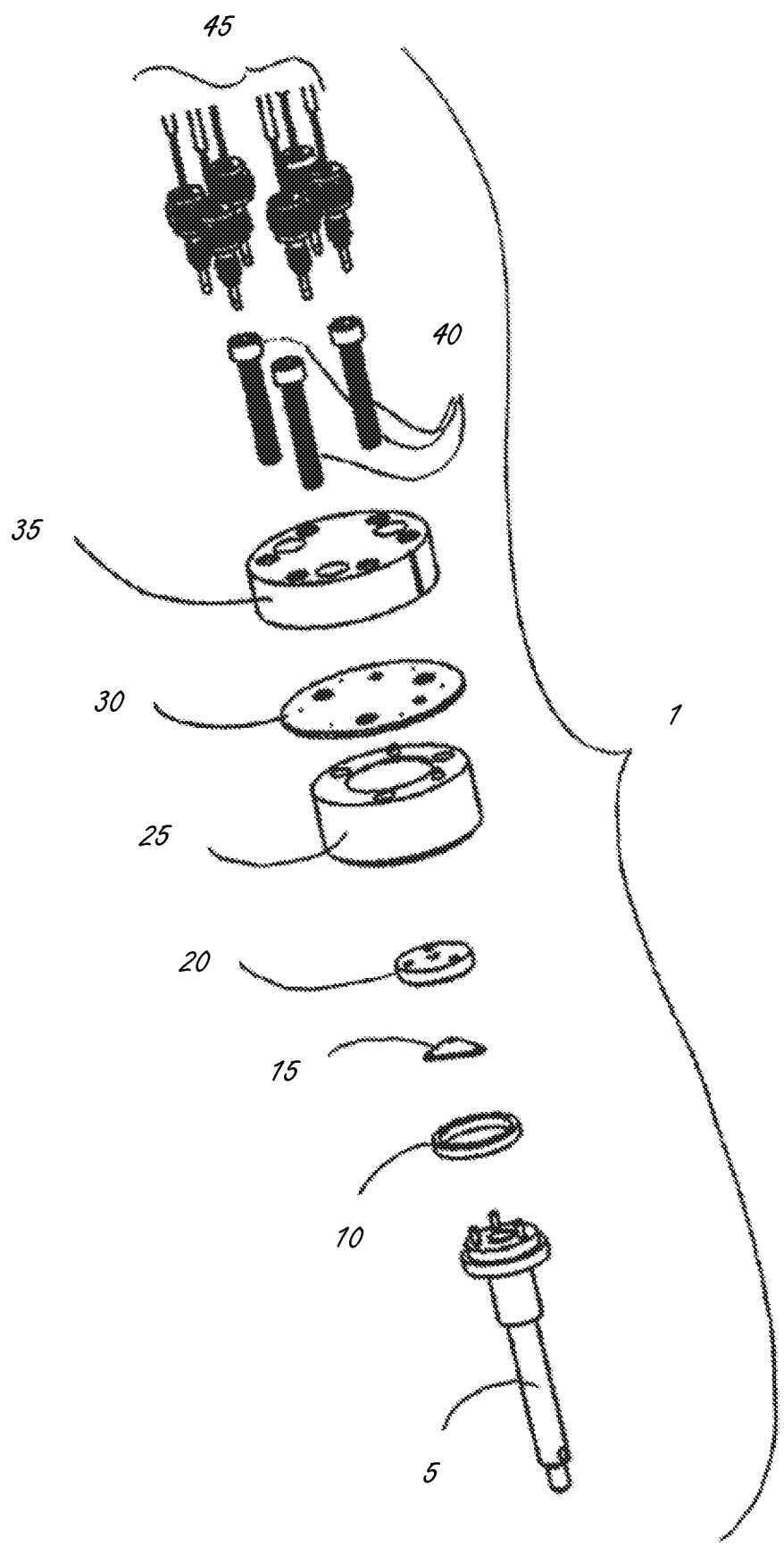
FIG. 1 is an exploded perspective view of certain of the components of a valve in one embodiment in accordance with the present disclosure.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a compound form of a reference numeral with a letter refers to a specific instance of an element and the simple form of the reference numeral without the letter refers to the element generically or collectively. Thus, as an example (not shown in the drawings), device "99a" refers to an instance of a device class, which may be referred to collectively as devices "99" and any one of which may be referred to generically as a device "99". In the figures and the description, like numerals are intended to represent like elements.

Figure 2:
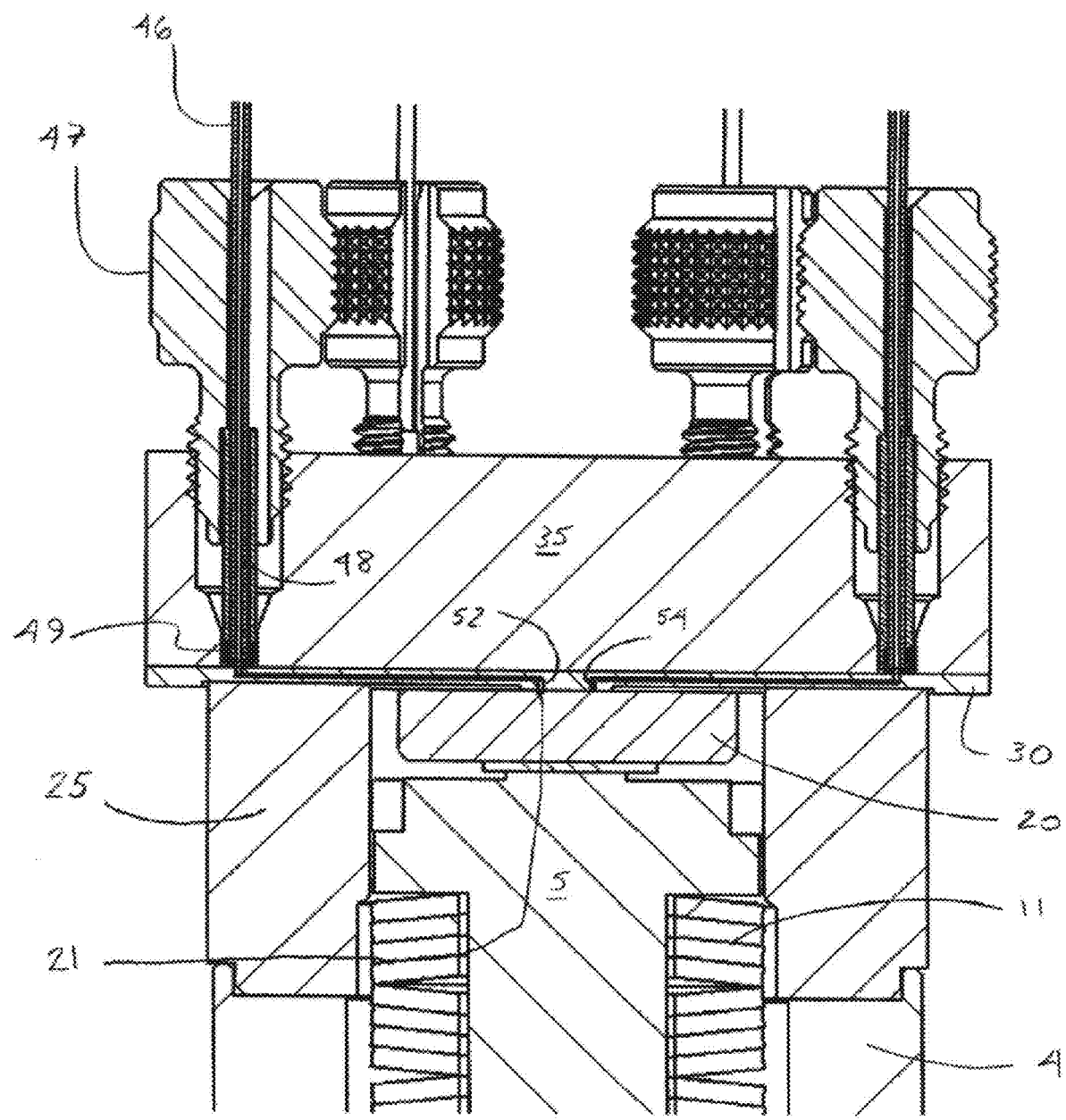
FIG. 2 is a partial cross-sectional view of a valve in one embodiment in accordance with the present disclosure.

Referring to FIG. 1, the key components of a valve 1 in one particular embodiment are shown in an exploded view. The valve 1 includes a rotor shaft 5, a bearing ring 10, a compliant PEEK spring 15, a rotor seal 20, a stator ring 25, a stator plate 30, a mounting device 35, a plurality of screws 7, and fitting assemblies 45 with tubing therein. A cross-sectional view of a portion of the valve 1 is provided in FIG. 2, with the various components assembled. As shown in FIG. 2, the valve 1 includes a rotor shaft 5, rotor seal 20, stator plate 30, and mounting device 35, as well as a housing 4 and, located within the housing 4 and around a portion of rotor shaft 5 is a spring 11. (Screws 40 are not shown in FIG. 2, but it is noted that the screws 40 are used to attach the mounting device 35 and stator plate 30 to the stator ring 25, which attachment may be either removable or permanent. It will be further appreciated that other fastening means can be used if desired, such as bolts or soldering, glue, etc., especially if the attachment is intended to be permanent.)

As shown in FIGS. 1 and 2, each of the rotor shaft 5, bearing ring 10, spring 15, rotor seal 20, stator ring 25, stator plate 30, and mounting device 35 may generally have a circular outer shape in a transverse direction and, each of such components may generally be symmetric around the longitudinal axis of the valve 1 and may generally define a cylindrical shape. It is noted that certain exceptions to the general symmetry around the longitudinal axis are described below, such as in stator plate 30 and in the asymmetric use of three screws 40. As shown in FIG. 2, the rotor seal 20, the rotor shaft 5, and the spring 11 are located within the body of the valve 1 as provided by the stator ring 25 and the housing 4. Although the valve 1 shown and described herein is a rotary valve, it is noted that the embodiments of the present disclosure may include other valves as well. For purposes of brevity, the present disclosure focuses on a rotary valve.

As shown in FIG. 2, each of the mounting device 35, stator plate 30, rotor seal 20, and stator ring 25 have two surfaces, each of which may be substantially planar in a transverse direction. For convenience of the reader, the two surfaces may be referred to as the "top" and "bottom" surfaces with references to the figures. However, it is noted that the valve 1 may have any orientation in use and that the top and bottom of the various components as shown in FIG. 2, for example, may be reversed or may vary in any given implementation of the present disclosure. As shown in FIG. 2, the top surface of the stator ring 25 is in contact with portions of the bottom surface of the stator plate 30. In addition, a portion of the top surface of the rotor seal 20 is in contact with a central portion of the bottom surface of the stator plate 30. The top surface of the stator plate 30 is in contact with the bottom surface of the mounting device 35.

The mounting device 35 includes openings or ports for removably receiving tubing 46 and fitting assemblies 45, each of which may include a nut 47, a sleeve 48 and a sealing tip 49. Such fitting assemblies are described in more detail in co-pending U.S. patent application Ser. No. 14/922,041, which was published as United States Published Patent Application No. 2016/0116088 A1, and the entirety of which is hereby incorporated by reference as if fully set forth herein. For purposes of brevity, details regarding the nut 47, sleeve 48, and sealing tip 49 are not provided herein, as a full and detailed description is available to the reader in U.S. Published Patent Application No. 2016/0116088 A1.

It will be appreciated that the use of a fitting assembly like that shown and described in detail in U.S. Published Patent Application No. 2016/0116088 A1 in connection with the mounting device 35 and stator plate 30, as shown and described herein, may provide a number of substantial advantages. For example, the use of such fitting assemblies with the mounting device 35 and stator plate 30 may allow the tubing to be sealingly engaged with the mounting plate 35 and the stator plate 30 in an essentially vertical position with respect to the longitudinal axis of the tubing, the substantially planar bottom surface of the mounting plate 35, and the substantially planar top surface of the stator plate 30. In the past, certain conventional stators for high pressure valves typically had fluid pathways and ports that were at angles of between 15 and 60 degrees with respect to the substantially planar bottom surface of the stator, such as can be seen in U.S. Pat. No. 5,419,208, for example. By allowing for an essentially vertical or perpendicular connection of the tubing (e.g., between about 80 degrees to 100 degrees with respect to the transverse axis of the stator plate), the mounting device 35 and stator plate 30 may allow for sealing the end of the tubing adjacent to or very close to the top surface of the stator plate 30. In addition, the use of essentially vertical or perpendicular connection of the tubing may avoid costly and time-consuming machining to manufacture conventional stators for the mounting plate 35 of the present disclosure. Such machining was costly due to the degree of precision previously involved with the manufacture of such ports and fluid pathways in conventional stators. However, the machining precision for the mounting device 35 of the present disclosure may be lower and accordingly easier to achieve. It is noted, however, that any one of a variety of different fitting assemblies may be used to removably and sealingly attach tubing 46 to the valve 1 via the ports in the mounting device 35, and that flat-bottomed fitting assemblies (such as may be commercially available from a variety of manufacturers, including but not limited to the MarvelX fitting assembly from IDEX Health & Science LLC) may provide advantages over fitting assemblies with a conical ferrule and cone-shaped port configuration (although the latter may be used with the mounting device 35 and stator plate 30 if desired).

Also shown in FIG. 2 are fluid passageways 52 and 54 located in stator plate 30. Each of passageways 52 and 54 provide a fluid pathway between one of the openings (e.g., a bottom of a port) in the mounting device 35, through a corresponding opening in the top surface of the stator plate 30, and to a central opening on the bottom of the stator plate 30. The rotor seal 20 in FIG. 2 includes a channel 21, which provides a fluid pathway to connect the opening on the bottom face of stator plate 30 corresponding to pathway 52 with at least one other opening in the bottom face of stator plate 30. It will be appreciated that the components of the valve 1 are expected to be attached or in contact with one another so that they form a sealing engagement, even when the fluid flowing through tubing 46 and passageways 52 and 54 is flowing at very high pressures. Spring 11 provides a compressive force against the rotor shaft 5 and urges the top side of rotor shaft 5 against the bottom side of the rotor seal 20, and thus the top side of rotor seal 20 against the bottom side of the stator plate 30.

The passageways 52 and 54, as well as the channels 21 may be of various shapes and sizes. For example, the passageways 52 and 54 and/or channels 21 may be circular in cross section, a hemisphere in cross section, D-shaped in cross section, square shaped in cross section, and so forth. Passageways 52 and 54 and/or channels 21 can also have different sizes or shapes from one another if desire, such that passageway 52 has a first shape and/or size and passageway 54 has a second shape and/or size, for example. Although FIG. 2 shows passageways 52 and 54 located within stator plate 30, it will be appreciated that fluid pathways can be provided as a groove on the bottom face of the stator plate 30, as the top side of rotor seal 20 will close or seal such grooves when the valve 1 is fully assembled. Alternatively, fluid pathways can be provided as one or more grooves or channels 21 on the top side of the rotor seal 20, and in addition a combination of passageways and/or grooves on the top and/or bottom sides of the stator plate 30 can be provided. Moreover, it is noted that, although FIG. 2 shows two passageways 52 and 54, and one channel 21, more or fewer passageways, or grooves, and/or channels in rotor seal 20, can be provided in valve 1.

Although not shown, it is noted that the stator plate 30 may comprise one or more analytical instrument components, such as a sample loop, a splitter, a mixer, a column, a temperature, fluid flow, or pressure sensor, a filter, a heating element, a detector, and other types of micro-electro mechanical systems components. Techniques for adding such components to a substrate with the use of diffusion bonding that may be useful in manufacturing a stator plate 30 having one or more such components are detailed in U.S. Published Patent Application No. 2016/0169843 A1, which was published on Jun. 16, 2016, and is entitled "Pressure Sensing and Flow Control In Diffusion-Bonded Planar Devices for Fluid Chromatography," which is hereby incorporated by reference herein as if fully set forth herein.

Figure 3:
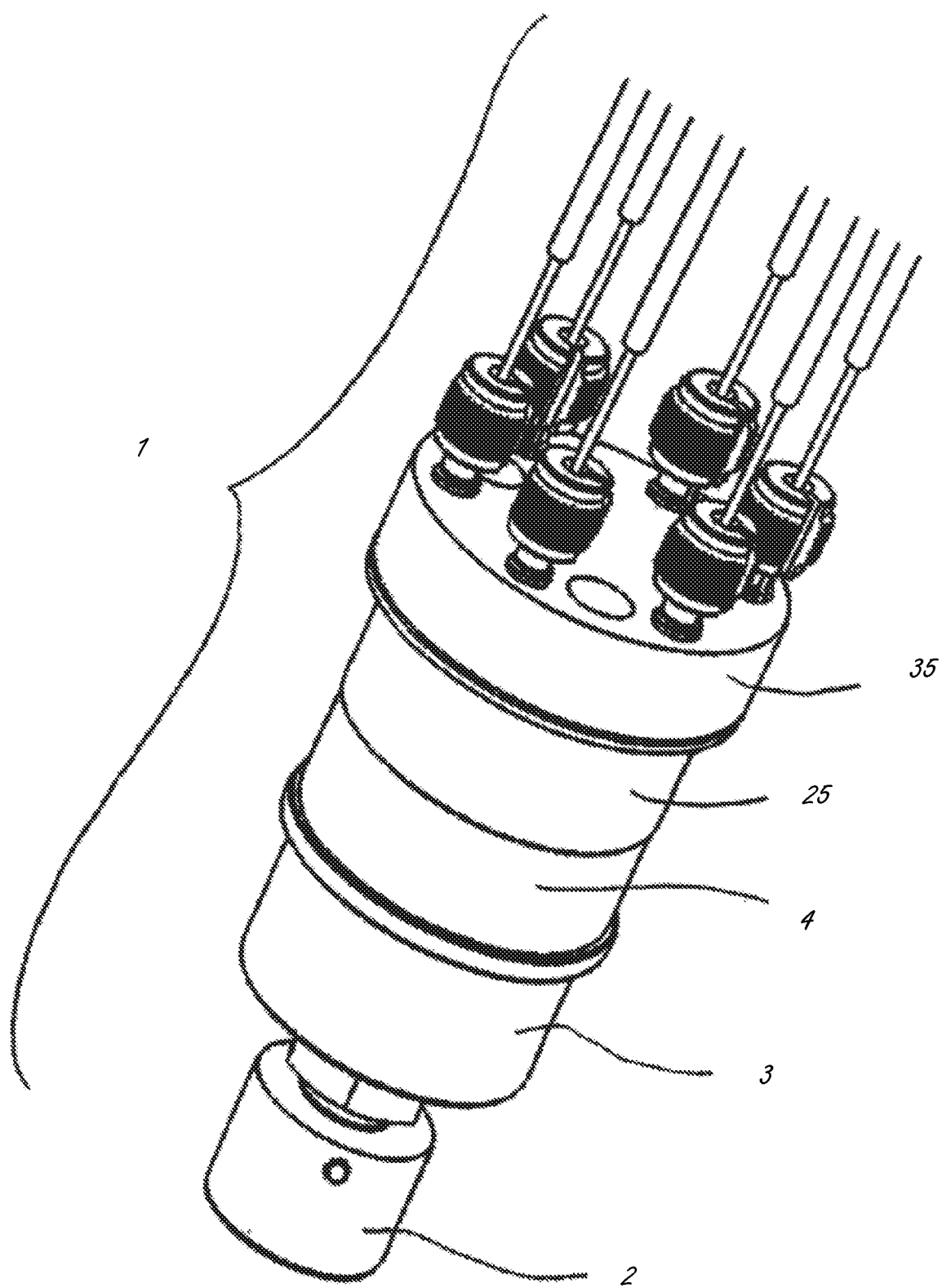
FIG. 3 is a perspective view of a valve in one embodiment in accordance with the present disclosure.

In FIG. 3, a perspective view of an assembled valve 1 is provided. As shown in FIG. 3, the valve 1 includes the mounting device 35, the stator ring 25, and also valve body 3 and a knob 2. The knob 2 can be attached to one end of a rotor shaft 5, and that when the knob 2 is turned, the rotor shaft 5 and rotor seal 20 are also turned or rotated. It will also be appreciated that at least some of the fluid pathways and/or passageways (however shaped or whether grooves or passageways, etc.) may be coated with one or more coatings. Coatings may be added to such fluid pathways to reduce friction, increase hardness, provide biocompatibility (or enhance existing biocompatibility), improve chemical compatibility, and the like, as may be desired for one or more particular applications of the valve 1. For example, it may be desirable to have the fluid pathways coated with a particular chemical substance if the intended application involves the use of a corrosive chemical, or to have biocompatible fluid pathways if the intended application involves biological samples and biocompatibility is a concern.

Among other advantages of a valve with the two-piece mounting device 35 and stator plate 30 as described herein, the mounting device 35 can be made of plastics or metal because the mounting device 35 does not form a part of the fluid flowpath and does not come into contact with the fluid. For example, in some implementations, mounting device 35 may be formed using polymers, such as at least one of PEEK, PPS, POM, PP, PSU, PEI, among others. In other example implementations, mounting device 35 may be formed using metal, such as aluminum, copper, steel, stainless steel, titanium, a nickel-cobalt alloy, an alloy of various metals. In some implementations, mounting device 35 may be formed using ceramic materials or glass. In still further implementations, mounting device 35 may be formed using composite materials, including various combinations of polymers, metals, and ceramics. As long as the stator plate 30 is made of one or more biocompatible materials, the valve 1 can still provide a biocompatible flowpath and the valve 1 can be used for biocompatible applications. Another advantage of the two-piece assembly is that the mounting device 35 can be made of a cheaper material, such as for those applications in which higher pressures are not used, and it can be reusable. Thus, the valve 1 of the present disclosure may provide flexibility in terms of materials and potential uses, as well as cost savings and ease of manufacturing.

Although not shown, it will be appreciated that either or both of the substantially planar surfaces of the stator plate 30 may be lapped and/or coated with a diamond-like carbon (DLC) or other coating material, and the substantially planar surface of the mounting device 35 that abuts one surface of the stator plate 30 may also be lapped and/or coated with DLC or another coating material. Such lapping and/or coating can be used to reduce friction and increase hardness and to provide a very smooth surface to provide a better fit and engagement of the mounting device 35 and one side of stator plate 30 and the rotor seal 20 and the second side of the stator plate 30, respectively.

Another advantage of the valve 1 with the two-piece stator assembly with the mounting device 35 and the stator plate 30 is that the stator plate 30 can be removed and replaced with a different stator plate. For example, if a first stator plate has been used extensively and starts to become worn or provides less precise results, the first stator plate can be replaced without using a new valve or a new mounting device. For example, an operator may disassemble the valve 1 with the first stator plate and remove the first stator plate and the mounting device 35 from the stator ring 25 of the valve 1. The first stator plate can then be detached from the mounting device 35 and the stator plate 30 may be attached to replace the first stator plate. Then the operator can reassemble the valve 1 by aligning the stator plate 30 and the mounting device 35 with location pins (not shown) and then securely attaching the stator plate 30 and the mounting device 35 to the stator ring 25 and valve 1, for example, by screwing the screws 40 into place in the body of the valve 1 to securely attach the mounting device 35 and the stator plate 30 to the rest of the valve 1. The method described above provides the advantage of replacing the stator plate 30 without replacing any other components of valve 1, thereby providing longer life and lower operational costs for the valve 1.

Moreover, the stator plate 30 and/or mounting device 35 can be replaced with the methods for replacing stator plate 30 described above so that an alternative stator plate and/or alternative mounting device can be used for a desired application. Because analytical instrument systems can be complicated, allowing an operator to simply replace stator plate 30 and/or mounting device 35 for a given application of the valve may allow the operator to use essentially the same valve 1 for a variety of applications. For example, an operator may wish to use a metallic mounting device and a metallic stator plate in combination for a particular application, such as an application involving high pressures. If the operator then desires to use the valve 1 in an application in which biocompatibility is desired, the operator can then replace either or both of the stator plate 30 and the mounting device 35 with a stator plate and/or mounting device that are made from biocompatible materials. In addition, an operator can replace the stator plate 30 for an application in which it is desired that the stator plate 30 have a particular size of sample loop, a mixer, a pressure sensor, a flow sensor, or a temperature sensor, or the like so that a replacement stator plate may include the desired feature for the desired application, without replacing valve 1. The ability to replace stator plate 30 may provide the operator with the advantages of reduced costs (due to a reduced demand for additional valves or replacement valves), longer valve life, ease of use across a variety of applications, and the ability to provide changes to the valve relatively quickly (such as by changing the stator plate and/or mounting plate in a valve without entirely replacing or relocating the valve within the analytical instrument system).

Figure 4:
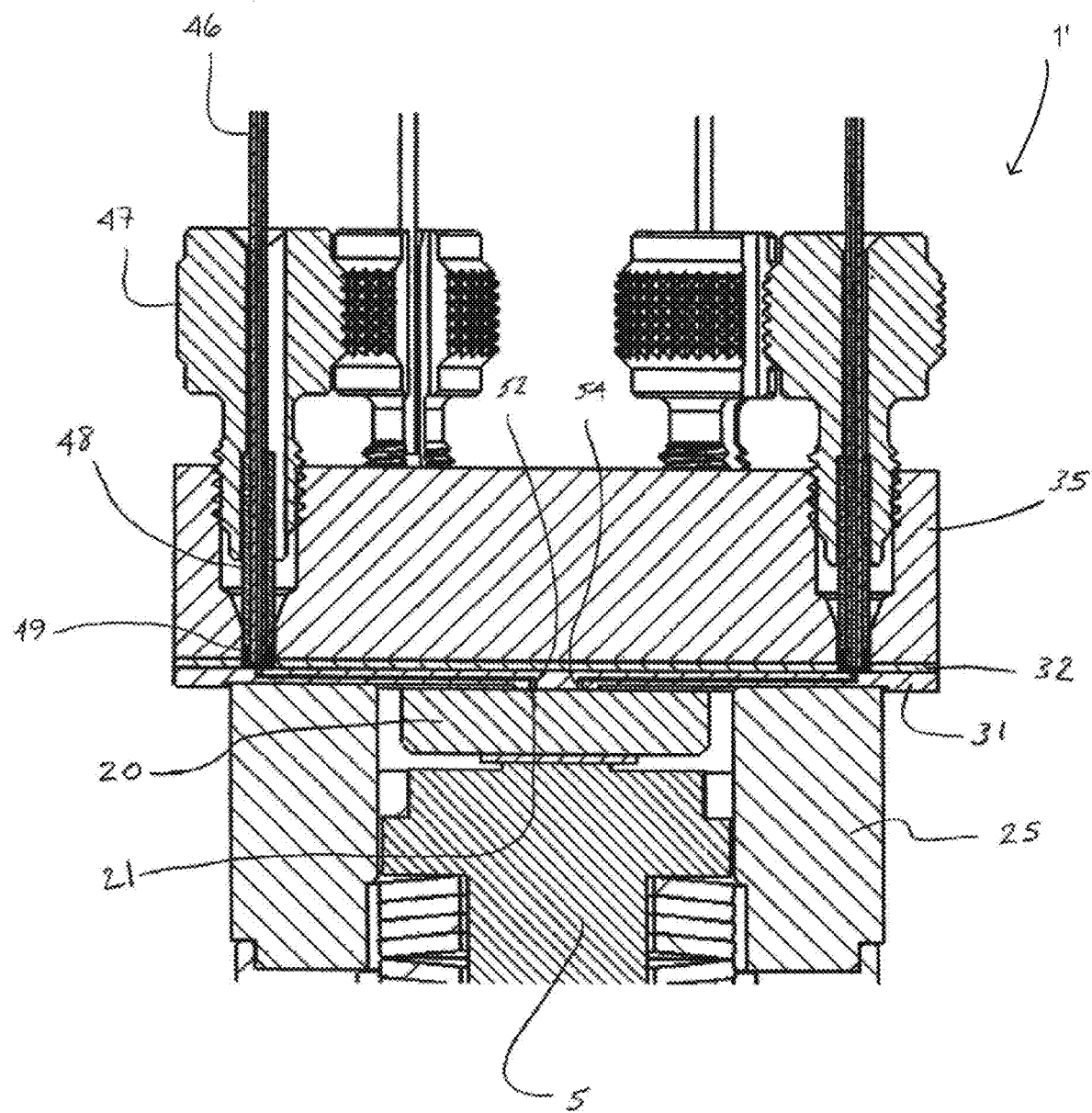
FIG. 4 is a partial cross-sectional view of a valve in another embodiment in accordance with the present disclosure.

Referring now to FIG. 4, an alternative embodiment of valve 1' is shown. (It is noted that for the convenience of the reader, like components and features in various drawings have the same numbers.) The valve 1' includes a mounting device 35 and is shown with four tubes 46 connected to four ports therein. The valve 1' further has a rotor shaft 5 and a rotor seal 20. Instead of the stator plate 30 shown in FIGS. 1-3, the valve 1' in FIG. 4 has a guide layer 32 and a bottom stator face 31. The guide layer 32 provides a guide surface to help guide the tip of the tubing 46 into the guide layer 32 and into contact with the top surface of the bottom stator face 31.

Figure 5:
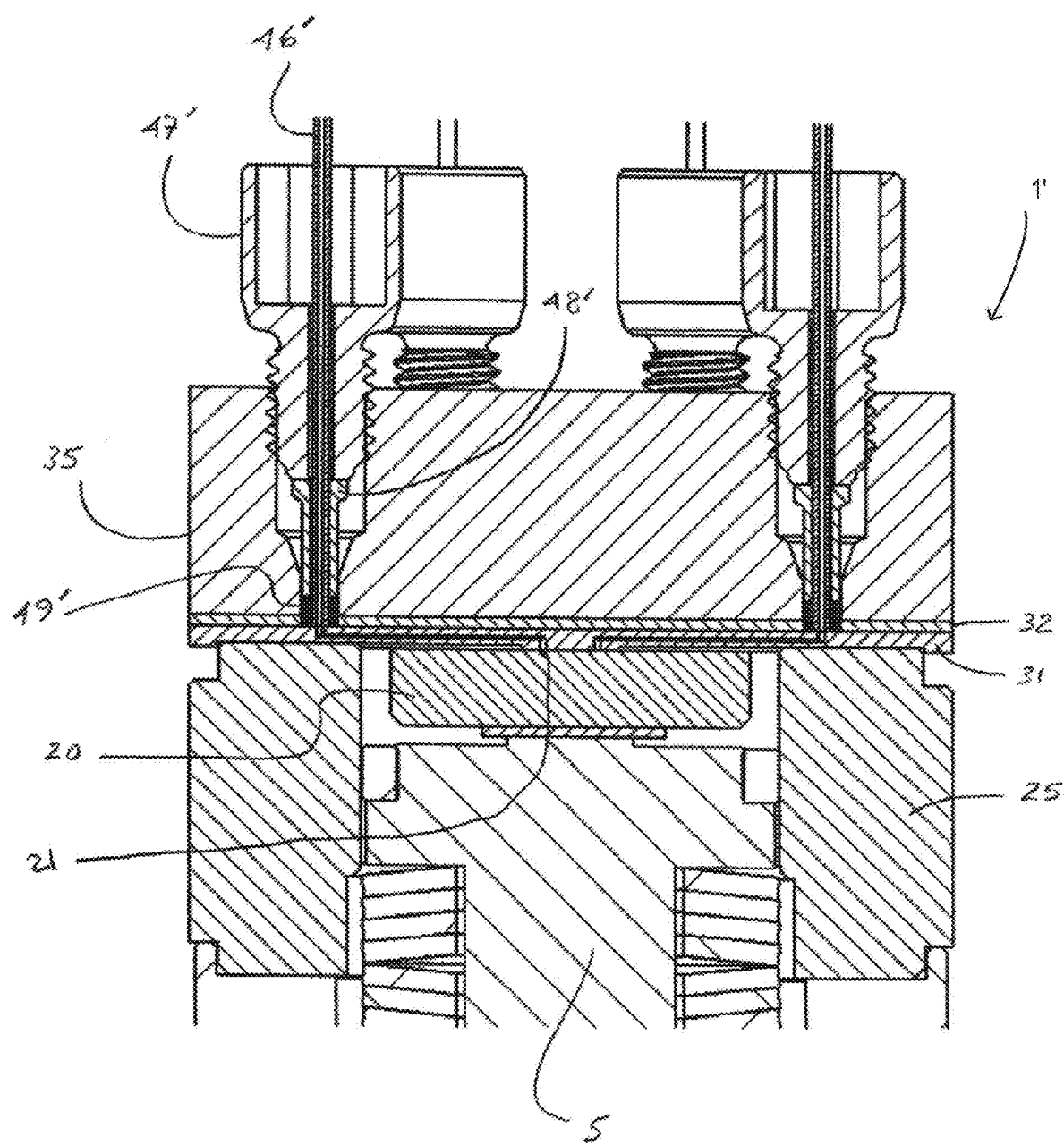
FIG. 5 is a partial cross-sectional view of a valve in another embodiment in accordance with the present disclosure.

In FIG. 5, the valve 1' is shown. However, in FIG. 5, the tubing 46', nut 47', sealing tip 49' and sleeve 48' are provided. Thus, FIG. 5 illustrates an alternative embodiment in which an alternative fitting assembly may be used, even though no change to the mounting device 35, guide layer 32 or bottom stator face 31 (or other components) of valve 1' is indicated. A commercially available fitting assembly like that shown in FIG. 5 can be provided by the VIPER brand fitting assembly from Dionex Corporation of Sunnyvale, Calif.

Figure 6:
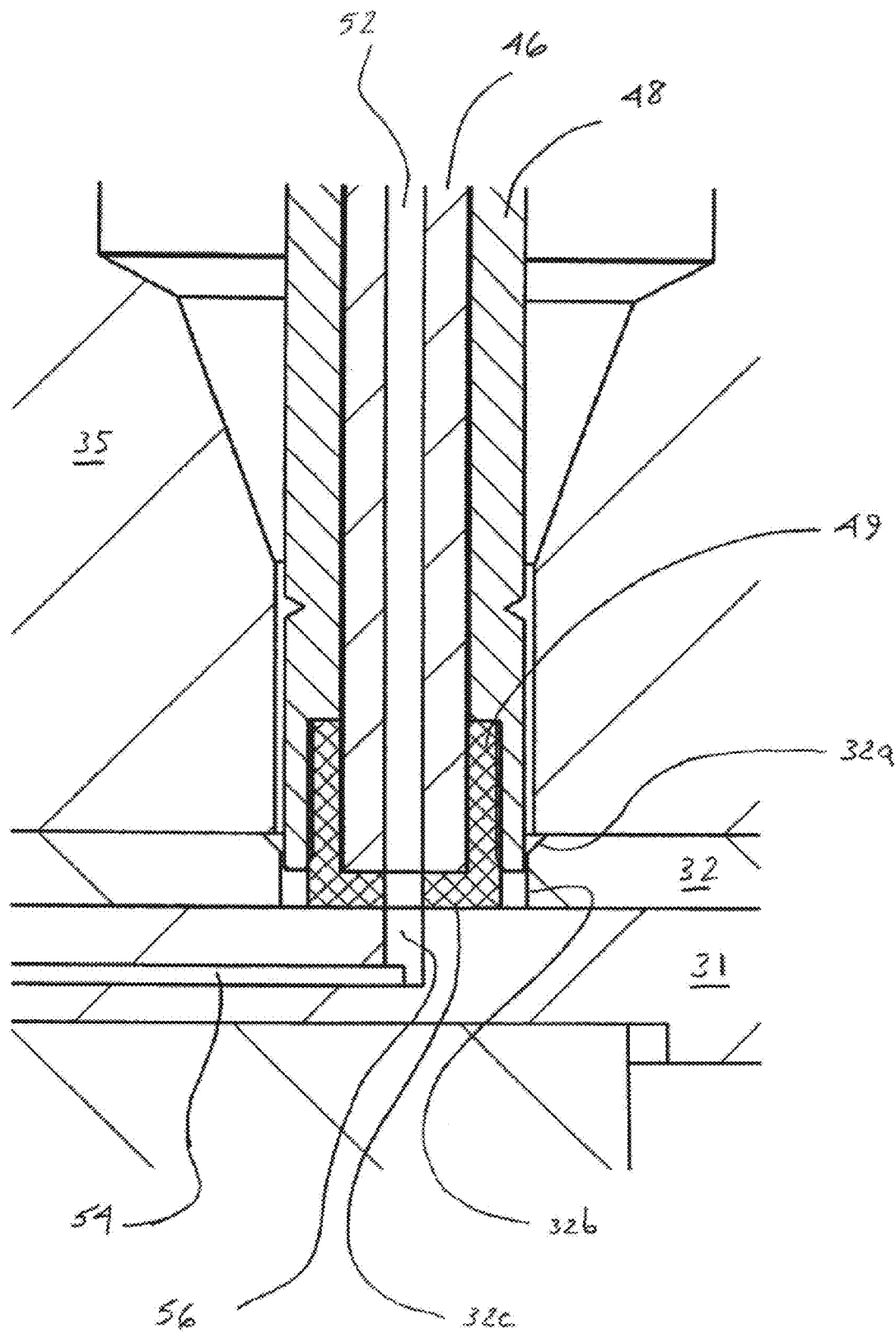
FIG. 6 is a partial cross-sectional view of a valve in another embodiment in accordance with the present disclosure.

FIG. 6 provides a partial cross-sectional view of the interface between the mounting device 35, the guide layer 32, and the bottom stator face 31. As shown in FIG. 6, tubing 46 with a central fluid passageway 52 is shown located within a passageway through sleeve 48. At the bottom end of the tube 46, a sealing tip 49 is provided, with a bottom portion of the sleeve 48 surrounding the bottom outer surface portion of the sealing tip 49. As also shown in FIG. 6, the bottom end surface of the sealing tip 49 is in contact with the top surface of the guide layer 32. The guide layer 32 has an opening 32b therein that may be adapted to snugly receive therein at least a portion of the bottom of the tube 46, sleeve 48, and sealing tip 49. In addition, the opening 32b in the guide layer 32 may have a portion 32a that has a wider inner diameter than the bottom portion of the opening 32b. The portion 32a, which may be frustoconical in shape, may help align the combination of the sealing tip 49, sleeve 48, and tube 46 so that the passageway 52 of the tube 46 is in acceptable alignment with the opening 32b in the bottom stator face 31.

Figure 7:
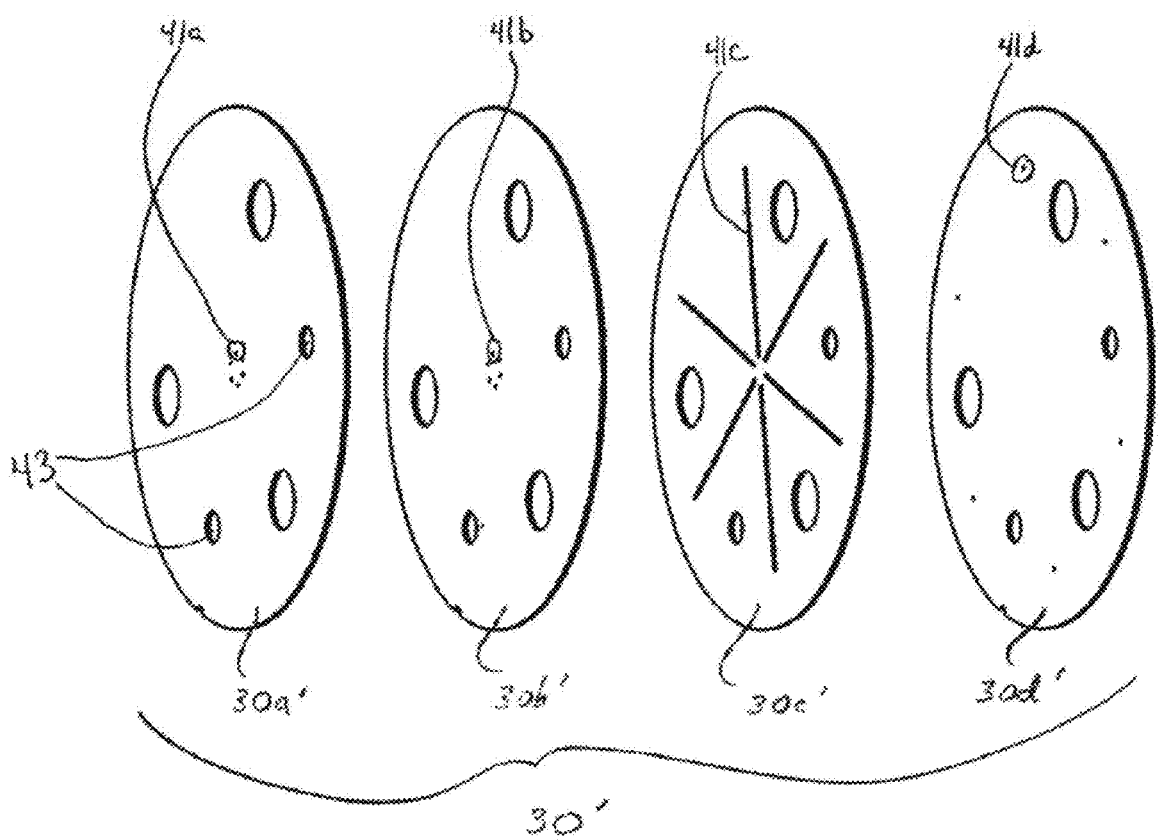
FIG. 7 is an exploded perspective view of the portions of a stator plate in another embodiment in accordance with the present disclosure.

Turning now to FIG. 7, an exploded perspective view of a series of layers 30a', 30b', 30c' and 30d' are shown, which together can form stator plate 30'. In FIG. 7, it can be seen that layer 30a' has an opening 41a, which is one of six openings that are located in a circular pattern proximal the center of the layer 30a'. Also shown in FIG. 7 with respect to layer 30a' are two openings 43, through which location pins (not shown) are located when the valve is assembled. It can be seen that each of layers 30b', 30c', and 30d' has openings that correspond to and align with the openings 43 of the layer 30a'. In addition, (and among the other openings and fluid pathways shown in FIG. 7) layer 30b' has an opening 41b, layer 41c has a pathway 41c, and layer 30d' has an opening 41d. It will be appreciated from FIG. 7 that openings 41a, 41b, the ends of pathway 41c, and opening 41d, respectively, are aligned and correspond to one another, thus providing a fluid pathway therebetween. It is noted that, although not described in detail for purposes of brevity, the other openings and channels shown in FIG. 7 may be aligned and may correspond to respective openings and at least one channel in layers 30a', 30b', 30c', and 30d'.

Figure 8:
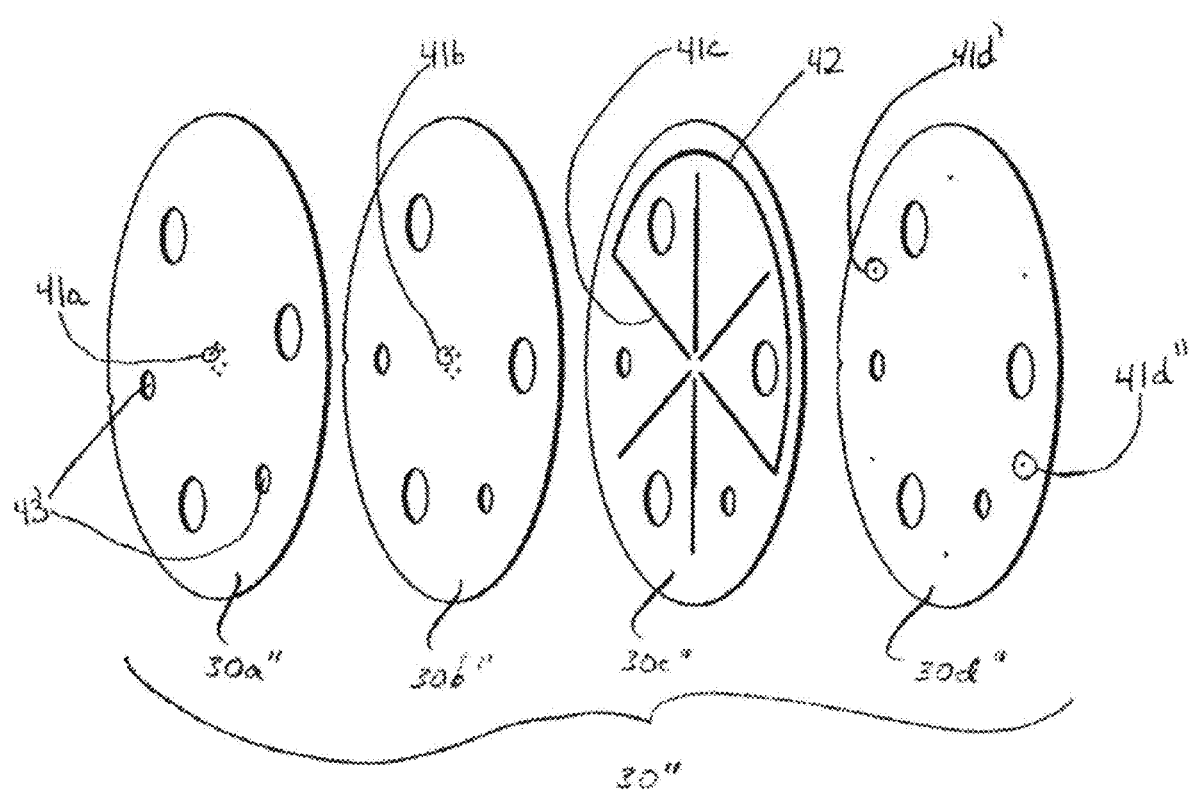
FIG. 8 is an exploded perspective view of the portions of a stator plate in another embodiment in accordance with the present disclosure.

In FIG. 8, an alternative stator plate 30" is shown in an exploded perspective view. The stator plate 30" includes layers 30a", 30b", 30c", and 30d". In this particular embodiment, the main difference between stator plate 30" and the embodiment of stator plate 30' shown in FIG. 7 is that the stator plate 30" includes a layer 30c" in which grooves or fluid pathways are shown in a different configuration from that shown in FIG. 7. In FIG. 8, it can be seen that layer 30a" has an opening 41a', which is one of six openings that are located in a circular pattern proximal the center of the layer 30a". Also shown in FIG. 8 with respect to layer 30a" are two openings 43', through which location pins (not shown) are located when the valve is assembled. It can be seen that each of layers 30b", 30c", and 30d" has openings that correspond to and align with the openings 43' of the layer 30a". In addition, (and among the other openings and fluid pathways shown in FIG. 8) layer 30b" has an opening 41b', layer 41c' has a pathway 41c', and layer 30d" has an opening 41d'. In addition, layer 30c" has a sample loop 42 provided by a channel connecting channel 41c' with a corresponding channel opposite thereto. It will be appreciated from FIG. 8 that openings 41a', 41b', the ends of pathway 41c' and sample loop 42, and openings 41d' and 41d", respectively, are aligned and correspond to one another, thus providing a fluid pathway therebetween. It is noted that, although not described in detail for purposes of brevity, the other openings and channels shown in FIG. 8 may be aligned and may correspond to respective openings and at least one channel in layers 30a", 30b", 30c", and 30d".

Figure 9:
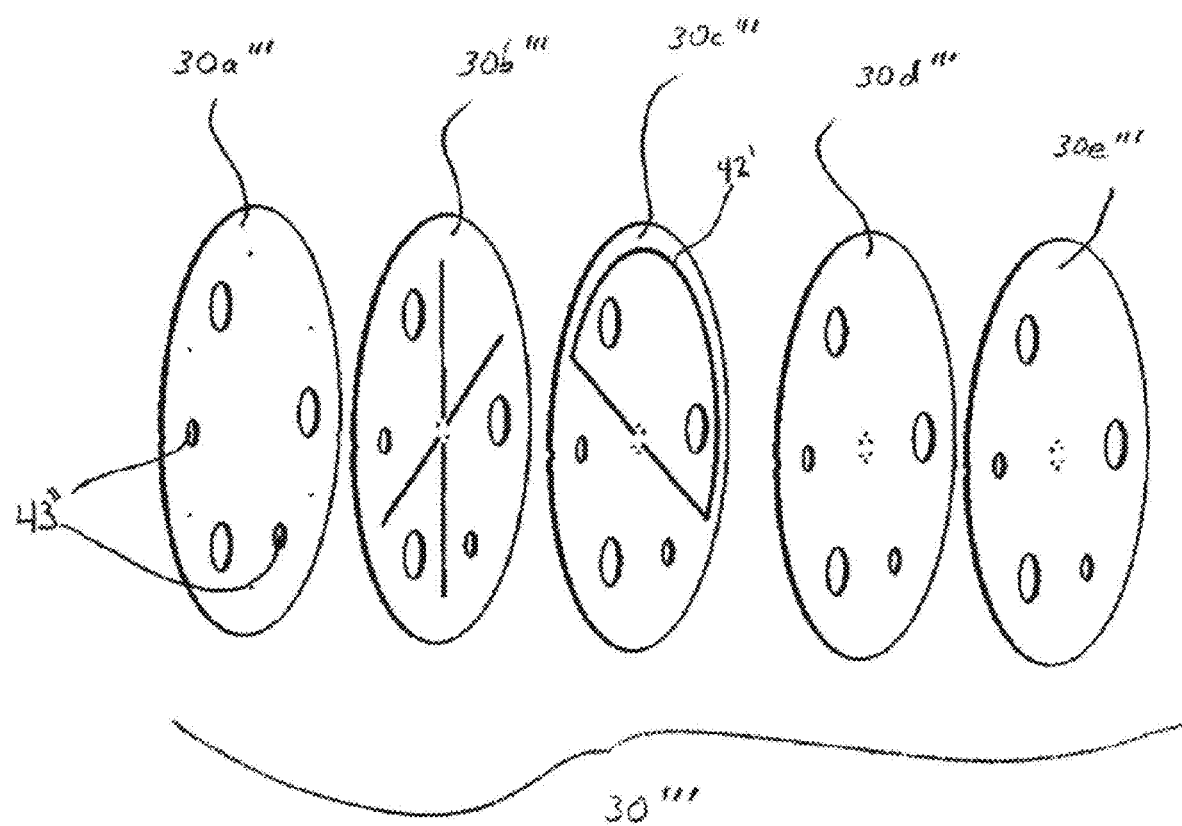
FIG. 9 is an exploded perspective view of the portions of a stator plate in another embodiment in accordance with the present disclosure.

FIG. 9 provides yet another alternative embodiment of a stator plate 30''' in an exploded perspective view. In FIG. 9, a stator plate 30''' is shown including five pieces or slices 30a''', 30b''', 30c''', 30d''', and 30e'''. Also shown in FIG. 9 with respect to layer 30a''' are two openings 43", through which location pins (not shown) are located when the valve is assembled. It can be seen that each of layers 30b''', 30c''', and 30d''' has openings that correspond to and align with the openings 43" of the layer 30a'''. As shown in FIG. 9, the pieces 30b''' and 30c''' provide different fluid pathway configurations than those shown and provided by the stator plate 30' or the stator plate 30" shown in FIGS. 7 and 8, respectively, including among other things a sample loop 42' in layer 30c'''. It is noted that features such as but not limited to sample loops may have different sizes, lengths, patters, and volumes, among other things, as may be desired for a given application, and that there may be other configurations of the fluid pathways and fluid connections that can be provided with a stator plate 30 beyond the various particular embodiments shown in FIGS. 7-9, for example.

Figure 10:
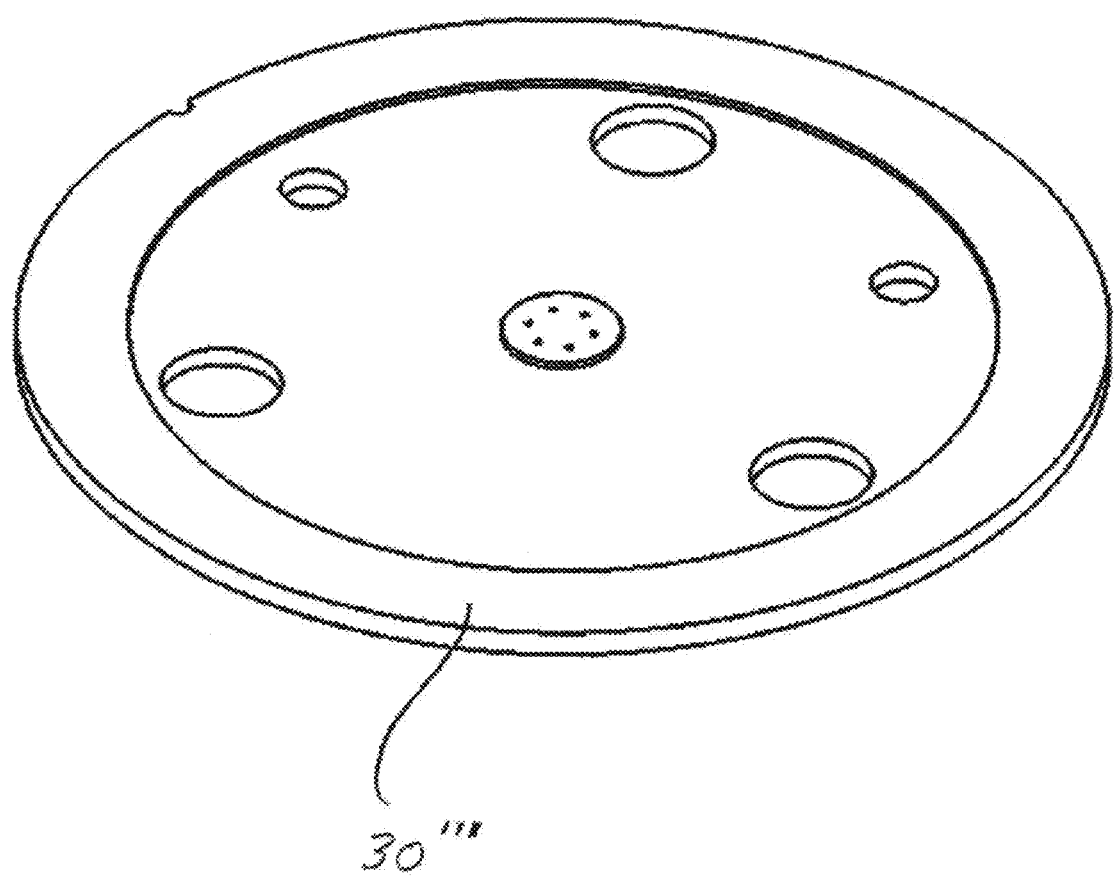
FIG. 10 is a perspective view of a stator plate in an embodiment in accordance with the present disclosure.

The different layers 30a''', 30b''', 30c''', 30d''', and 30e''', for example, can be attached and combined into a single stator plate 30''' (such as shown in FIG. 10) by diffusion bonding. The plurality of holes in each of the layers and also the grooves or fluid pathways in each of the layers 30b''' and 30c''', for example, can be etched into the layers so that the holes and grooves or pathways are very precisely located and of very precise sizes and shapes. The stator plate 30''' shown in FIG. 10 further includes an annular ring shape with a thicker width than the interior portion of the stator plate 30'''. Such an annular ring shape can be obtained by machining or etching the combination of the layers 30a''', 30b''', 30c''', 30d''', and 30e''' into the stator plate 30'''.

If layers 30a''', 30b''', 30c''', 30d''', and 30e''' are made of a metal, such as titanium or any of the metals or alloys noted above, such layers 30a'''-30e''' can be bonded together by diffusion bonding. Diffusion bonding techniques that may be appropriate for bonding layers 30a'''-30e''' together are described in U.S. Published Patent Application No. 2010/0171055 A1, published on Jul. 8, 2010, and entitled "Liquid-Chromatography Apparatus Having Diffusion-Bonded Titanium Components," which is hereby incorporated by reference herein as if fully set forth herein. Among other things, U.S. Published Patent Application No. 2010/0171055 A1 describes a stator assembly for a valve having layers diffusion bonded together and having a mounting assembly with ports therein diffusion bonded to a combination of several layers that themselves may be diffusion bonded together.

Layers 30a'''-30e''' may be made from another material besides metal, and may instead comprise ceramic materials. In particular layers 30a'''-30e''' may comprise layers of the same or different ceramic materials. At least some of the various layers may be diffusion bonded together or attached using other means. One approach for making stator plate 30''' involves machining two of the layers, each made of sintered ceramic materials, and then bonding these two layers together with a green sheet ceramic layer sandwiched in between. After relatively low temperature sintering, the sandwiched green sheet layer may bond the two other layers together. Alternatively, high temperature co-fired ceramic layers may be used to provide the stator plate. More detail about techniques for bonding or attaching ceramic layers to one another that may be used for ceramic layers 30a'''-30e''' include those described in U.S. Published Patent Application No. 2009/0321356 A1, which was published on Dec. 31, 2009, and is entitled "Ceramic-Based Chromatography Apparatus and Methods for Making Same," and is hereby incorporated by reference as if fully set forth herein. U.S. Published Patent Application No. 2009/0321356 A1 describes methods and techniques for using ceramic-based tape, referred to as "green sheet" or "green-sheet tape," and further describe the use of ceramic materials such as glass, zirconia, and alumina. It is noted that at least some of layers 30a'''-30e''' may be made of various materials and may be manufactured with the methods and use of green sheet as described in more detail in U.S. Patent Application No. 2009/0321356 A1. It is also noted that the foregoing discussion with respect to layers 30a'''-30e''' applies equally to layers 30a'-30d' for stator plate 30', and to layers 30a''-30d'' for stator plate 30''.

Figure 11:
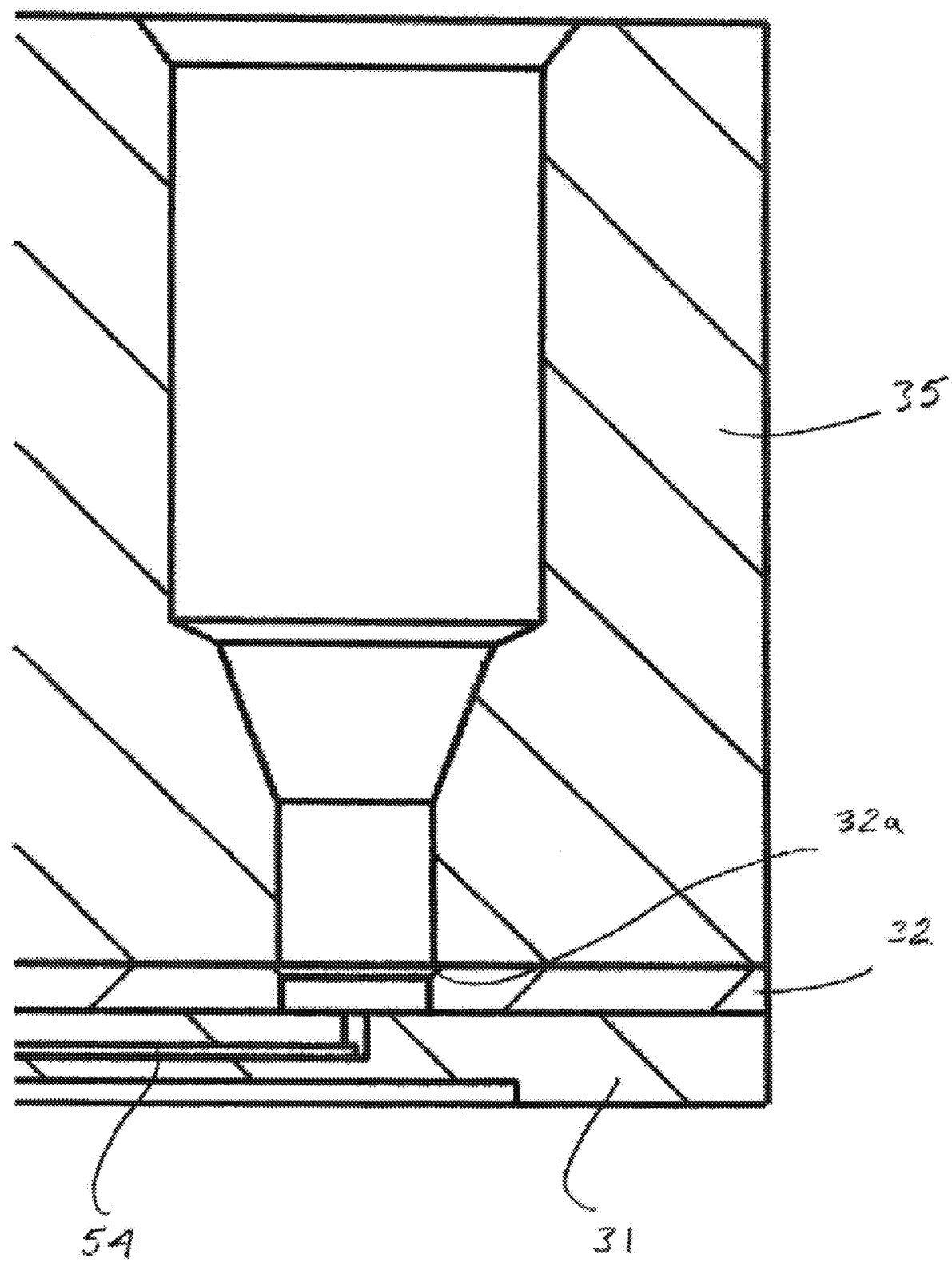
FIG. 11 is a cross-sectional view of a stator plate and mounting device in an embodiment in accordance with the present disclosure.

FIG. 11 provides a partial cross-sectional view of an embodiment of a mounting device 35 with a guide layer 32 and a bottom stator face 31. In this particular embodiment, the port of the mounting device 35 is adapted to sealingly and removably receive and hold a fitting assembly with a ferrule, a nut, and tubing through the nut and ferrule (such as shown in FIG. 6). Also shown in FIG. 11 is a tapered portion 32a of the guide layer 32. As shown in FIG. 6, the tapered portion 32a can be a tapered, angular portion at the top side of a port in the guide layer 32 and may be adjacent to a bottom side of the mounting device 35. The tapered portion 32a may be useful in guiding an end of a tubing or fitting assembly (not shown in FIG. 11) into the port of the guide layer 32 and helping to align the tubing in the guide layer 32 to better obtain laminar flow and avoid turbulent flow.

Figure 12:
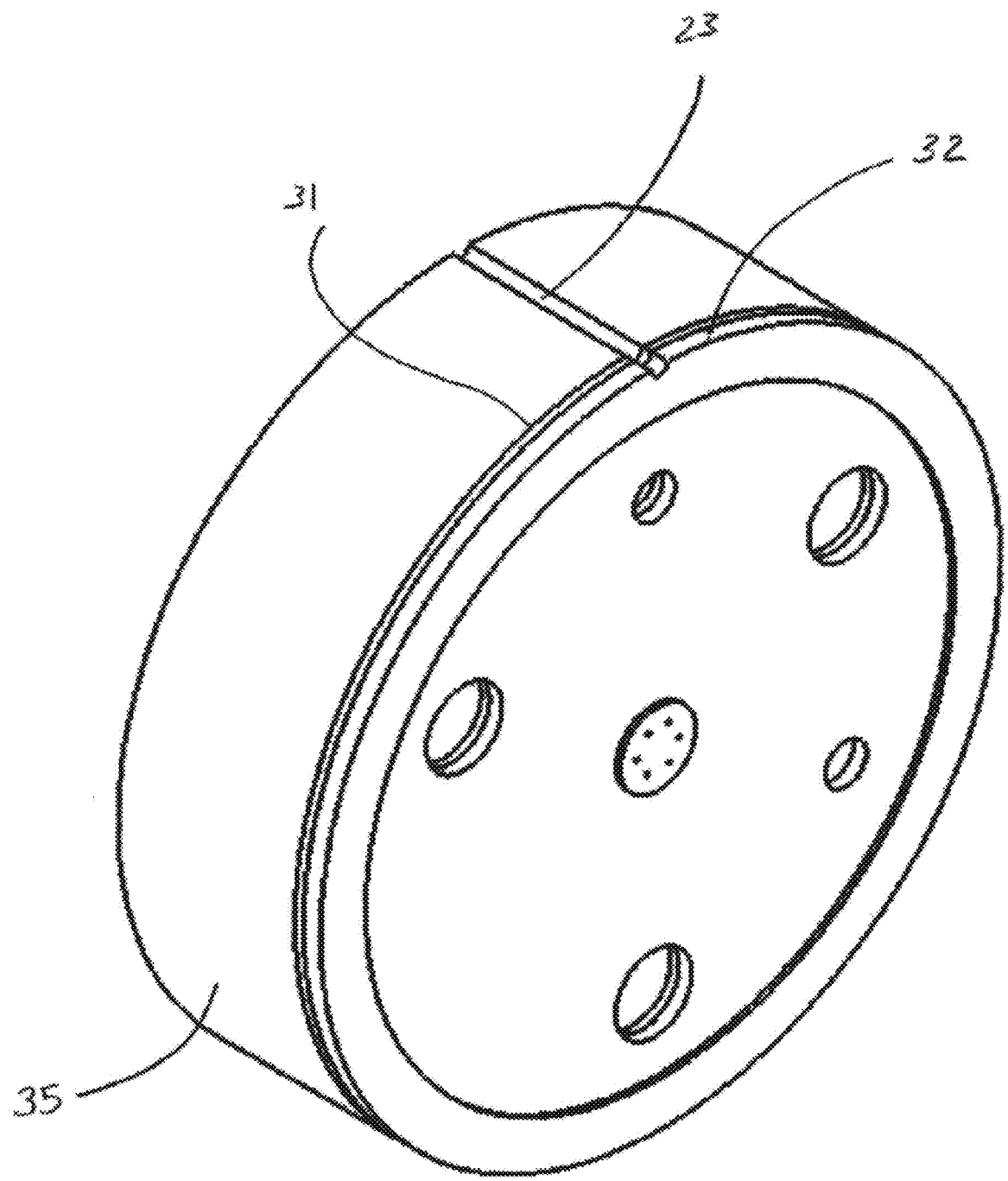
FIG. 12 is a perspective view of a stator plate and mounting device in an embodiment in accordance with the present disclosure.

FIG. 12 provides a perspective view of the stator plate 30, which in the embodiment shown in FIG. 12 has a guide layer 32 and a bottom stator face 31, as well as the mounting device 35. Shown more clearly in FIG. 12 is a groove 23, which extends longitudinally through each of the guide layer 32, the bottom stator face 31, and the stator ring 25, and along the exterior edge of each. The groove 23 is useful for quick and easy alignment of the different components during manufacture and assembly.

Figure 13:
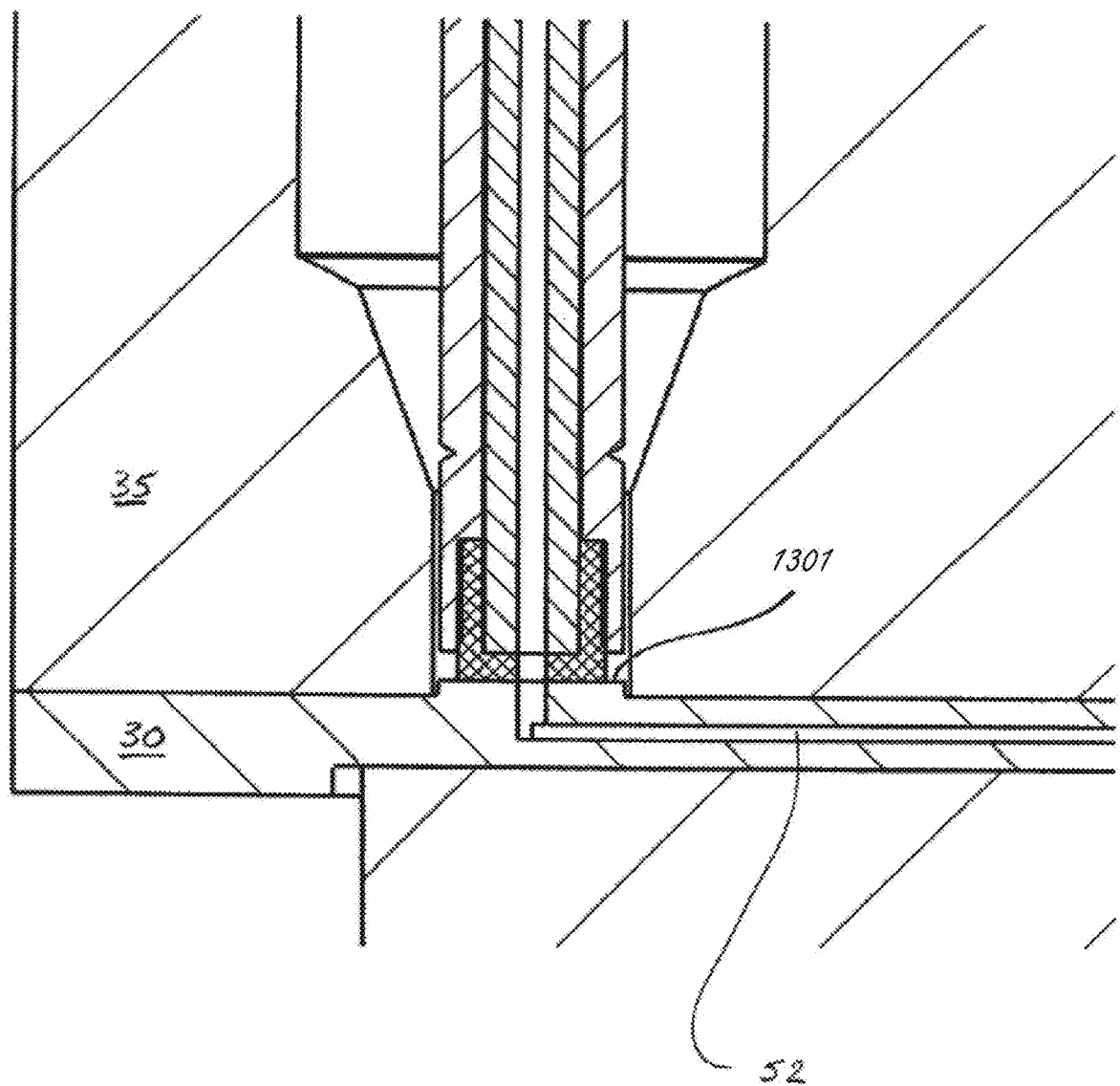
FIG. 13 is a cross-sectional view of a stator plate and mounting device in another embodiment in accordance with the present disclosure.

FIG. 13 includes a partial cross-sectional view showing yet another alternative embodiment. In FIG. 13, the stator plate 30 includes a boss 1301, which is adapted to extend upwardly from the top surface of the stator plate 30. In addition, the boss 1301 is of a selected shape, size, and location so that, when the stator plate 30 and the mounting device 35 are attached to one another, the boss 1301 extends upwardly from the top surface of the stator plate 30 and provides the bottom surface of the port of the mounting device 35.

Figure 14:
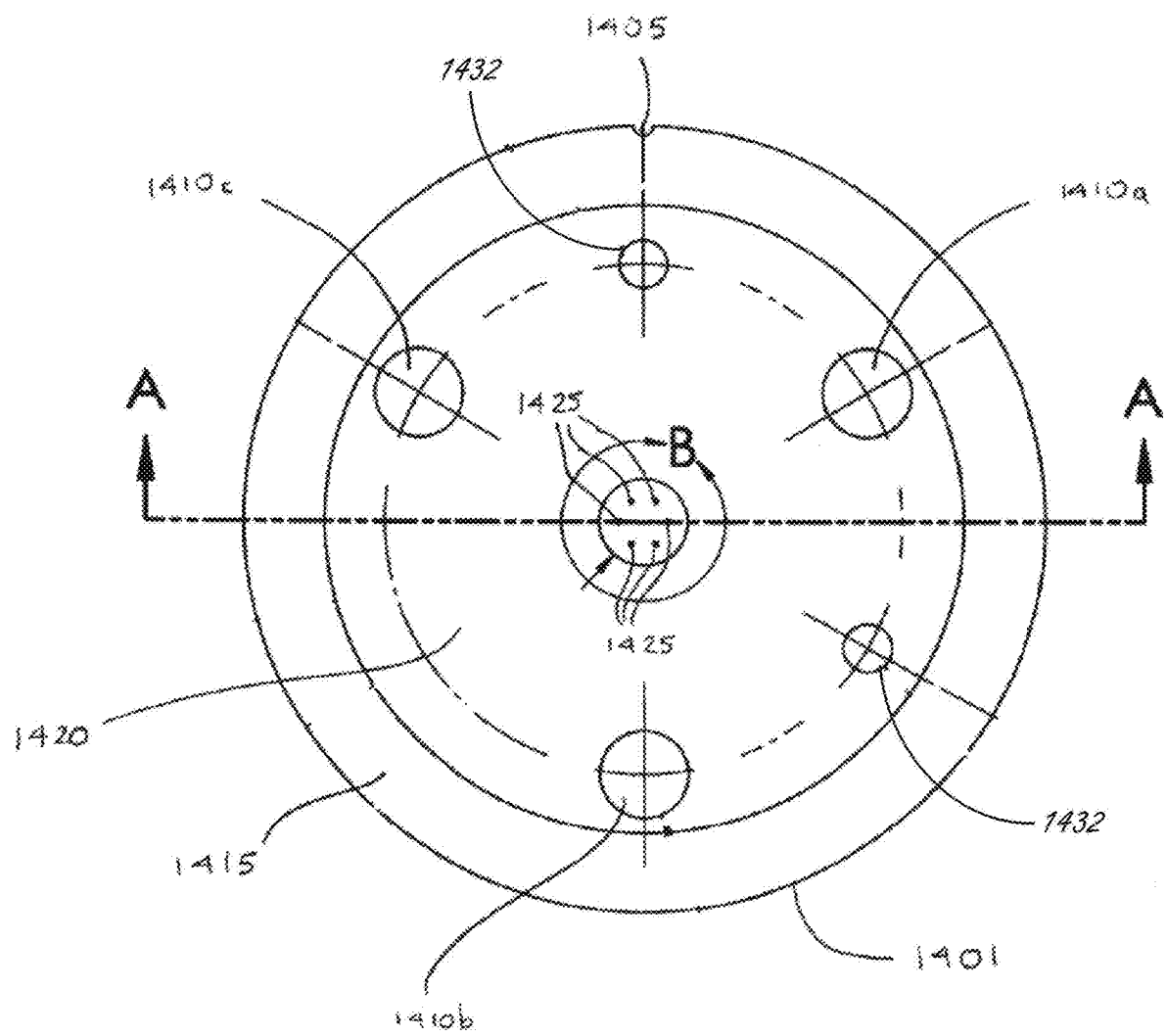
FIG. 14 is a bottom view of a stator plate in accordance with an embodiment of the present disclosure.

FIG. 14 provides a bottom view of a stator plate 1401. As shown in FIG. 14, the stator plate 1401 has three holes 1410a, 1410b, and 1410c, which are adapted to receive a threaded screw or other means for attaching the stator plate 1401. For example, stator plate 1401 may be mounted to a mounting device, to another stator plate, or to a housing of a valve body (see also FIG. 2). It will be appreciated that the stator plate 1401 can be removably attached using the threaded screws (see FIG. 1) that may penetrate holes 1410a-c. In addition, the stator plate 1401 is shown having an outer annular ring 1415, which can have greater thickness than the interior portion 1420 of the stator plate 1401. Located near the center of the stator plate 1401 are six openings 1425, which may be adapted to provide fluid pathways and may be aligned with openings or fluid pathways in a corresponding device or stator plate layer. Also shown in FIG. 14 is a groove or notch 1405 in the outer edge of the stator plate 1401 that is usable for alignment or radial orientation purposes. Also shown in FIG. 14 with respect to stator plate 1401 are two openings 1432, through which location pins (not shown) may be placed when the valve is assembled.

Figure 15:
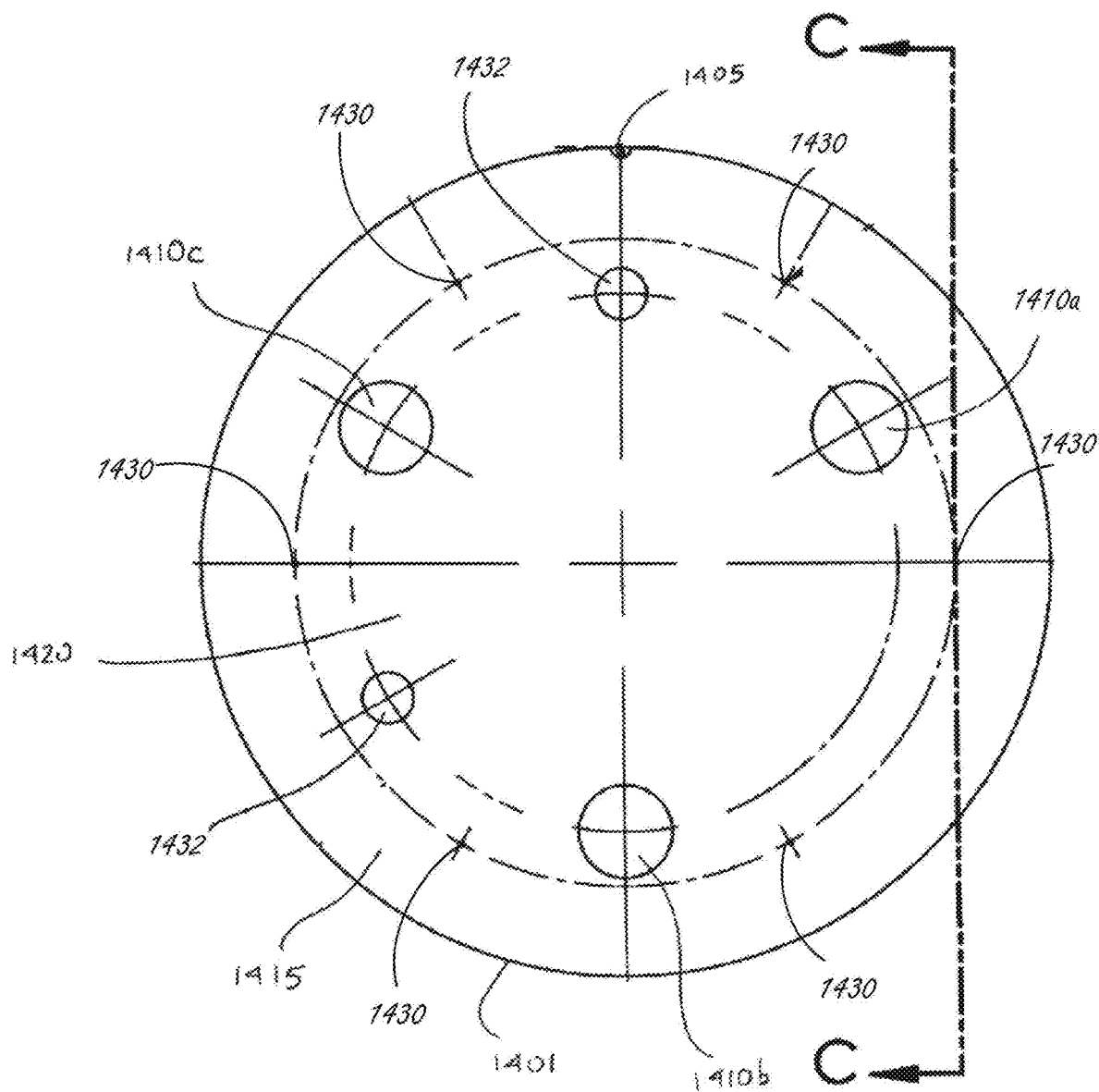
FIG. 15 is a top view of a stator plate in accordance with an embodiment of the present disclosure.

FIG. 15 provides a top view of the stator plate 1401. In FIG. 15, six openings 1430 can be seen in the bottom side of the stator plate 1401 at locations indicated by a cross mark.

Figure 16:
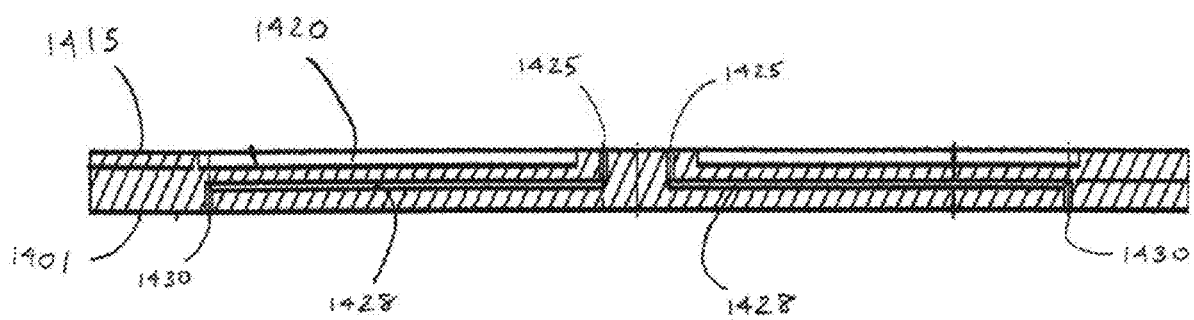
FIG. 16 is a cross-sectional view of a stator plate of FIG. 14 taken along line A-A of stator plate 1401.

Referring to FIG. 16, a cross-sectional view of the stator plate 1401 taken along line A-A of FIG. 14 is provided. FIG. 16 shows the annular outside ring 1415 of the stator plate 1401, as well as the interior portion 1420, openings 1425 and also openings 1430. As can be seen from FIG. 16, the openings 1425 and 1430 are in fluid communication with one another (i.e., each opening 1425 is in fluid communication with an opening 1430 in this view) via fluid pathways 1428.

Figure 17:
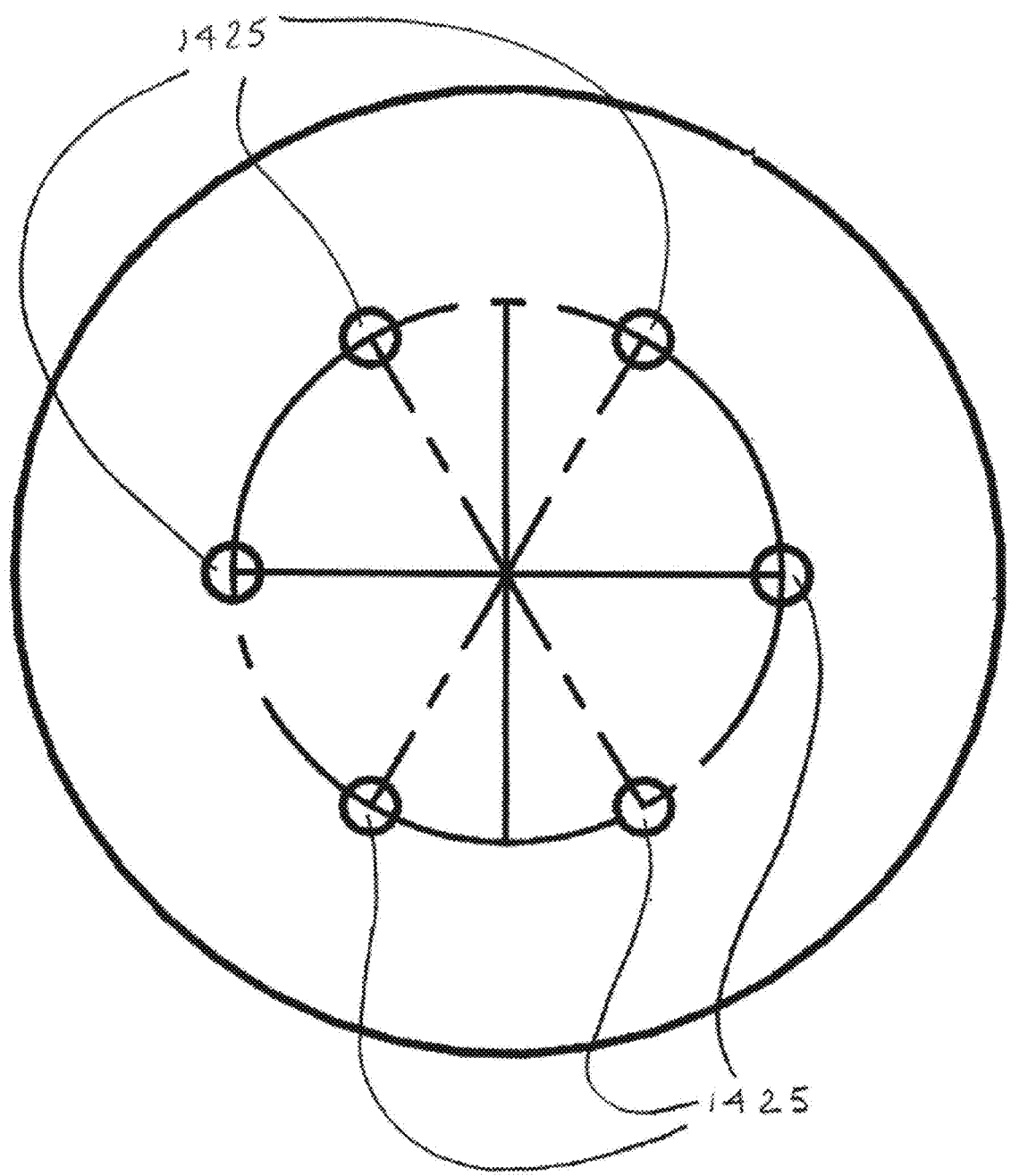
FIG. 17 is a view of a portion B of stator plate 1401 of FIG. 14.

FIG. 17 is a partial view of the detail of B from FIG. 14, showing six openings 1425 more clearly. It is noted that more or fewer than six openings 1425 may be provided by the stator plate 1401.

Figure 18:
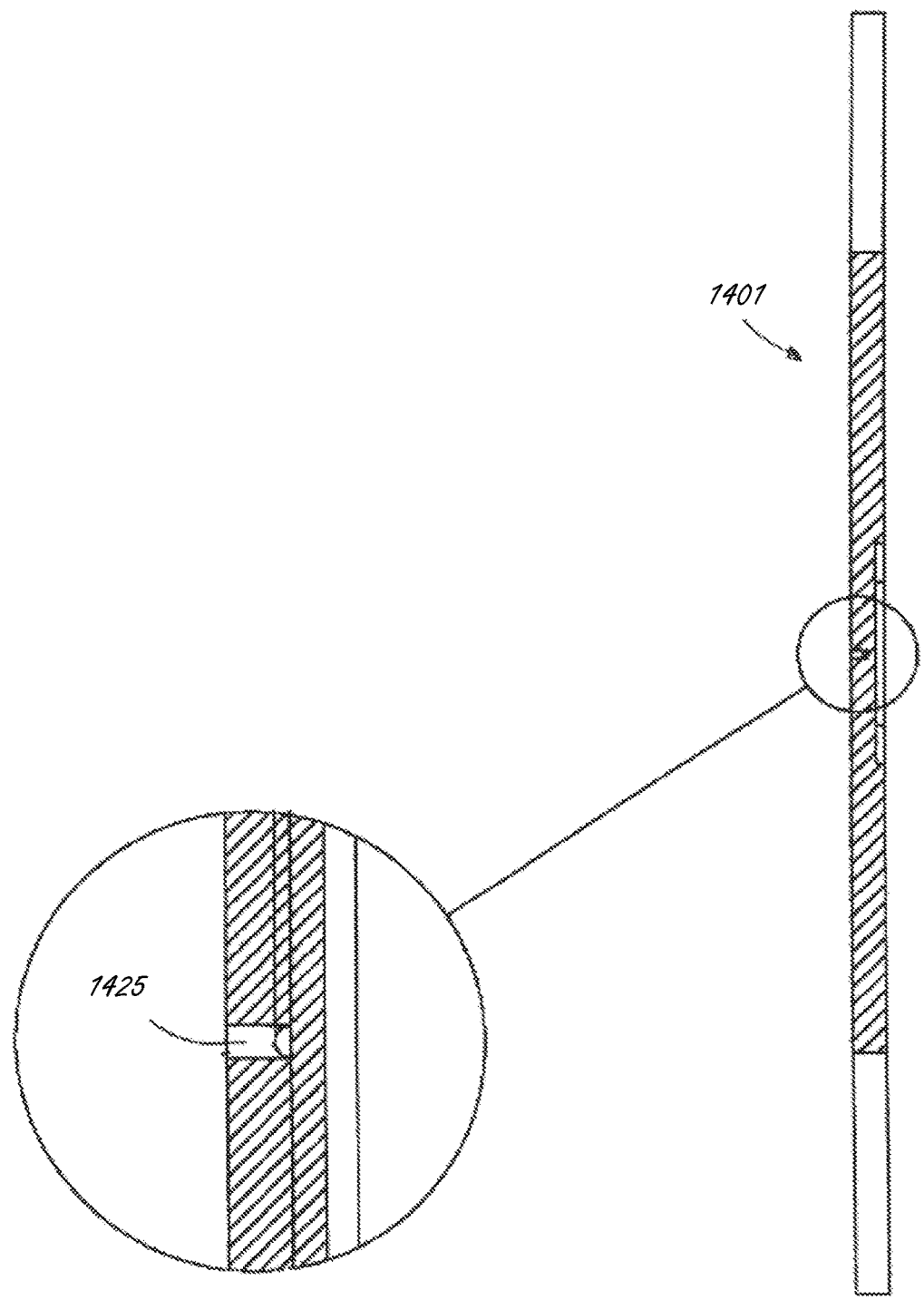
FIG. 18 is a cross-sectional view of a line C-C of stator plate 1401 of FIG. 15.

FIG. 18 provides another cross-sectional view of the stator plate 1401 along line C-C of FIG. 16. In addition, FIG. 18 provides a partial cross-sectional view of the opening 1425.

Referring now to FIGS. 19-23, additional views and details regarding a mounting device 1501 are provided. The same features in FIGS. 19-23 have the same reference numbers for ease of reference.

Figure 19:
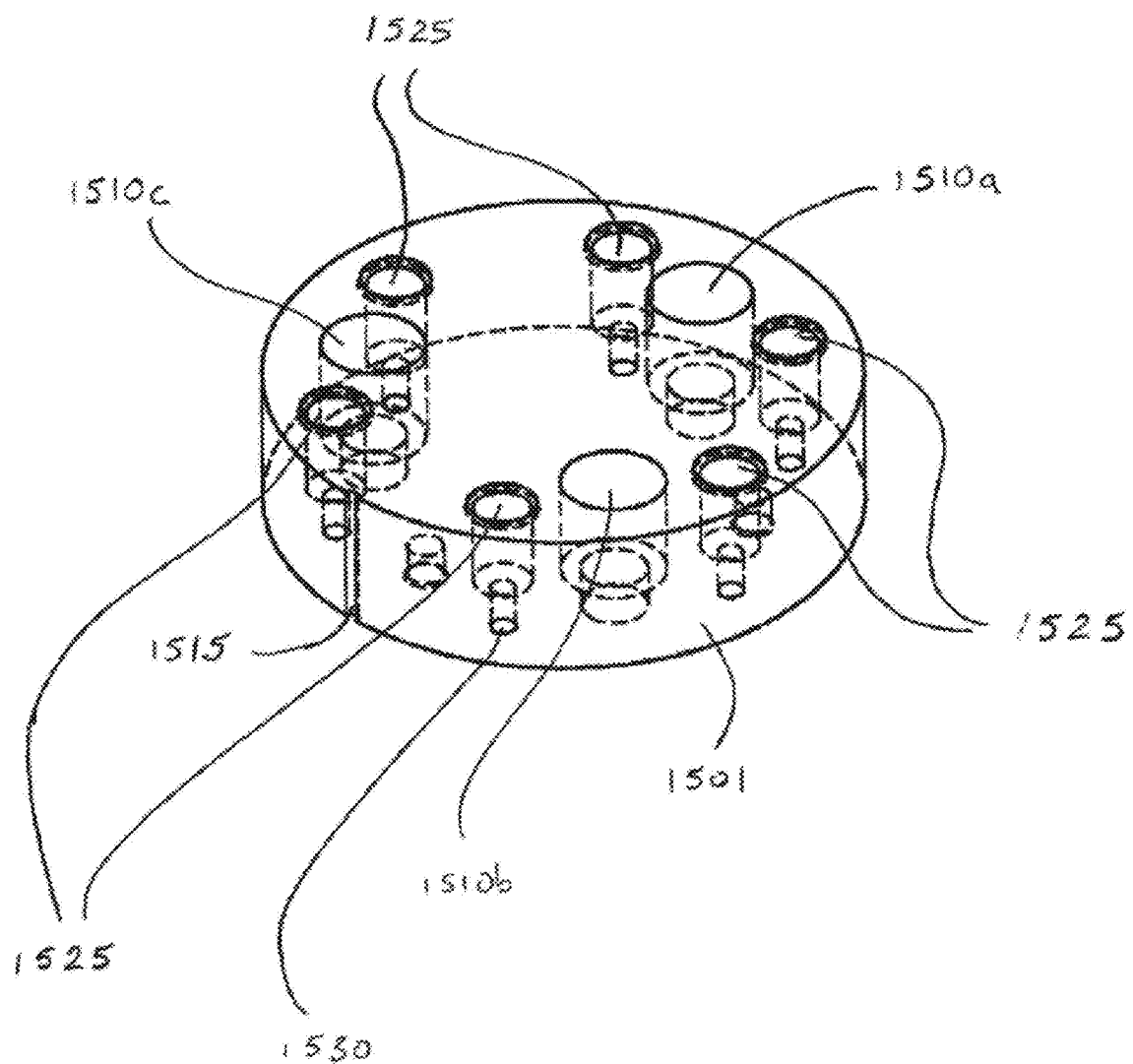
FIG. 19 is an perspective view of a mounting device in an embodiment in accordance with the present disclosure.

In FIG. 19, a perspective view of the mounting device 1501 is provided. Mounting device 1501 has six openings 1525, as well as three openings 1510a, 1510b, and 1510c. In addition, the mounting device 1501 has a groove or notch 1515 in its outer edge for easier and quicker alignment during assembly, with the groove 1515 running longitudinally along the outer edge of the mounting device 1501. It will be appreciated that the three openings 1510a, 1510b, and 1510c are each adapted to removably receive and hold a threaded screw or other fastener (not shown), so that the mounting device 1501 can be removably attached securely to a stator plate and to a valve body (not shown). In addition, it will be appreciated that each of the openings 1525 are adapted to removably receive tubing and a fitting assembly therein. In FIG. 19, the openings 1525 provide ports into which tubing and fitting assemblies may be inserted and securely connected.

Figure 20:
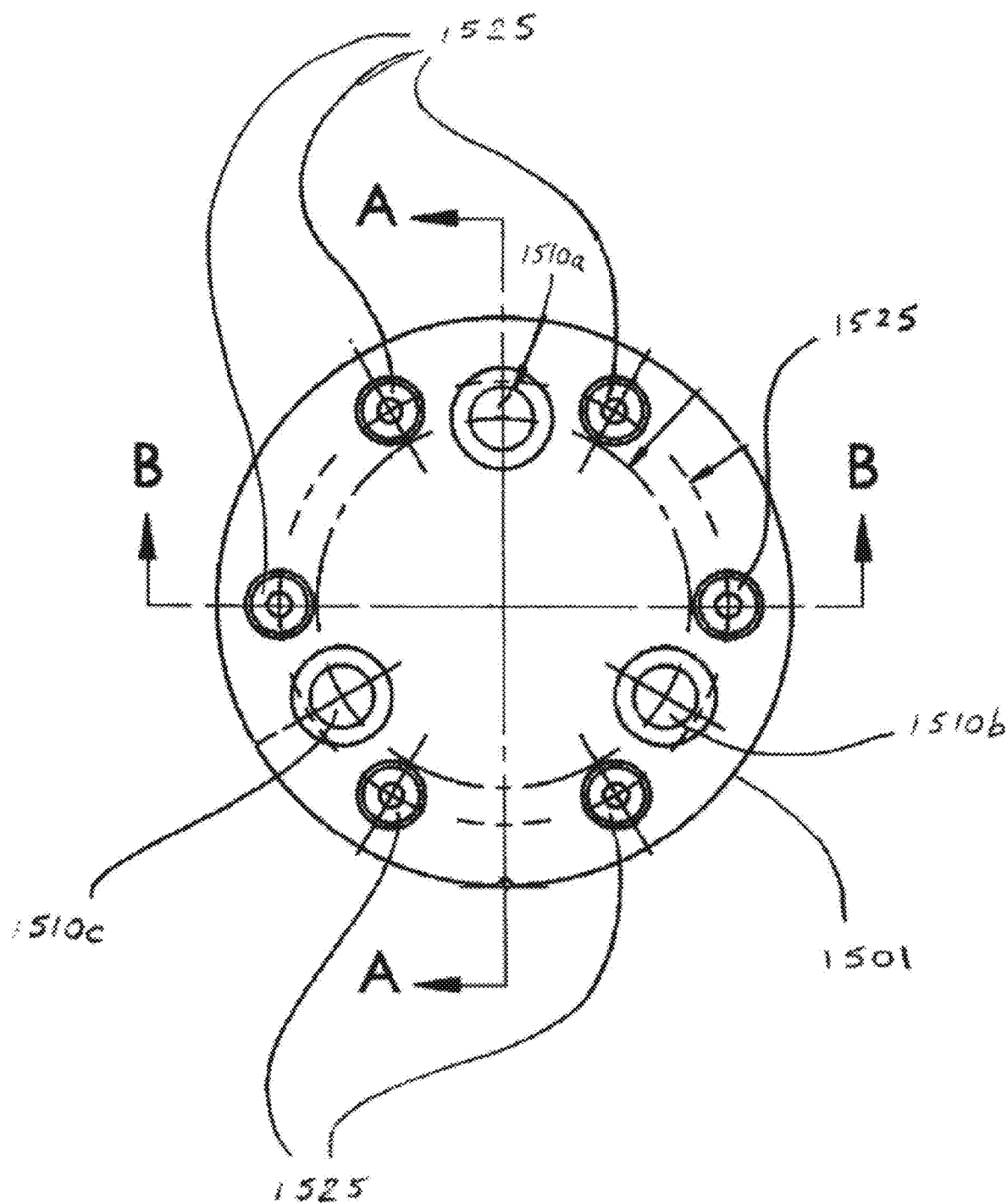
FIG. 20 is a top view of the mounting device of FIG. 19.

FIG. 20 is a top view of the mounting device 1501. Six openings or ports 1525 are shown, as are the three openings 1510a, 1510b, and 1510c for receiving threaded screws or fasteners. It is noted that more or less than six ports 1525 may be provided, and that more or less than three openings for screws or other fasteners 1510a, 1510b, and 1510c may be provided.

Figure 21:
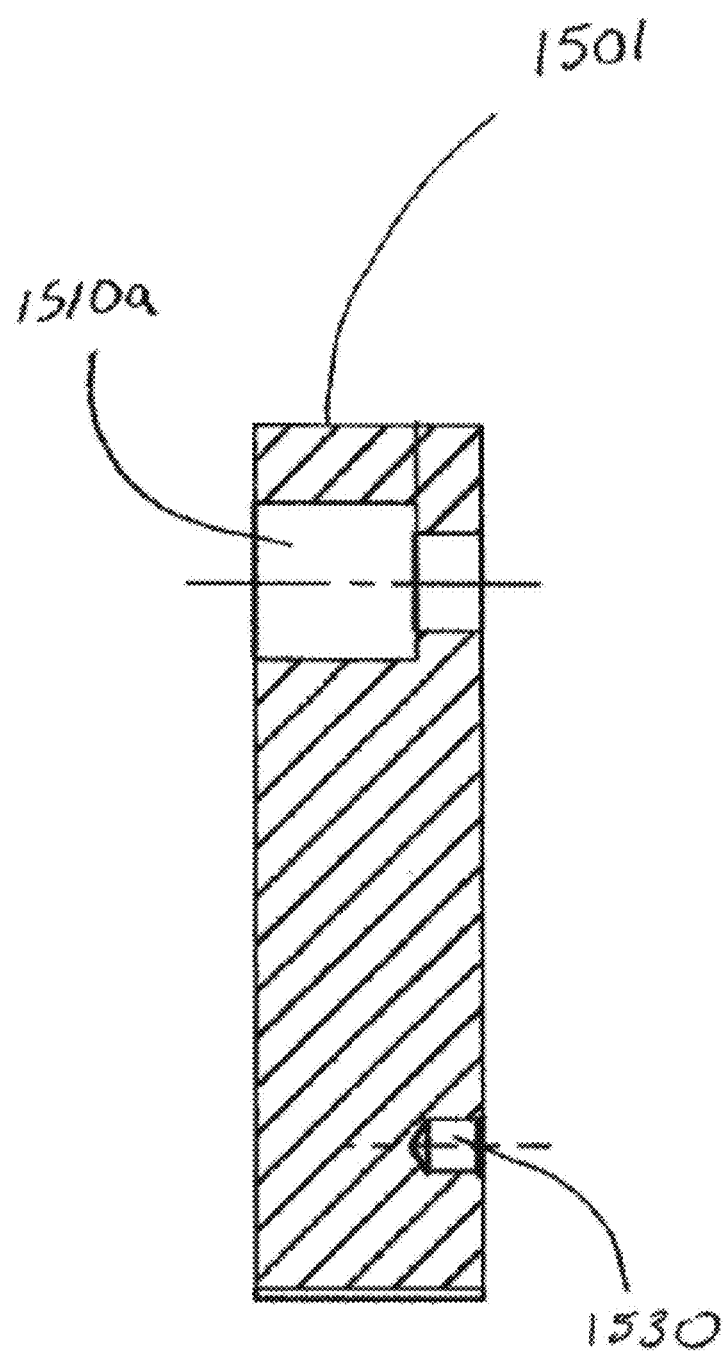
FIG. 21 is a cross-sectional view of a line A-A of mounting device 1501 of FIG. 20.

FIG. 21 is a cross-sectional view of the mounting device 1501 taken along line A-A of FIG. 20. The opening 1510a for receiving and holding a threaded screw or fastener is shown. Also shown is an opening 1530 on the bottom side of the mounting device 1501 to provide the positions for one of the locations pins (not shown). The opening 1530 is adapted to receive and removably hold the tip of one of the location pins (not shown).

Figure 22:
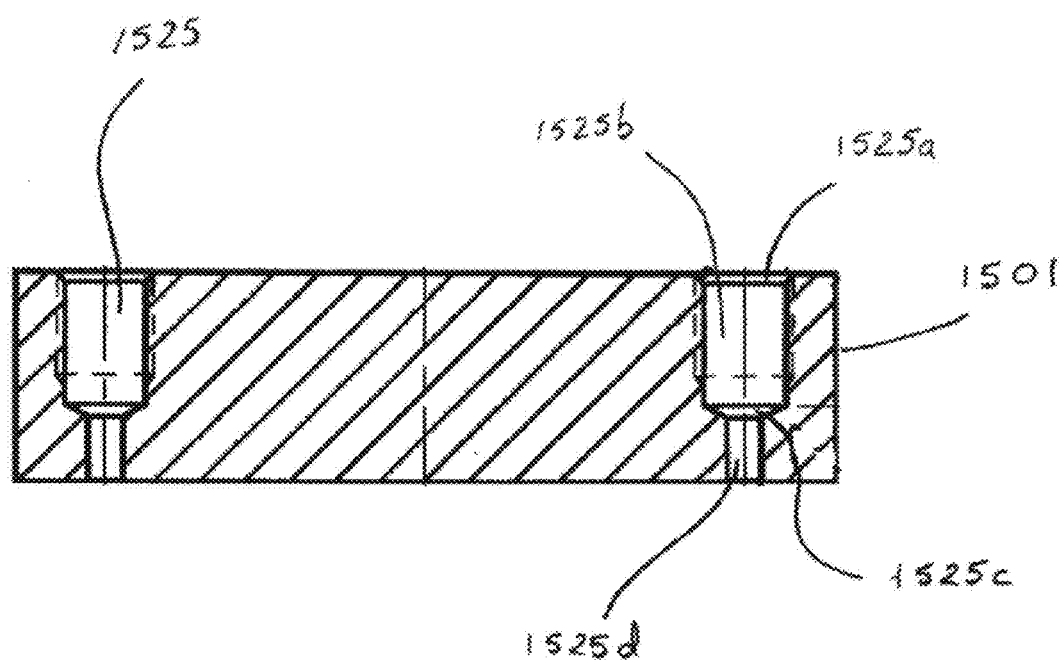
FIG. 22 is a cross-sectional view a line B-B of mounting device 1501 of FIG. 20.

FIG. 22 is a cross-sectional view of the mounting device 1501 taken along line B-B of FIG. 20. In FIG. 22, two openings or ports 1525 are shown. The port 1525 on the right includes reference numerals to indicate the top portion 1525a, the middle portion 1525b, a guide portion 1525c, and a bottom portion 1525d of the port 1525 as it extends from the top of the mounting device 1501 to the bottom of the mounting device 1501.

Figure 23:
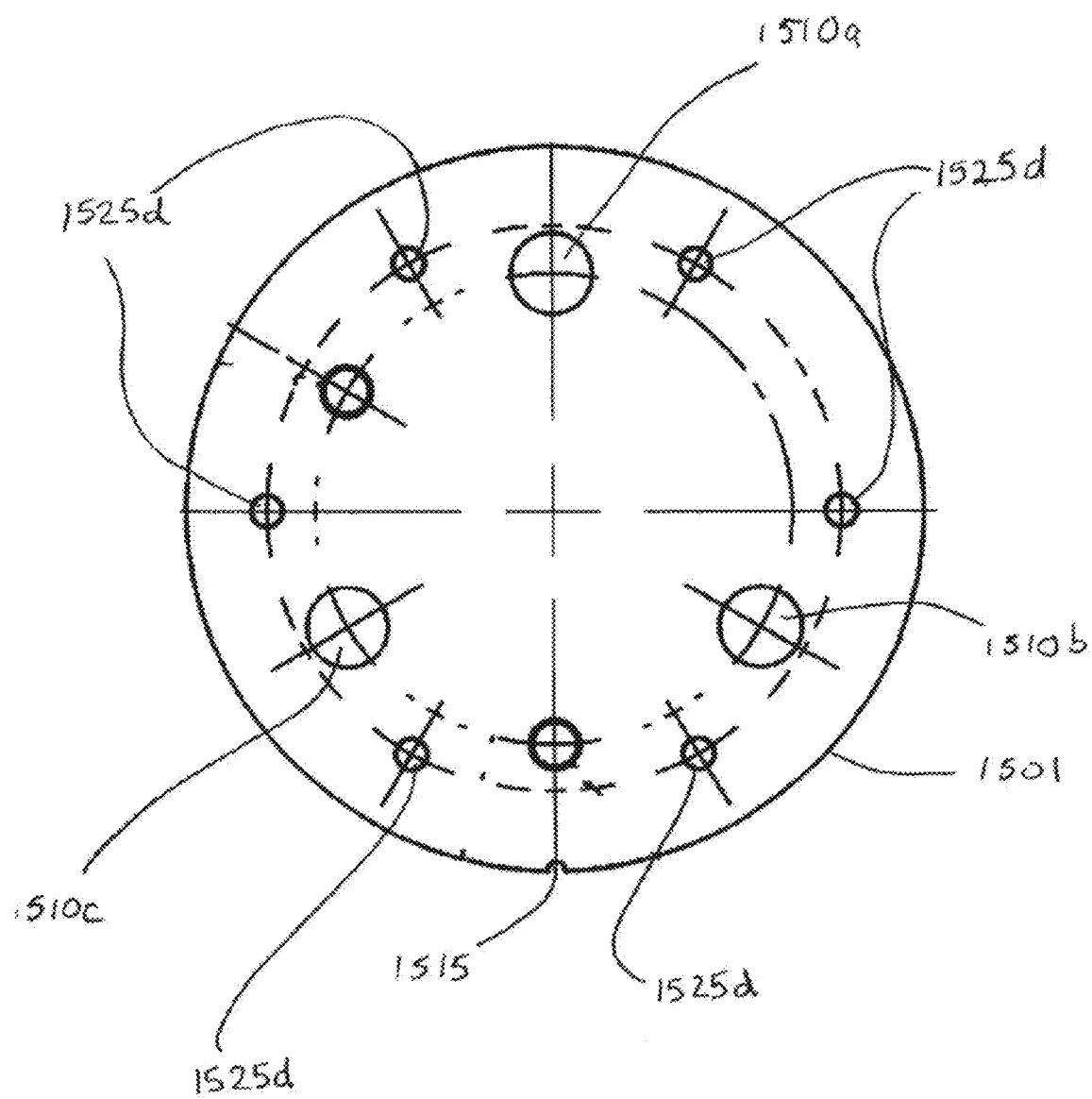
FIG. 23 is a bottom view of the mounting device of FIG. 19.

FIG. 23 provides a bottom view of the bottom face of the mounting device 1501. As shown in FIG. 23, openings 1510a, 1510b, and 1510c extend through the mounting device 1501. In addition, openings 1530 are provided on the bottom face of the mounting device 1501. Finally, the groove 1515 is also shown in FIG. 23.

Those skilled in the art will appreciate that a replaceable stator plate and a separate mounting device like those described above have several advantages over conventional valves. In addition, the mounting device of the present disclosure can be reduced in size from conventional stator heads for conventional valves, thus reducing costs of materials and also expensive machining operations to provide the flow passageways in conventional valves (which passageways are no longer needed with the two-piece assembly of the present disclosure). In addition, the openings of the mounting device can be aligned much more closely with the openings on the first side of the stator plate of the present disclosure, thereby reducing the potential for the introduction of turbulent flow and/or dead volume as is the case for conventional valves. At the same time, however, the openings of the stator plate and the passageways or grooves therein can be precisely controlled, such as to precisely control the volume of such passageways or grooves, which can be in the range of about 0.2 to about 0.6 microliters. Moreover, the valve of the present disclosure can be used even when the fluid flowing through the tubing and the valve is at high pressures, including pressures at anywhere from 5,000 psi to 30,000 psi or higher. Because the stator plate can comprise two or more layers which are bonded together, each of the layers can comprise one or more portions (such as grooves or channels) that are designed so that, when the two layers are bonded together, the portions align and fit together to form a passageway through the stator plate formed by the bonded layers. In addition, the optional use of the guide layer in the stator plate allows for a looser tolerance in terms of the alignment of the openings of the stator plate and the mounting device, thereby reducing cost and also providing a valve in which an operator can more easily and more quickly make and/or disassemble connections. The stator plate faces, including the fluid pathways (whether formed by grooves, passageways, or otherwise), can be coated (such as with a diamond-like carbon) if desired to reduce friction and increase hardness.

As described above, stator plates disclosed herein may include various liquid chromatography elements, such as a separation column, a sample loop, a mixer, a pressure sensor, a flow sensor, a heater, or a temperature sensor. The liquid chromatography element included with a particular stator plate may have a particular property, such as a particular size or a particular physical dimension or a particular parametric range of certain process values involved with liquid chromatography. Thus, by virtue of the replaceable stator plates in the valve disclosed herein, an operator may replace the stator plate with another stator plate that is tailored for a given application, while continuing to use the remaining portions of the valve, which is desirable.

Furthermore, it has been reported that the ultra-fast separation, high resolution, and high sensitivity of UHPLC, which are desirable features, may depend on certain physical attributes of the system being used. Some common strategies to optimize the physical attributes of the system include the use of narrow-bore columns packed with micron-sized particles, reducing extra-column variance, reducing dwell volume, and increasing system pressure, etc. In particular, for columns having relatively small inner diameters, it has been reported that extra-column band broadening effects may negatively impact column efficiency in UHPLC applications. Generally, the extra-column effects may be observed to occur in extra-column volumes, including the injector system (e.g., sample loop), the connector tubing (e.g., valve connections), and the detector cell. Accordingly, one physical attribute of the system that supports the desirable features of UHPLC is a small or minimal volume in the column and between the valve and the column.

The stator plate described herein including liquid chromatography elements may enable a minimal volume in the column and between the end of the tubing and the port of the valve, between the tubing and the column, and between the column and the detector, which may positively impact UHPLC results, such as by reducing extra-column band broadening or by reducing carry over. Specifically, various implementations of a stator plate incorporating the separation column filled with separation particles will now be described with respect to FIGS. 24-32. By integrating the column into the stator plate, the column may be enabled for fluid communication within the valve and have a minimal extra-column volume between a fluid switching element of the valve and the column, and more generally between various elements in the system.

Referring again to FIGS. 1, 2, and 3, operation of valve 1 will now be described in further detail with respect to stator plate 30. An operator may decide on a particular UHPLC application, or other type of chromatography application, and may select components of valve 1 accordingly. For example, the operator may select any one of the stator plates described in FIGS. 24-32 for a particular UHLPLC application, which may represent particular implementations of stator plate 30. Accordingly, stator plate 30 may be a single piece or a multi-piece stator plate having a plurality of layers. Valve 1 may be assembled for use, including mounting stator plate 30 to mounting plate 35 using screws 40, for example.

Then, the operator may attach a plurality of fitting assemblies 45, each of which comprise tube 46 and nut 47, to mounting plate 35. Each fitting assembly 45 may be a fluid source or a fluid drain, in order to transport desired fluids at high pressure to and from valve 1. For example, one fitting assembly may be connected to a solvent, another fitting assembly may be connected to an analyte, while yet another fitting assembly may be an output of the column. In some cases, the output of the column may be received at an external sensor or detector. When a sensor or detector is included with stator plate 30, the fluid output from the sensor/detector may be connected to a drain.

After fitting assemblies 45 are fixed with high-pressure seals to mounting plate 35, valve 1 may be operated by causing rotor shaft 5 to be rotated, thereby causing rotor seal 20 to be rotated. Rotor seal 20 may include any of a variety of interconnections for routing at least one fluid pathway on stator plate 30 to another fluid pathway on stator plate 30. Specifically, openings (not shown) in rotor seal 20 may correspond to central openings 41a (see FIGS. 7 and 8) that are arranged concentrically to the longitudinal axis of rotor shaft 5. The openings in rotor seal 20 fluidly connect each end of an interconnection in rotor seal 20. In one example, a singular interconnection may enable fluid communication between two adjacent openings on stator plate 30 and rotor seal 20. Thus, when rotor seal 20 is caused to rotate, rotor seal 20 may reach particular angular positions that seal the interconnections and enable fluidic switching among central openings 41a. It is noted that rotor shaft 5 may be turned by hand, such as by using knob 2 shown in FIG. 3. Alternatively, a mechanical actuator, such as a stepper motor, may be used to automatically actuate and fluidically switch valve 1. It will be understood that while the description of stator plates disclosed herein is often shown with 6 input openings (e.g., ports or "peripheral openings") and 6 output openings (e.g., "central openings"), corresponding to 6 possible fluid pathways within the stator plates, different numbers of input or output openings may be used with stator plates, as desired.

Figure 24:
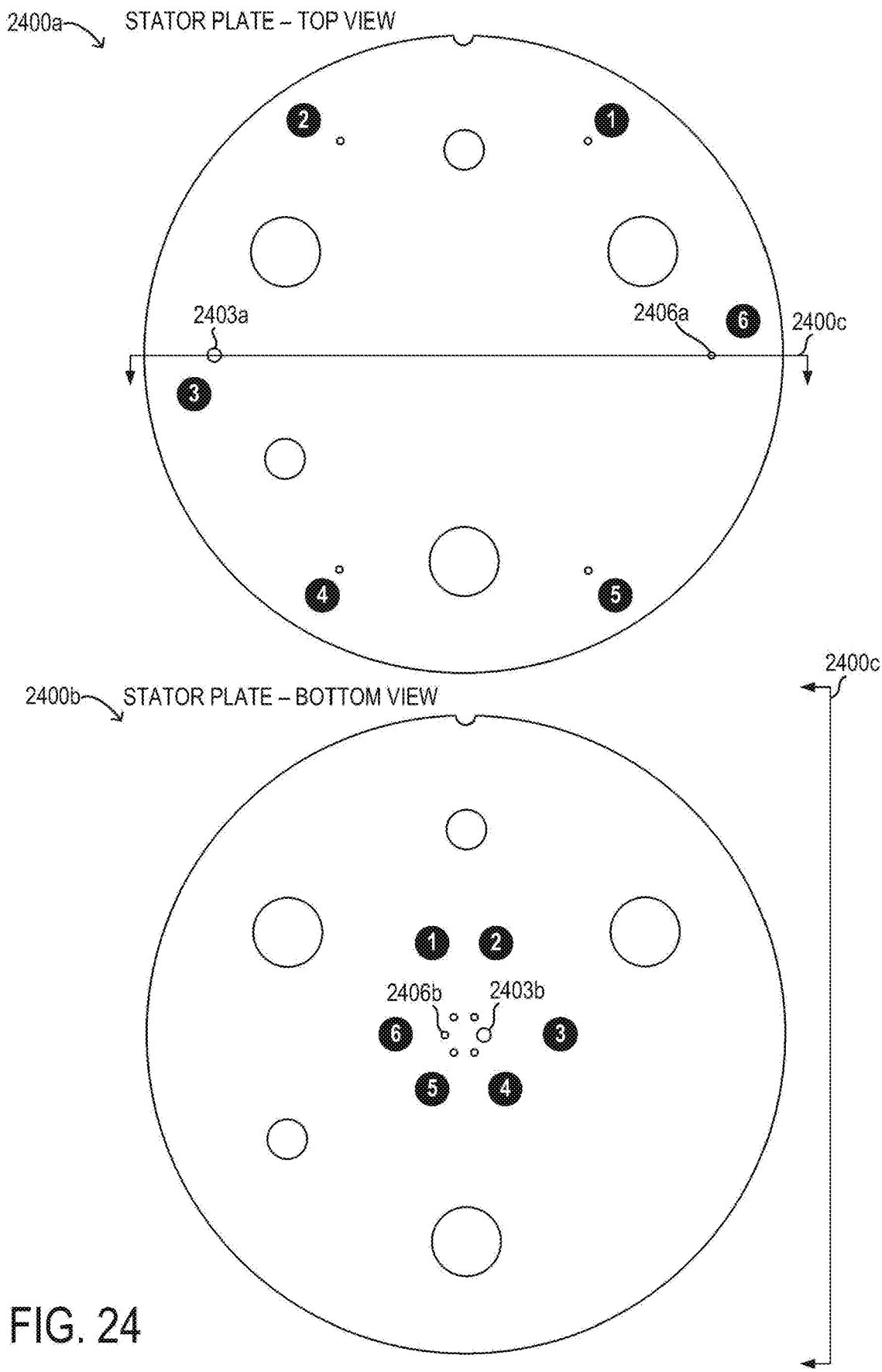
FIG. 24 shows a top view and a bottom view of an exemplary stator plate.

Referring now to FIG. 24, a stator plate 2400 is shown in further detail. Specifically, stator plate 2400 may represent an implementation of stator plate 30 previously described herein. For example, stator plate 2400 may be formed from a unitary (e.g., solid) workpiece having the first side and the second side. The first side of stator plate 30 may also be referred to as "top" while the second side may also be referred to as "bottom", following the arrangement and orientation of FIGS. 1, 2, and 3 of valve 1. Accordingly, the first side of stator plate 2400 is shown in a top view as stator plate 2400a, while the second side of stator plate 2400 is shown in a bottom view as stator plate 2400b in FIG. 24. It is noted that FIGS. 24-32 show holes 1410 for screws 40, openings 1432 for pins (not shown), as well as groove 1405 (see FIG. 14) for orientation and alignment purposes, but generally without element numbers for descriptive clarity in the drawings. In one exemplary implementation, stator plate 2400 may have typical dimensions of 4 cm in diameter and 2 mm in thickness. In other embodiments, stator plate may have a diameter of about 2 cm, 5 cm, 7 cm, 10 cm, or more, and may have a thickness of about less than 1 mm, 2 mm, 3 mm, 5 mm, 7 mm, 10 mm, or more.

As shown in FIG. 24, stator plate 2400a (top view) shows a plurality of peripheral openings corresponding to valve ports that are labeled throughout FIGS. 24-32 using a black circle with white numbers 1-6. Stator plate 2400a shows the mating surface of stator plate 2400 that engages with mounting device 35, as described previously. Accordingly, a center of each of the peripheral openings for ports 1-6 in stator plate 2400a may correspond in position to a center of one fitting assembly 45. In stator plate 2400a, the center of a peripheral opening 2406a may corresponds to the center of fitting assembly 45 for port 6, while the center of a peripheral opening 2403a may corresponds to the center of fitting assembly 45 for port 3. Furthermore, a size of peripheral opening 2403a is shown being greater than a size of peripheral opening 24066a in stator plate 2400a.

Figure 25:
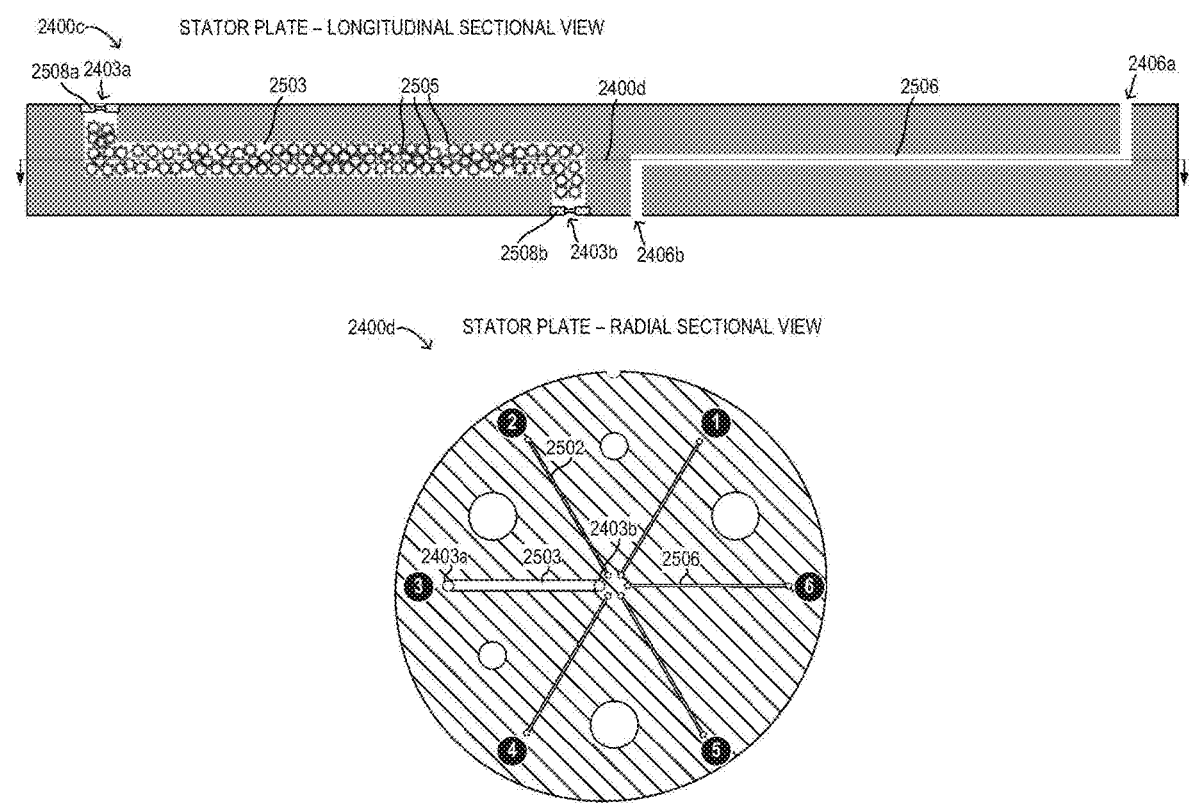
FIG. 25 shows a longitudinal sectional view and a radial sectional view of an exemplary stator plate.

As further shown in FIG. 24, stator plate 2400b (bottom view) shows a plurality of central openings corresponding to the openings in rotor seal 20, as explained above. The central openings are marked with corresponding port numbers 1-6, including central opening 2406b for port 6 and central opening 2403 for port 3. Furthermore, a size of peripheral opening 2403b is shown being greater than a size of peripheral opening 2406b in stator plate 2400b. As will be described below with respect to FIG. 25, stator plate 2400 may have a column integrated therein that is in fluid communication with peripheral opening 2403a. As shown in FIGS. 24 and 25, the column is located at port 3. The greater size of peripheral opening 2403a may correspond to a greater size of the column and of central opening 2403b shown with stator plate 2400b, as compared, for example, with central opening 2406b. Also visible in FIG. 24 are a sectional arrow 2400c defining a longitudinal section and a sectional arrow 2400s defining a radial section.

Referring now to FIG. 25, a stator plate 2400c is shown as a longitudinal section in accordance with FIG. 24. In stator plate 2500c, a fluid pathway 2503 and a fluid pathway 2506 are visible and correspond to ports 3 and 6, respectively, of FIG. 24. Fluid pathway 2506 may represent a smaller diameter fluid pathway, having a width of less than about 5 mm, less than 4 mm, less than 3 mm, less than 2 mm, less than 1 mm, less than 500 µm, less than 250 µm, or less than 25 µm. As shown, fluid pathway 2503 may represent a larger diameter fluid pathway, for example, having a width that is a greater-than-1 multiple of the width of fluid pathway 2506, such as 1.5 times, 1.8 times, 2 times, 3 times, 5 times, or 10 times greater width. In a particular implementation, fluid pathway 2503 may have a width of about 4.6 mm for HPLC, or about 2.1 mm and 1 mm for UHPLC. The other fluid pathways may have a width of about 0.15 mm to 0.5 mm in given implementations. As a result of the increased diameter of fluid pathway 2503, it may be packed with separation particles 2505 and may be used as a column. Separation particles 2505 are shown schematically and may represent various types and sizes of separation particles that may be selected for chemical performance or particle size or both. Additionally, a first frit 2508a may be installed at peripheral opening 2403a, and a second frit 2508b may be installed at central opening 2403b to retain particles 2505 within fluid pathway 2503, while allowing a liquid phase (e.g., solvent and analyte) to pass through fluid pathway 2503 and become separated into individual molecular components.

Also shown in FIG. 25 is stator plate 2400d, which is a radial sectional view (see FIG. 24) at a midpoint of the thickness of stator plate 2400. Visible in stator plate 2400d are six fluid pathways corresponding to ports 1-6, with each fluid pathway extending from a corresponding peripheral opening to a corresponding central opening. In stator plate 2400d, the difference in width, for example between fluid pathway 2506, and fluid pathway 2503 is visible (separation particles 2505 are not shown in stator plate 2400d for descriptive clarity, but it will be understood that separation particles 2505 are used to pack fluid pathway 2503 to form a column). Also shown in FIG. 25 is electronic device 2502 that is formed in a shape corresponding to fluid pathway 2506. However, electronic device 2502 may also comprise a device that is formed in stator plate 2400, such as a heating element or a sensor.

Figure 26:
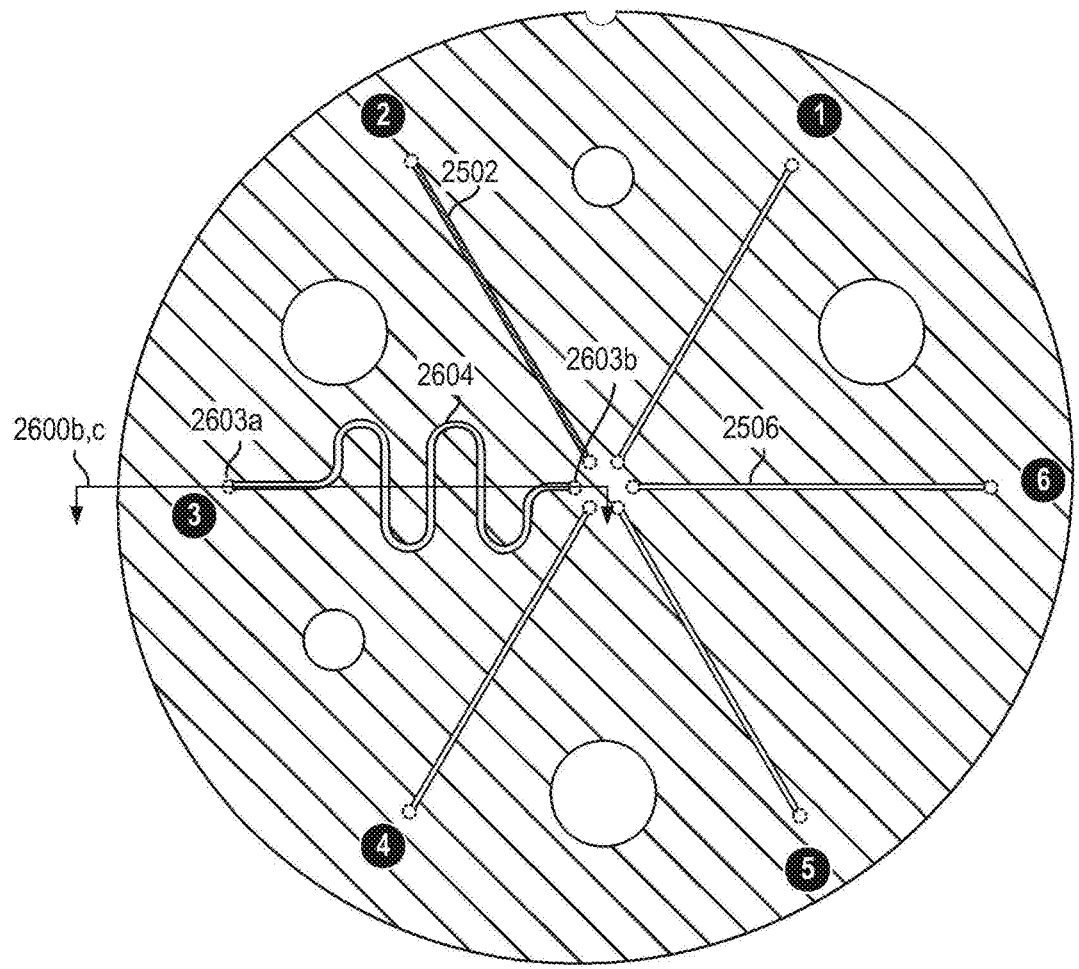
FIG. 26 shows a radial sectional view and alternative longitudinal sectional views of an exemplary stator plate.
Figure 26:
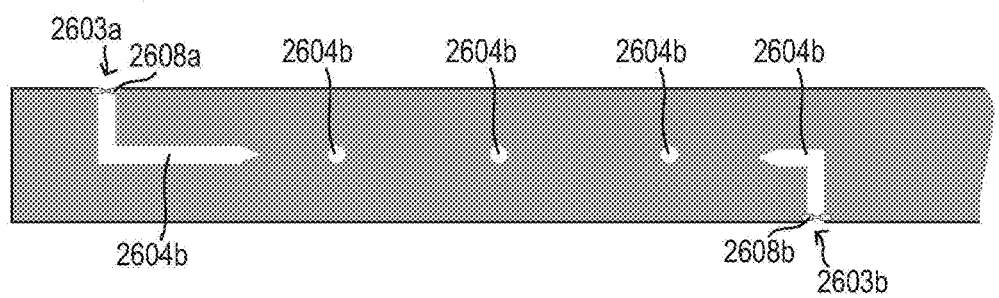
Figure 26:
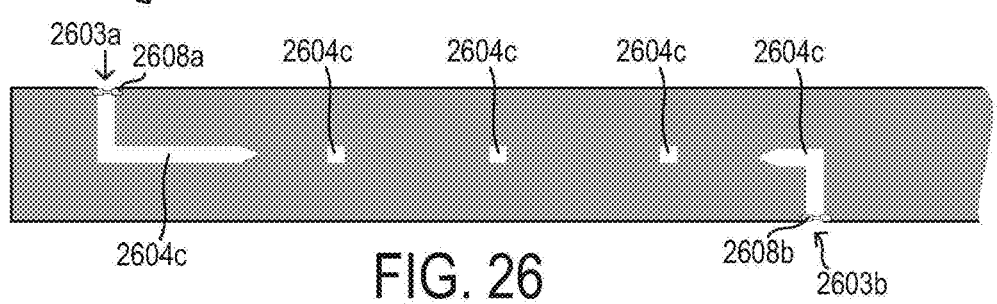

Referring now to FIG. 26, a stator plate 2600 is shown in a radial sectional view as stator plate 2600a. Stator plate 2600 may be substantially similar to stator plate 2400 described previously. However, stator plate 2600 is shown including a fluid pathway 2604, extending from peripheral opening 2603a to central opening 2603b that is longer than fluid pathway 2503. Specifically, fluid pathway 2604 is routed in a serpentine manner to increase column length. Furthermore, fluid pathway 2604 is shown having the same width as other fluid pathways for other ports, such as fluid pathway 2506. Thus, the diameter of the fluid pathways in stator plate 2600 may be between 1.0 and 2.1 mm for UHPLC, and may be less than 0.25 mm for capillary HPLC. Although fluid pathway 2604 is shown being routed in a serpentine manner, it will be understood that other routing geometries may be used, as desired. Also shown in FIG. 26 is electronic device 2502 that is formed in a shape corresponding to fluid pathway 2506. However, electronic device 2502 may comprise a fluid pathway and a device that is formed in stator plate 2600, such as a heating element or a sensor.

The fluid pathways in stator plates 2400 and 2600, which may be formed as unitary solid workpieces, may be formed by forming 2 half pieces, such as a half-piece having an outer surface corresponding to stator plate 2600a, in order to form the openings and fluid pathways, and then bonding the 2 half-pieces together as a unitary or solid workpiece. The type of bonding used may depend on a material used to form the respective stator plate. For example, when metal is used, diffusion bonding may be used. In other embodiments, adhesive bonding using an adhesive or bonding using elevated pressure or temperature or both may be used.

Also shown in FIG. 26 are stator plates 2600b and 2600c, which are longitudinal sectional views corresponding to the sectional arrow 2600b, c of stator plate 2600a. Stator plates 2600b and 2600c show that fluid pathway 2604 may be formed using a variety of cross-sectional shapes. In stator plate 2600b, a corresponding fluid pathway 2604b has a circular cross-sectional shape. In stator plate 2600c, a corresponding fluid pathway 2604c has a square cross-sectional shape. Also visible in stator plates 2600b and 2600c are frits 2608a and 2608b, which may be optional, for example, when fluid pathway 2604 is not packed with separation particles. It will be understood that various cross-sectional shapes may be used with the fluid pathways described herein, including semi-circular (see FIG. 28), triangular (see FIG. 27A), rectangular (see FIG. 28), regular polygons, irregular polygons, or other shapes.

Figure 27A:
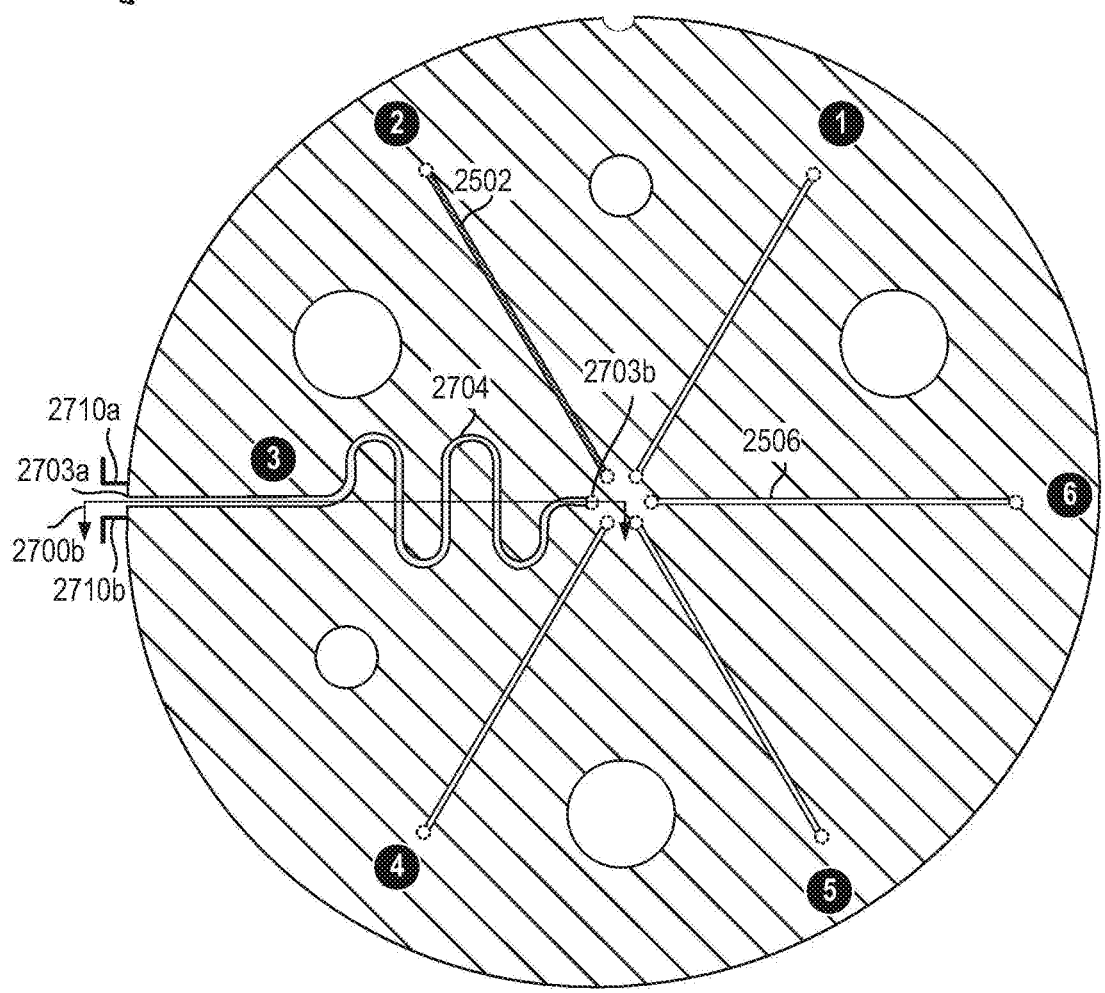
FIG. 27A shows a radial sectional view and a longitudinal sectional view of an exemplary stator plate.
Figure 27A:
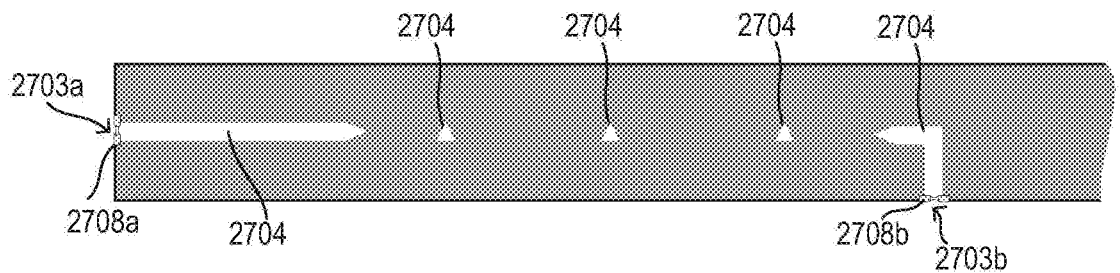

Referring now to FIG. 27A, a stator plate 2700 is shown in a radial sectional view as stator plate 2700a. Stator plate 2700 may be substantially similar to stator plate 2600 described previously. However, stator plate 2700 is shown including a fluid pathway 2704, extending between a radial opening 2703a and a central opening 2703b. As shown in FIG. 27A, radial opening 2703a is located on an edge of stator plate 2700 and may not correspond to a port adapted to connect with a fitting assembly 45. Instead, radial opening 2703a may be an alternative opening for fluid pathway 2704 when formed as a column. Also shown in FIG. 27A is electronic device and fluid pathway 2502 that is formed in a shape corresponding to fluid pathway 2506. However, electronic device and fluid pathway 2502 may represent a pathway and device that is formed in stator plate 2700, such as a pathway with a heating element or a pressure or temperature sensor. Additionally, connections 2710a, b show how electrical contacts may be provided for electronic device 2502 at the edge of stator plate 2700. The electrical connections 2710 may be internally routed (not shown) within stator plate 2700 to electronic device 2502.

Also shown in FIG. 27A is stator plate 2700b, which is a longitudinal sectional view corresponding to the sectional arrow 2700b of stator plate 2700a. In stator plate 2700b, a corresponding fluid pathway 2704 has a triangular cross-sectional shape in an example implementation. It will be understood that various cross-sectional shapes can be used for fluid pathway 2704, as described above.

Figure 27B:
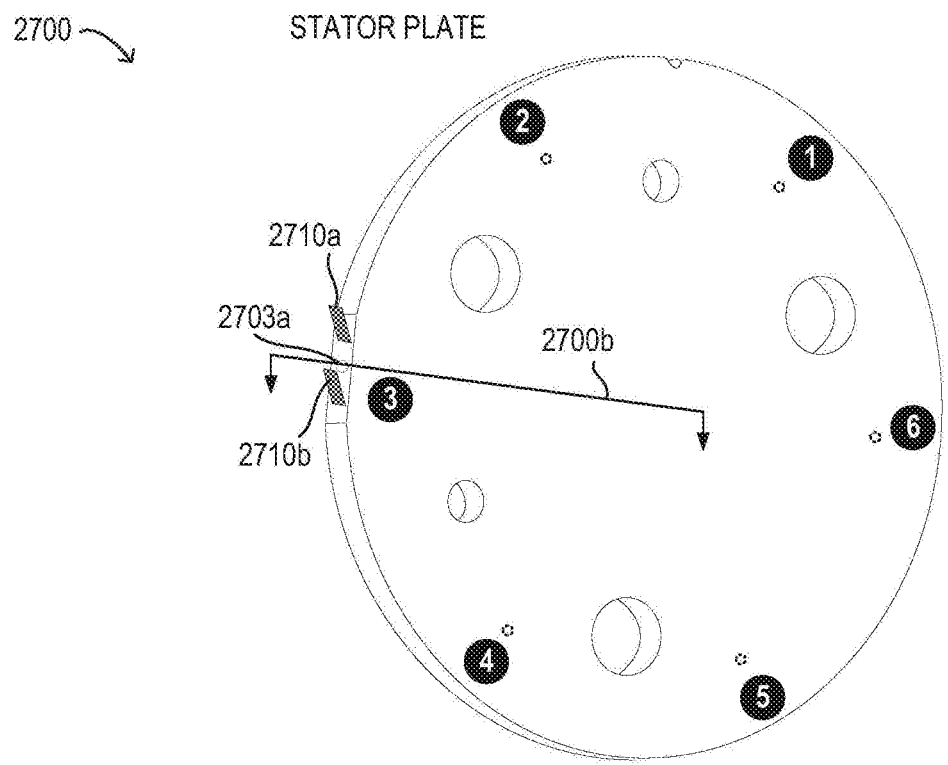
FIG. 27B shows a perspective view of an exemplary stator plate.

Referring now to FIG. 27B, stator plate 2700 is shown in a perspective view as stator plate 2700. In FIG. 27B, an exemplary arrangement for external access to peripheral opening 2703a, as well as electrical connections 2710, are shown at the edge of stator plate 2700. In certain implementations, additional electrical connections, or other types of connections, such as optical fibers or optical signals, may be connected at the edge of stator plate 2700.

Figure 28:
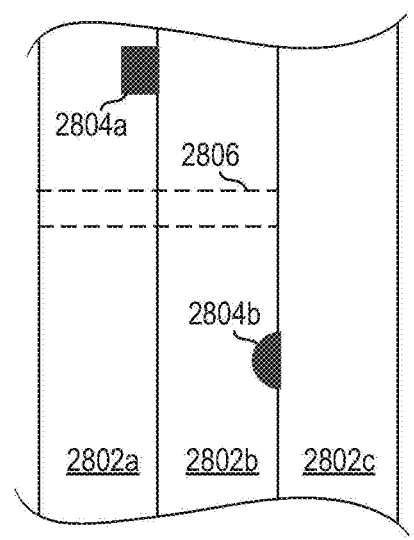
FIG. 28 shows a longitudinal sectional view of an exemplary stator plate.

Referring now to FIG. 28, a multi-layer stator plate 2800 is shown in a longitudinal sectional view at an arbitrary location. Multi-layer stator plate 2800 may represent various embodiments of stator plate 30 described herein. FIG. 28 illustrates how fluid pathways may be formed in stator plate 2800 using multiple layers. The fluid pathways, vias, and arrangement of layers in FIG. 28 is arbitrary and is intended to show an exemplary cross-sectional structure. Specifically, stator plate 2800 is formed using three layers, 2802a, 2802b, 2802c. Although layers 2802 are shown being roughly equivalent in thickness, it is noted that different thickness for layers 2802, or among layers 2802, may be used. In stator plate 2800, a cross-section of a first fluid pathway 2804a is shown as a void in FIG. 28 that is formed in layer 2802a as a surface channel or pathway. When layer 2802a is bonded to layer 2802b, as described previously, first fluid pathway 2804a may be sealed for fluid communication. A second fluid pathway 2804b is similarly formed in layer 2802b and is sealed for fluid communication when layer 2802b is bonded to layer 2802c. First fluid pathway 2804a is shown having a rectangular cross-sectional shape, while second fluid pathway 2804b is shown having a semi-circular cross-sectional shape, as exemplary implementations. Also shown in stator plate 2800 are vias 2806, which may represent openings between layers, such as the central or peripheral openings described above, among other openings. As shown, vias 2806 penetrate layer 2802a and 2802b, but are sealed at layer 2802c.

FIGS. 26, 27A, and 29-31 show various layouts and arrangements for fluid pathways that may be implemented in stator plate 2800. It is noted that individual layers 2802 of stator plate 2800 may be processed for patterning and forming fluid pathways in a substantially similar manner as microelectronic circuits, using a photoresist, exposure to light through a patterned mask, and then subsequent development and etching, for example, as well as by accretive manufacturing processes. In some implementations, various coatings or surface treatments on layers 2802 may be applied, for example, to attain a desired chemical property, or to promote biocompatibility of stator plate 2800. Additionally, actual microelectronics or electrical circuits may be implemented on layers 2802, such as a heating element or a sensor described herein. In particular embodiments, a detector may be implemented on layer 2802, such as an optical device with a light source and an optical sensor. In some implementations, the optical light source may be a laser and additional waveguides or optical fibers or conduits may be implemented on layers 2802.

Figure 29:
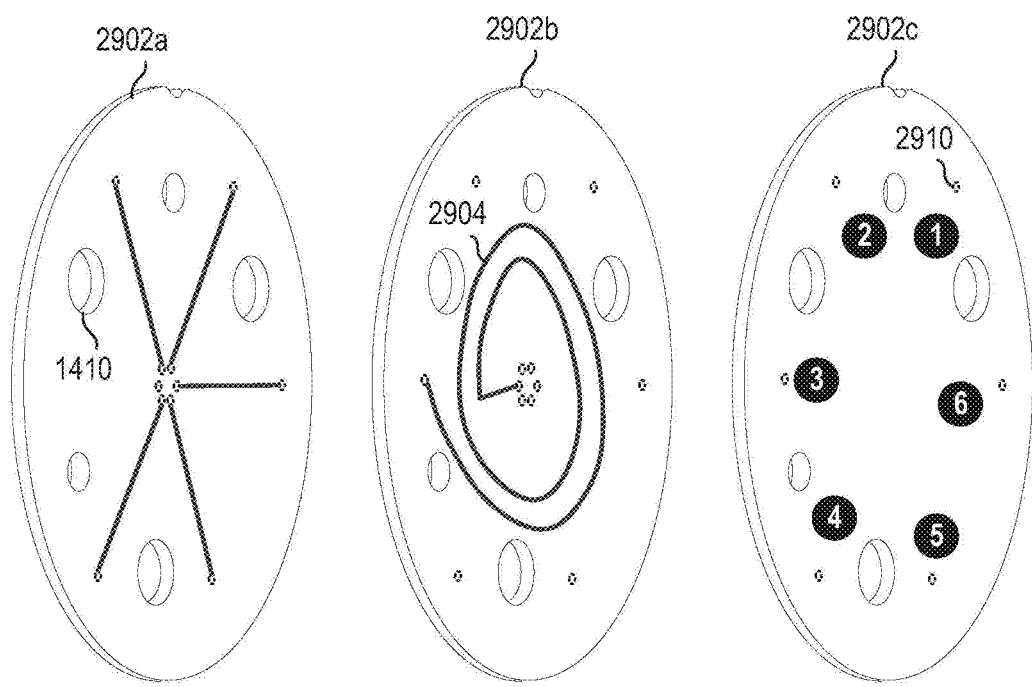
FIG. 29 shows an exploded view of an exemplary stator plate.

Referring now to FIG. 29, a multi-layer stator plate 2900 is shown in a perspective exploded view. Multi-layer stator plate 2900 may represent various embodiments of stator plate 30 described herein. As shown, multi-layer stator plate 2900 comprises three layers 2902a, 2902b, 2902c. The layers 2902 may be bonded together to form a unitary stator plate, as described above. The layers 2902 may also be attached or bonded together using screws 40 that penetrate holes 1410, as described previously.

In FIG. 29, layer 2902c may be a top layer and the external face or side of layer 2902c may correspondingly engage with mounting plate 35 using peripheral openings 2910, as described previously. As shown, layer 2902c has six peripheral openings 2910 corresponding to ports 1-6. It is noted that layer 2902c does not have any central openings, which allows central openings in layer 2902b, for example, to be sealed at one end when layer 2902c is bonded to layer 2902b (see also FIG. 28). In FIG. 29, layer 2902b may be an intermediate layer that is used to implement a fluid pathway 2904 at port 3 that is a column having a longer path than fluid pathway 2704, for example, by using the available area of layer 2902b exclusively to form fluid pathway 2904. In this manner, a spiral arrangement of fluid pathway 2904 may be implemented with an input at layer 2902c (peripheral opening for port 3), and an output at layer 2902a (central opening for port 3). It is noted that layer 2902a does not have a peripheral opening at port 3, thereby allowing peripheral openings for port 3 in layers 2902c and 2902b to be sealed at layer 2902a in the exemplary implementation shown in FIG. 29.

Figure 30:
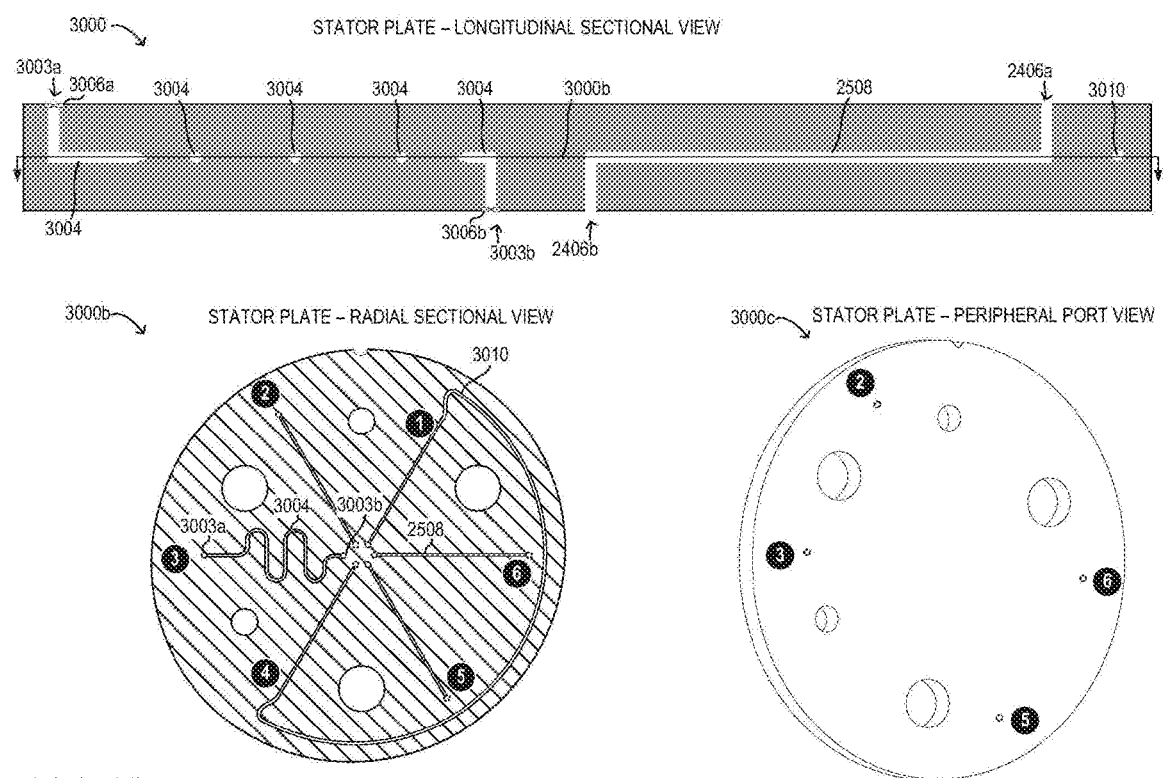
FIG. 30 shows various views of an exemplary stator plate.

Referring now to FIG. 30, a stator plate 3000 is shown in a longitudinal sectional view and includes a sample loop 3010 formed therein. In stator plate 3000, a fluid pathway 3004 and a fluid pathway 2508 are visible and correspond to ports 3 and 6, respectively. Additionally, a first frit 3006a may be installed at a peripheral opening 3003a, and a second frit 3006b may be installed at central opening 3003b to retain separation particles (not shown, see FIG. 25) within fluid pathway 3004, while allowing a liquid phase (e.g., solvent and analyte) to pass through fluid pathway 3004 and become separated into individual molecular components. As shown, fluid pathway 3004 is circular in cross-sectional shape. Also visible in stator plate 3000 is a cross-section of sample loop 3010. In stator plate 3000b, a radial sectional view as given by sectional arrows 3000b is shown. In stator plate 3000b, the layout of fluid pathway 3004 (or column 3004) and fluid pathway 3010 (or sample loop 3010) is shown. Although a singular sample loop 3010 is shown in FIG. 30, it will be understood that more than one sample loop or different sizes or lengths of sample loops may be implemented in stator plate 300, as described herein.

Also shown in FIG. 30 is stator plate 3000b, which is a radial sectional view at a midpoint of the thickness of stator plate 3000, shown by corresponding section arrows in stator plate 3000. Visible in stator plate 3000b are four fluid pathways corresponding to ports 2, 3 (fluid pathway 3004), 5, and 6 (fluid pathway 2508), with each of the four fluid pathways extending from a corresponding peripheral opening to a corresponding central opening. No peripheral openings are provided for sample loop 3010, which runs from the central opening for port 4 to the central opening for port 1. Also shown in FIG. 30 is stator plate 3000c, which is a perspective view of a top face of stator plate 3000, showing the four peripheral ports 2, 3, 5, 6 that can be in fluid communication with corresponding fitting assemblies 45, respectively. In stator plate 3000c, no peripheral openings are provided at ports 1 and 4, corresponding to sample loop 310.

Figure 31:
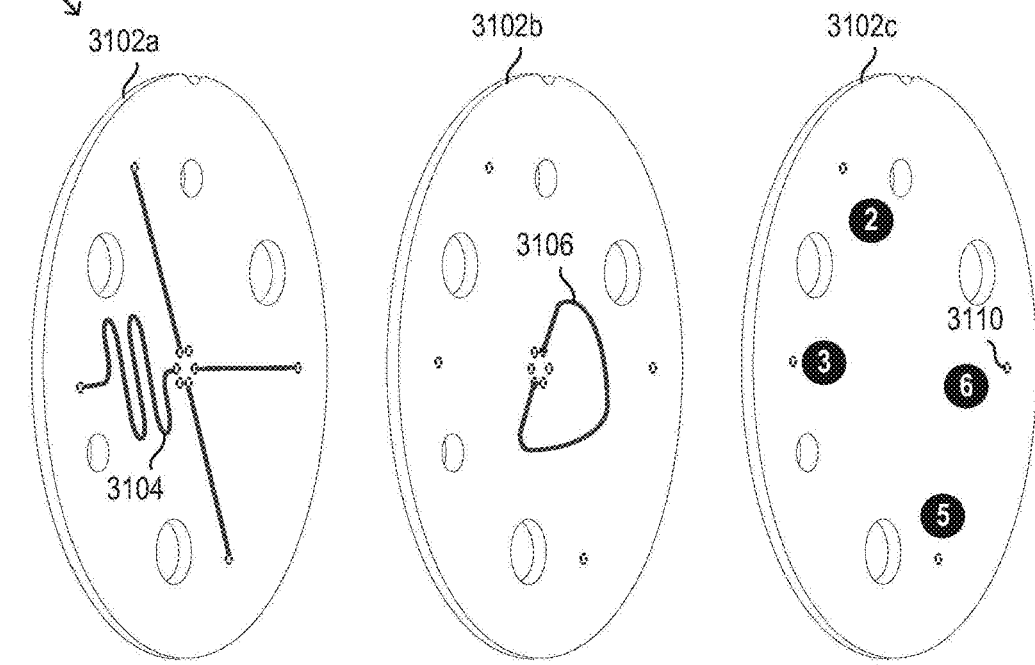
FIG. 31 shows an exploded view of an exemplary stator plate.

Referring now to FIG. 31, a multi-layer stator plate 3100 is shown in a perspective exploded view. Multi-layer stator plate 3100 may represent various embodiments of stator plate 30 described herein. As shown, multi-layer stator plate 3100 comprises three layers 3102a, 3102b, 3102c. The layers 3102 may be bonded together to form a unitary stator plate, as described above. The layers 3102 may also be attached or bonded together using screws 40 that penetrate holes 1410, as described previously.

In FIG. 31, layer 3102c may be a top layer and the external face or side of layer 3102c may correspondingly engage with mounting plate 35 using peripheral openings 3110, as described previously. As shown, layer 3102c has four peripheral openings 3110 corresponding to ports 2, 3, 5, 6. It is noted that layer 3102c does not have any central openings, which allows central openings in layer 3102b, for example, to be sealed at one end when layer 3102c is bonded to layer 3102b (see also FIG. 28). In FIG. 31, layer 3102b may be an intermediate layer that is used to implement a fluid pathway 3106 between central openings for ports 1 and 4 that is a sample loop having a shorter path than sample loop 3010, for example. Also, in layer 3102a, a fluid pathway 3104 is shown as a column at port 3. By varying the shape or dimensions of fluid pathway 3104, the length of the column may be adjusted. In this manner, stator plate 3100 shows how different lengths of the sample loop may be implemented.

Figure 32:
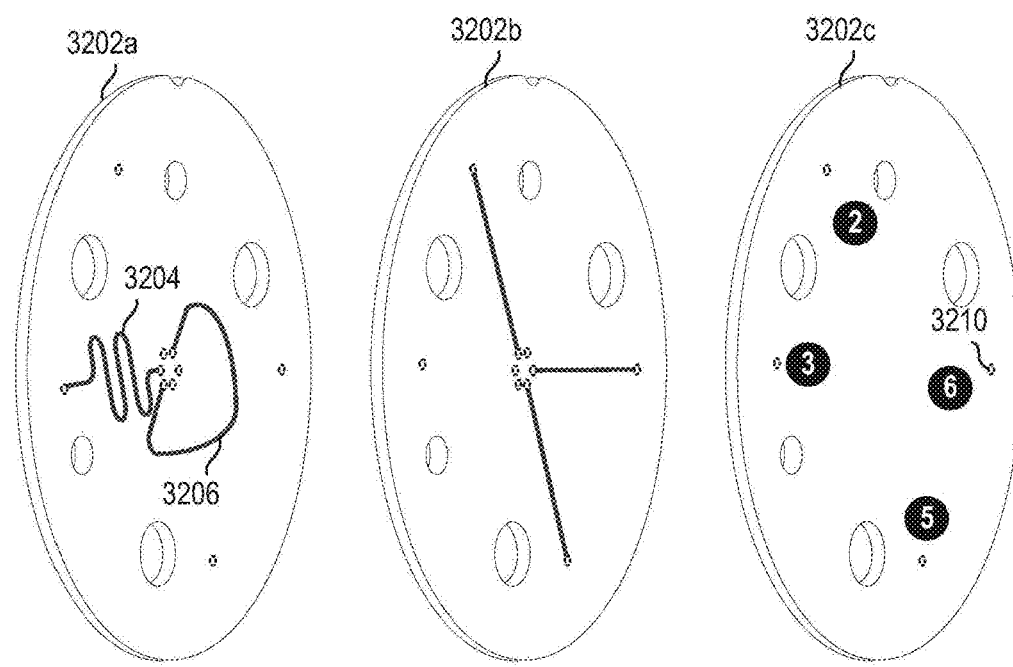
FIG. 32 shows an exploded view of an exemplary stator plate.

Referring now to FIG. 32, a multi-layer stator plate 3200 is shown in a perspective exploded view. Multi-layer stator plate 3200 may represent various embodiments of stator plate 30 described herein. As shown, multi-layer stator plate 3200 comprises three layers 3202a, 3202b, 3202c. The layers 3202 may be bonded together to form a unitary stator plate, as described above. The layers 3202 may also be attached or bonded together using screws 40 that penetrate holes 1410, as described previously.

In FIG. 32, layer 3202c may be a top layer and the external face or side of layer 3202c may correspondingly engage with mounting plate 35 using peripheral openings 3210, as described previously. As shown, layer 3202c has four peripheral openings 3210 corresponding to ports 2, 3, 5, 6. It is noted that layer 3202c does not have any central openings, which allows central openings in layer 3202b, for example, to be sealed at one end when layer 3202c is bonded to layer 3202b (see also FIG. 28). In FIG. 32, layer 3202b may be an intermediate layer that is used to implement a port switching for ports 2, 5, 6. In FIG. 32, layer 3202a may be a bottom layer on which a fluid pathway 3206 is formed between central openings for ports 1 and 4 as a sample loop having a shorter path than sample loop 3010, for example. Also, in layer 3202a, a fluid pathway 3204 is shown as a column at port 3. By varying the shape or dimensions of fluid pathway 3204, the length of the column may be adjusted. In this manner, stator plate 3200 shows how different lengths of the sample loop may be implemented.

While the present disclosure has been shown and described with respect to various embodiments, it is noted from the foregoing description that various changes, modifications, and variations may be made thereto without departing from the spirit and scope of the invention as set forth in the claims. For example, it is noted that the foregoing description and figures generally depict a valve such as a rotary shear valve, but the foregoing disclosure applies to other types of valves as well. Similarly, it will be appreciated that the valve and components illustrated and described herein may have different numbers of ports, fluid pathways, openings for screws and bolts, and the like than those shown and described as examples. In addition, it is noted that, although two-piece and three-piece stator assemblies have been shown and described, the teachings herein may be applied to stator assemblies with more pieces, as desired, and the teachings herein may be applicable for a multi-piece stator assembly. Hence, the embodiments and specific dimensions, materials and the like are merely illustrative and do not limit the scope of the invention or the claims herein.

What is claimed is:

1. A stator plate for a high-pressure valve for an analytical instrument, the stator plate comprising:
a first side and a second side, wherein the first side of the stator plate is adapted for removably mounting to a mounting plate, wherein the stator plate has a plurality of peripheral openings in the first side of the stator plate proximal the periphery thereof, including a first peripheral opening, and a plurality of central openings in the second side of the stator plate proximal the center thereof, including a first central opening, wherein each of the peripheral openings of the stator plate are in first fluid communication with one of the openings of the mounting plate; and
a first fluid pathway formed within the stator plate in third fluid communication between the first peripheral opening and the first central opening, wherein the first fluid pathway further comprises a packed chromatography column, and wherein the second side of the stator plate is adapted to engage with a first side of a rotor seal so that, when the rotor seal is rotatably moved, a second fluid communication is formed between two of the central openings on the second side of the stator plate.

2. The stator plate of claim 1, further comprising a second fluid pathway within the stator plate in fourth fluid communication between a second peripheral opening included in the peripheral openings and a second central opening included in the central openings, wherein the second fluid pathway further comprises a chromatography element selected from: a sample loop, a mixing element, and a filter.

3. The stator plate of claim 2, wherein the stator plate is formed from a unitary workpiece having the first side and the second side, wherein the first fluid pathway has a larger cross-sectional area than a second fluid pathway formed in the stator plate, wherein the first peripheral opening has a larger cross-sectional area than a second peripheral opening included in the peripheral openings, and the first central opening has a larger cross-sectional area than a second central opening included in the central openings.

4. The stator plate of claim 2, wherein the valve further comprises: at least one mechanical fastener penetrating the mounting plate and the stator plate through holes in the mounting plate and the stator plate, wherein the mechanical fastener attaches the mounting plate to the stator plate to seal the first fluid communication.

5. The stator plate of claim 4, further comprising a plurality of layers bonded together, including a top layer including the first side of the stator plate and a bottom layer including the second side of the stator plate.

6. The stator plate of claim 5, wherein the packed chromatography column is located on a first layer of the plurality of layers, and the chromatography element is located on a second layer of the plurality of layers, the second layer being different from the first layer.

7. The stator plate of claim 5, wherein the packed chromatography column is located on the same layer of the plurality of layers as the chromatography element is located.

8. The stator plate of claim 5, wherein a first layer of the plurality of layers has a first chromatography element, and a second layer of the plurality of layers has a second chromatography element.

9. The stator plate of claim 8, wherein the first chromatography element and the second chromatography element are the same chromatography element having a different physical dimension.

10. The stator plate of claim 5, wherein a first layer of the plurality of layers has only the chromatography element.

11. The stator plate of claim 2, wherein the second fluid pathway further comprises an electronic device selected from at least one of: a heating element, and a sensor, and wherein the stator plate further comprises electronic connections for the electronic device, the electronic connections being externally accessible from the stator plate.

12. The stator plate of claim 1, wherein the mounting plate comprises a first material and the stator plate comprises a second material that is different from the first material.

13. The stator plate of claim 12, wherein the second material is a biocompatible material.

14. The stator plate of claim 1, wherein the stator plate is adapted to be removable from a valve.

15. A valve for liquid chromatography comprising:
a mounting plate having a first side and a second side and having a plurality of openings extending through the mounting plate from the first side to the second side;
a stator plate having a first side and a second side, wherein the first side of the stator plate is adapted to engage with the second side of the mounting plate, wherein the stator plate has a first plurality of openings proximal the periphery of the stator plate in the first side of the stator plate, including a first peripheral opening, and a second plurality of openings proximal the center of the stator plate in the second side of the stator plate, including a first central opening, wherein each of the first plurality of openings of the stator plate are in first fluid communication with one of the openings of the mounting plate;
a rotor seal adapted to engage with the second side of the stator plate;
a rotor shaft enabled to rotate around a longitudinal axis shared by the rotor shaft, the mounting plate, and the stator plate, wherein the rotor shaft is enabled to rotate about the longitudinal axis with respect to the mounting plate in order to form a second fluid communication between two of the second plurality of openings on the second side of the stator plate; and
a first fluid pathway formed within the stator plate in third fluid communication between the first peripheral opening and the first central opening, wherein the first fluid pathway further comprises a packed chromatography column and at least a first chromatography feature, comprising at least one of a heating element, a pressure sensor, a temperature sensor, a pump, a mixing element, or a sample loop.

16. The valve of claim 15, further comprising a second fluid pathway within the stator plate in fourth fluid communication between a second peripheral opening included in the first plurality of openings and a second central opening included in the second plurality of openings, wherein the second fluid pathway further comprises a second chromatography feature selected from: a sample loop, a mixing element, a filter, and a packed chromatography column.

17. The valve of claim 16, wherein the stator plate is formed from a unitary workpiece having the first side and the second side, wherein the first fluid pathway has a larger cross-sectional area than a second fluid pathway formed in the stator plate, wherein the first peripheral opening has a larger cross-sectional area than a second peripheral opening included in the first plurality of openings, and the first central opening has a larger cross-sectional area than a second central opening included in the second plurality of openings.

18. The valve of claim 16, further comprising: at least one mechanical fastener penetrating the mounting plate and the stator plate through holes in the mounting plate and the stator plate, wherein the mechanical fastener attaches the mounting plate to the stator plate to seal the first fluid communication.

19. The valve of claim 18, wherein the stator plate further comprises a plurality of layers bonded together, including a top layer including the first side of the stator plate and a bottom layer including the second side of the stator plate.

20. The valve of claim 19, wherein the first chromatography feature is located on a first layer of the plurality of layers, and the second chromatography feature is located on a second layer of the plurality of layers, the second layer being different from the first layer.

21. The valve of claim 20, wherein the first chromatography feature and the second chromatography feature comprise the same chromatography feature having a different physical dimension.

22. The valve of claim 19, wherein the packed chromatography column is located on the same layer of the plurality of layers as the second chromatography feature.

23. The valve of claim 19, wherein a first layer of the plurality of layers comprises only the first chromatography feature.

24. The valve of claim 19, wherein the plurality of layers comprise metal and are bonded together by diffusion bonding.

25. The valve of claim 24, wherein the plurality of layers are formed using at least one of: stainless steel, titanium, and a nickel-cobalt alloy.

26. The valve of claim 19, wherein the plurality of layers are attached together using fasteners penetrating the holes.

27. The valve of claim 19, wherein the plurality of layers are bonded together using adhesive bonding with an adhesive.

28. The valve of claim 19, wherein the plurality of layers are bonded together using a combination of heat and pressure.

29. The valve of claim 19, wherein at least one of the layers comprises at least one of a ceramic, a glass, and a composite material.

30. The valve of claim 16, wherein the second fluid pathway further comprises an electronic device selected from at least one of: a heating element and a sensor, and wherein the stator plate further comprises electronic connections for the electronic device, the electronic connections being externally accessible from the stator plate.

31. The valve of claim 15, wherein the mounting plate comprises a first material and the stator plate comprises a second material that is different from the first material.

32. The valve of claim 31, wherein the second material is a biocompatible material.

33. The valve of claim 15, wherein the mounting plate comprises at least one of:
aluminum, copper, steel, stainless steel, titanium, and a nickel-cobalt alloy.

34. The valve of claim 15, wherein the mounting plate comprises at least one of:
polyetheretherketone, polypropylene, polysulfone, polyoxymethylene, polyetherimide, polyphenylene sulfide, polytetrafluoroethylene, nylon, and polyamide.

35. The valve of claim 15, wherein the stator plate is adapted to be removed from the valve.

36. The valve of claim 15 wherein the valve is adapted to operate with fluid pressures of a fluid flowing therethrough of up to 25,000 psi.

* * * * *